(12) United States Patent
Lindenstruth

(10) Patent No.: US 8,768,641 B2
(45) Date of Patent: Jul. 1, 2014

(54) DIGITAL CONTROLLER FOR AN AUTOMOTIVE STEERING TEST RIG

(75) Inventor: Michael Lindenstruth, Gross Gerau (DE)

(73) Assignee: GM Global Technology Operations LLC, Detroit, MI (US)

( * ) Notice: Subject to any disclaimer, the term of this patent is extended or adjusted under 35 U.S.C. 154(b) by 666 days.

(21) Appl. No.: 12/990,634

(22) PCT Filed: May 6, 2009

(86) PCT No.: PCT/EP2009/003240
§ 371 (c)(1),
(2), (4) Date: Jan. 19, 2011

(87) PCT Pub. No.: WO2009/135664
PCT Pub. Date: Nov. 12, 2009

(65) Prior Publication Data
US 2011/0125450 A1 May 26, 2011

(30) Foreign Application Priority Data

May 6, 2008 (WO) .................. PCT/EP2008/003621

(51) Int. Cl.
*G01L 25/00* (2006.01)
*G01M 17/00* (2006.01)
*G01M 17/06* (2006.01)

(52) U.S. Cl.
CPC .................................. *G01M 17/06* (2013.01)
USPC ........................................ 702/113; 702/115

(58) Field of Classification Search
CPC ........ G01M 17/06; B62D 5/0457; B62D 6/00
USPC ................................................ 702/113, 115
See application file for complete search history.

(56) References Cited

U.S. PATENT DOCUMENTS 3,803,906 A 4/1974 Ross
3,821,893 A 7/1974 Klinger et al.
(Continued)

FOREIGN PATENT DOCUMENTS

| DE | 2217536 B1 | 10/1973 |
| DE | 4434024 A1 | 3/1995 |
| GB | 1373596 A | 11/1974 |
| GB | 2282228 A | 3/1995 |

OTHER PUBLICATIONS

European Patent Office, European Office Action for European Application No. 09741883.4, dated Apr. 28, 2011.
(Continued)

*Primary Examiner* — Michael Nghiem
(74) *Attorney, Agent, or Firm* — Ingrassia Fisher & Lorenz, P.C.

(57) ABSTRACT

A digital control system for performing a durability test with a steering test rig is disclosed. The digital control system comprises a learning control device for controlling periodic reference signals in servo actuator systems, such as hydraulic cylinders and electrical motors. This learning device is referred to as POISON (periodic on-line iterative signal optimum navigation) controller. By iterative learning of a corrected reference signal, the POISON controller is able to compensate for control errors which occur in conventional closed loop control systems. In contrast to existing control systems, the POISON controller is capable of permanent online operation. Therefore it is able to compensate for certain changes in the controlled system. The POISON controller can easily be added to existing servo control loops.

4 Claims, 35 Drawing Sheets

(56) References Cited

U.S. PATENT DOCUMENTS

| | | | |
|---|---|---|---|
| 5,343,393 A * | 8/1994 | Hirano et al. | 701/41 |
| 5,511,431 A | 4/1996 | Hinton | |
| 5,852,246 A | 12/1998 | Fiedler et al. | |
| 5,952,582 A | 9/1999 | Akita et al. | |
| 2004/0153228 A1 * | 8/2004 | Matsumoto et al. | 701/41 |
| 2007/0262640 A1 * | 11/2007 | Szczerba et al. | 303/113.4 |
| 2010/0211263 A1 * | 8/2010 | Lindenstruth | 701/41 |

OTHER PUBLICATIONS

International Search Report for International Application No. PCT/EP2008/003621 dated Sep. 4, 2009.

International Search Report for International Application No. PCT/EP2009/003240 dated Aug. 25, 2009.

* cited by examiner

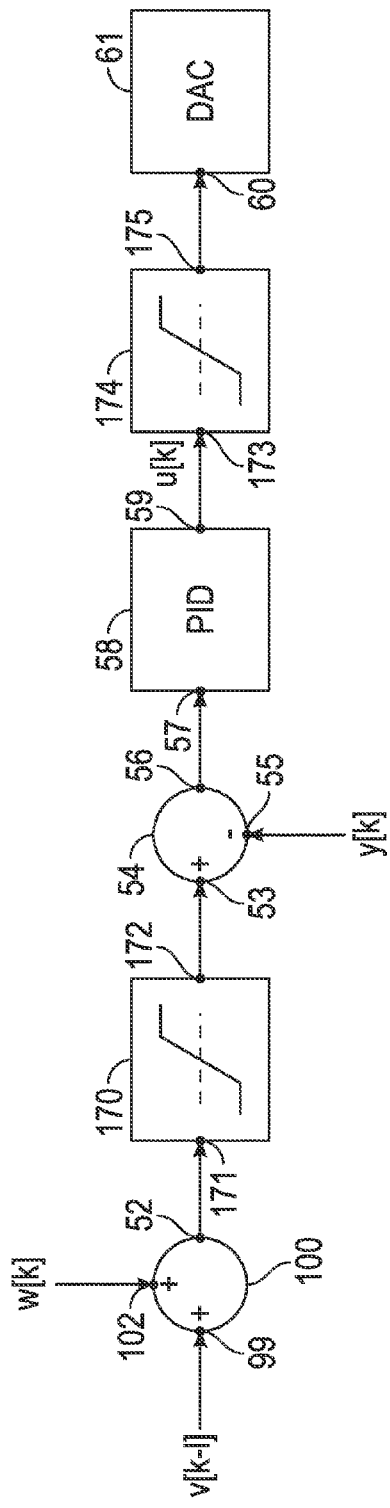
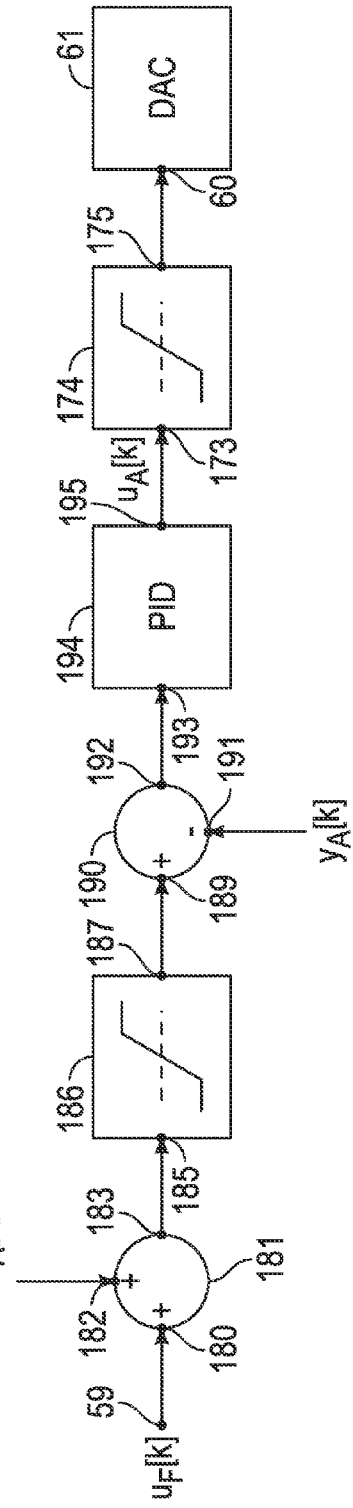

DIGITAL CONTROLLER FOR AN AUTOMOTIVE STEERING TEST RIG

CROSS-REFERENCE TO RELATED APPLICATIONS

This application is a U.S. National-Stage entry under 35 U.S.C. §371 based on International Application No. PCT/EP2009/003240, filed May 6, 2009, which was published under PCT Article 21(2) and which claims priority to International Application No. PCT/EP2008/003621, filed May 6, 2008, which are all hereby incorporated in their entirety by reference.

TECHNICAL FIELD

The application relates to a control device for the control of periodic reference signals in servo actuator systems, such as an automotive steering test rig.

BACKGROUND

Hydraulic test rigs for durability tests are commonly used in the vehicle industry to test components of an automobile. For example, they serve to perform vibration tests and tests on the vehicle suspension and the steering mechanism. During a test run of a typical durability test, the component is subjected to a periodically repeated load for a predetermined time period. After the test run, the component is examined for changes or damages. The reference pattern of the load must be reproduced as accurately as possible to ensure well defined testing conditions. To this end, a feedback controller compares a reference curve with a feedback signal from a sensor in a thereby defined controlled system. Subsequently, the controller generates a control signal and sends the control signal to an actuator of the controlled system. Thereby, a control loop is defined which is also called a servo control loop.

In servo control loops, there is usually a control deviation between a reference signal and a feedback signal of the controlled system. This deviation is due to the transfer function or due to a disturbance reaction of the controlled system. The deviation may include overshoots, amplitude or phase errors.

Conventional servo control loops use a PID controller as a feedback controller. However, the quality of control for a conventional servo control loop is often not sufficient.

A known method to correct for the disturbance reactions in a test rig is therefore to perform a preliminary run of the test rig and to compute a corrected reference signal from this preliminary run. During the test run, the feedback controller uses the corrected reference signal instead of the original reference signal. This cumbersome method makes use of the repeated nature of a typical durability test.

Another known method is the use of an adaptive controller. The adaptive controller measures the system response. During a test run, the adaptive controller adapts its parameter settings accordingly. This method is able to compensate for some changes in the controlled system.

BRIEF DESCRIPTION OF THE DRAWINGS

The present invention will hereinafter be described in conjunction with the following drawing figures, wherein like numerals denote like elements,
FIG. 9 illustrates a PID controller in the controller of FIG. 5;
FIG. 10 illustrates the usage of a second PID controller for an angular correction in the controller of FIG. 5.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. In the following description, details are provided to describe the embodiments of the application. It shall be apparent to one skilled in the art, however, that the embodiments may be practiced without such details.

Figure 1:
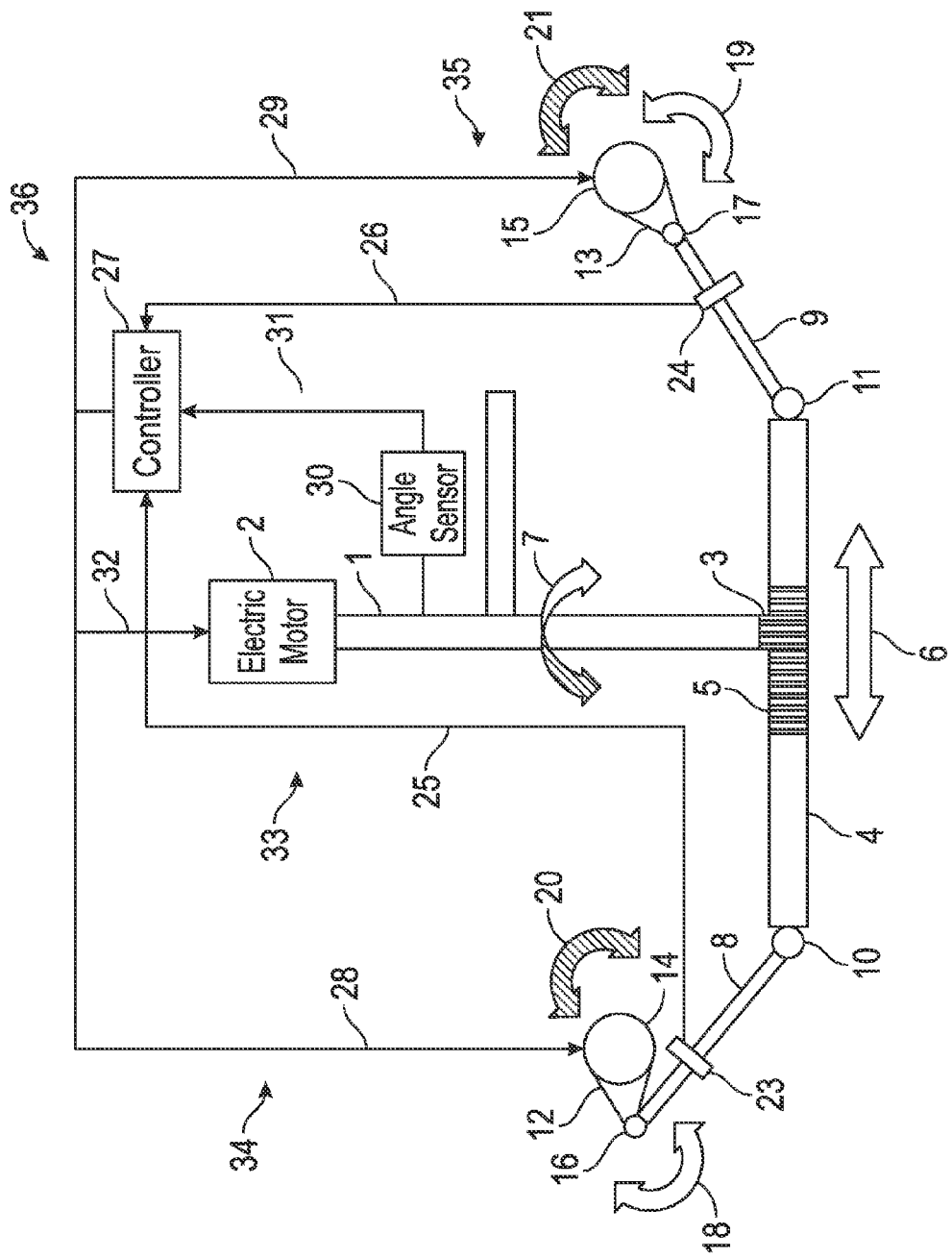
FIG. 1 illustrates a steering test rig with a controller.

FIG. 1 shows a schematic overview of a steering test rig 36. Comma separated numbers in the following figure description indicate corresponding elements on the right and the left side of the steering test rig 36, respectively.

The steering test rig 36 comprises a central steering shaft 1 which is pivoted along its longitudinal axis. An arrow 7 indicates rotation of the steering shaft around its axis. The upper end of the steering shaft 1 is connected to an electric motor 2.

A steering rack 4 is mounted at the lower end of the steering shaft 1 in such a manner that it is movable in a horizontal direction. The possible horizontal movement of the steering rack is indicated by an arrow 6. Mounting elements of the steering rack 4 are not shown in FIG. 1.

The steering shaft 1 is connected to the steering rack 4 via a rack and pinion steering gear arrangement. The steering gear comprises a pinion 3, which is provided at the lower end of the steering shaft 1, and teeth 5 which are provided on an upper surface of the steering rack 4. The teeth 5 mesh with teeth of the pinion 3.

On each side of the steering rack 4 there are provided tie rods 8, 9. The inner ends of the tie rods 8, 9 are attached to the steering rack via first ball joints 10, 11. The outer ends of the tie rods 8, 9 are attached to lever arms 12, 13 of vertical columns 14, 15 via second ball joints 16, 17. The columns 14, 15 pivot about their respective longitudinal axes and they are also moveable in a vertical direction. The rotation about their respective vertical axes is indicated by arrows 18, 19. The vertical movement of the columns 14, 15 is not illustrated in FIG. 1. Each of the columns 14, 15 is coupled to one torque actuator and to one vertical actuator, respectively. These actuators and the way of coupling the columns 14, 15 to the actuators are not shown in FIG. 1. The torques which are generated by the torque actuators are indicated by arrows 20, 21. Hydraulic servo valves control the flow of pressurized fluid towards the torque actuators and the lift actuators of the columns 14, 15. FIG. 1 does not show the hydraulic system that is provided at the steering test rig 36.

Load cells 23, 24 are attached to the tie rods 8, 9. Cables 25, 26 connect the load cells 23, 24 to a controller 27. Cables 28, 29 connect the controller 27 to the torque actuators. An angle sensor 30 is connected to the steering shaft 1. A cable 31 connects the angle sensor 30 to the controller 27. A cable 32 connects the controller 27 to the motor 2.

During a test run, the electric motor 2 of the test rig 36 turns the steering shaft 1 periodically to the left and then to the right. This rotation of the steering shaft is indicated by the arrow 7. A pinion 3 at the lower end of the steering shaft 1 transfers the rotation of the steering shaft 1 to a horizontal movement of the steering rack 4. When the steering shaft 1 turns to the left, the steering rack moves to the right. This movement is indicated by arrow 6. The ball joints 10, 11 transfer the movement of the steering rack 4 to the tie rods 8, 9.

Second ball joints 16, 17 transfer the movement of the tie rods 8, 9 to lever arms 12, 13. The lever arms 12, 13 convert the movement of the tie rods 8, 9 into a rotation of the columns 14, 15. Torque actuators apply torques to the columns 14, 15. The torques, which are indicated by arrows 20, 21, oppose the motion of the tie rods 8, 9. Each time when the electric motor 2 turns the steering shaft 1 to the left, the lever arm 12 exerts a thrust force on the right tie rod and the lever arm 13 exerts a traction force on the left tie rod. When the steering shaft 1 turns to the right, the forces reverse directions. Lift actuators, which are not shown in FIG. 1, keep the columns 14, 15 at a constant lifting height. The lift actuators simulate the spring deflection at the steering knuckles of a vehicle.

The load cells 23, 24 which are coupled to the tie rods 8, 9 convert the force on the tie rods 8, 9 into actual value signals and send the actual value signals to the controller 27 via the connections 25, 26. Similarly, the angle sensor 30 measures the steering angle of the steering shaft 1, generates an actual values signal and sends this signal to the controller 27.

The controller 27 receives the actual value signal from the angle sensor 30 via the connection 31. The controller 27 uses the actual value signal to generate a control signal and sends the control signal via the connection 32 to the electric motor 2 which turns the steering shaft 1. This defines a first control loop. All parts which are controlled by the first control loop define a controlled system 33.

Likewise, the controller 27 receives an actual value signal via the connection 25 from the load cell 23 which is connected to the right tie rod 8. The controller 27 uses the actual value signal to generate a control signal and sends the control signal via the connection 28 to the right torque actuator. This defines a second control loop. All parts which are controlled by the second control loop define a controlled system 34.

Likewise, the controller 27 receives an actual value signal via the connection 26 from the load cell 24 which is connected to the left tie rod 9. The controller 27 uses the actual value signal to generate a control signal and sends the control signal via the connection 29 to the left torque actuator. This defines a third control loop. All parts which are controlled by the third control loop define a controlled system 35.

Figure 2:
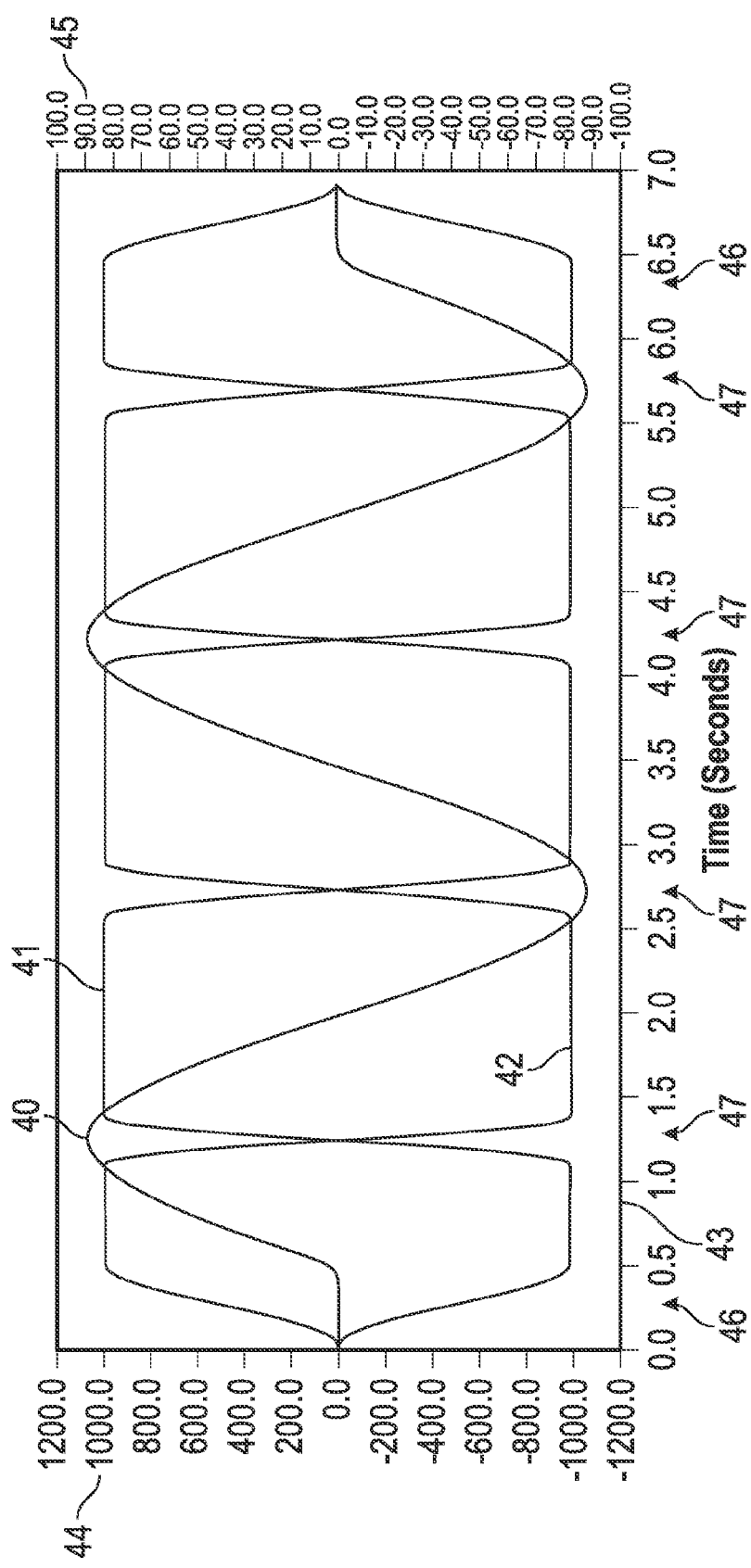
FIG. 2 illustrates reference signals for the operation of the test rig of FIG. 1.

FIG. 2 shows graphically a reference signal 40 for the steering angle of the steering shaft 1 of FIG. 1, a reference signal 41 for the left torque actuator of FIG. 1 and a reference signal 42 for the right torque actuator of FIG. 1. Here and in the following, the term "reference signal" refers to a desired output signal at a sensor in a controlled system. The desired output signal is achieved by controlling the output of an actuator. In the following, a "reference signal" is also referred to as a reference signal for an actuator or a reference signal for a quantity, here of a force value or of an angle. A horizontal axis 43 in FIG. 2 indicates the time in seconds, a left vertical axis 44 indicates the force in Newton (N) and a right vertical axis 45 indicates the steering angle in degrees.

During a test run of the test rig 36, the controller 27 of FIG. 1 has the task of controlling the actuators of FIG. 1 such that the signals measured by the angle sensor 30 and the load cells 23, 24 of FIG. 1 follow the reference signals shown in FIG. 2.

Plateaus of the reference signals 41, 42 at +/−1000 N indicate that each of the torque actuators of FIG. 1 is to apply a force to the columns 13, 14 of FIG. 1 such that the tie rods 8, 9 of FIG. 1 experience a constant force of 1000 N which opposes the steering movement. Steep rising/falling signal portions of the reference signals 41, 42 indicate when the forces of the torque actuators reverse their respective direction. The direction reversal takes place before the movement of the steering shaft begins, after the movement of the steering shaft ends and each time when the movement of the steering shaft reverses direction.

Due to friction effects in the two actuators of the columns 14, 15 of FIG. 1, torque impacts arise at times 46 at the beginning of the steering movement, when the steering movement ends and at times 47 during a direction reversal of the steering movement. The digital controller 27 of FIG. 1 is able to counteract those torque impacts, as will be shown with reference to the FIGS. 20, 23, 26 and 28.

Figure 3:
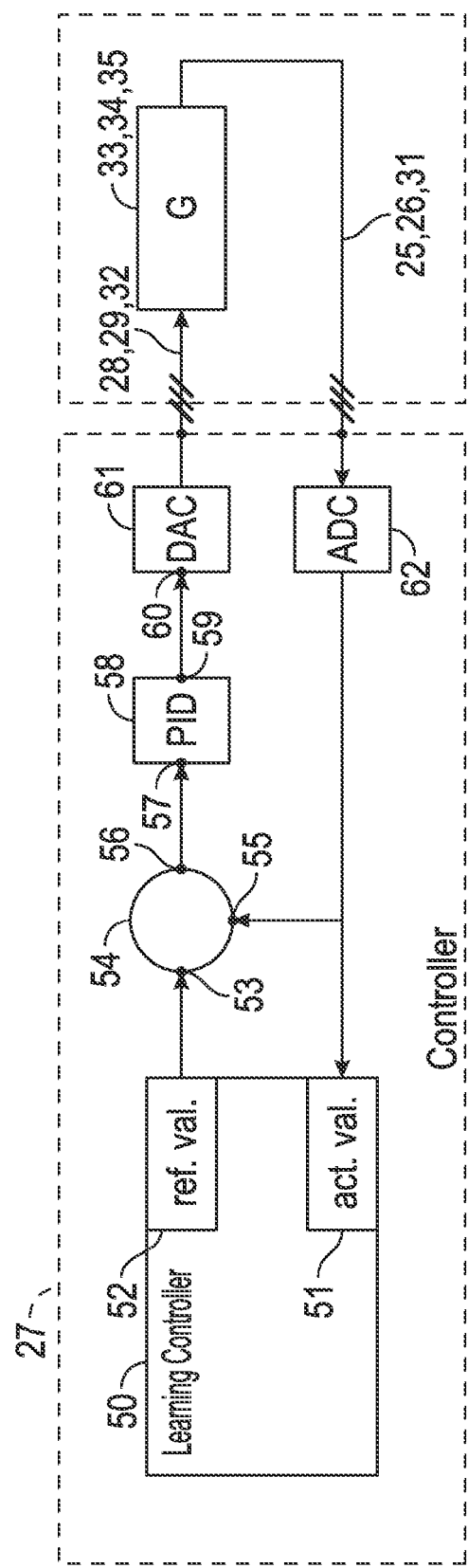
FIG. 3 illustrates a schematic diagram of the controller of FIG. 1.

FIG. 3 shows the digital controller 27 of FIG. 1 in greater detail with a learning controller 50 which comprises adaptive control components. The provision of the learning controller 50 leads to an improved quality of control for periodic reference signals. The learning controller 50 will also be referred to as POISON controller wherein the acronym "POISON" stands for 'Periodic on-line iterative signal optimum navigation'.

The digital controller 27 further comprises a digital to analog converter (DAC) 61, an analog to digital converter (ADC) 62 and further computation units which are described below. The DAC 61 has several input channels for reading in a digitized control signal and also several output channels for sending analog control signals to a controlled system. In the same way, the ADC 62 has several input channels for reading in an analog actual value signal from a controlled system and several output channels for output of a digitized actual value signal. The input channels of the ADC are referred to as input channels of the digital controller 27 and the output channels of the DAC are referred to as the output channels of the digital controller 27.

An input 51 of the POISON controller 50 is connected to an output channel of the ADC 62. The input channels of the ADC 62 are connected to inputs of the digital controller 27. An output 52 of the POISON controller 50 is connected to an input 53 to an adder 54. A second input 55 to the adder 54 is connected to an output channel of the ADC 62. The output channels of a digital analog converter (DAC) 61 are connected to outputs of the digital controller 27. The POISON controller 50 further comprises memory sections containing—among others—stored reference signals, correction signals and parameter settings for each controlled system 33, 34, 35 of FIG. 1.

An output 56 of the adder 54 is connected to an input 57 to a system controller 58. An output 59 of the system controller 58 is connected to an input channel of the DAC 61.

Outputs of the digital controller 27 are connected to inputs of the controlled systems 33, 34, 35 of FIG. 1 via the connections 28, 29, 32 of FIG. 1. Inputs of the digital controller 27 are connected to outputs of the controlled systems 33, 34, 35 of FIG. 1 via connections 25, 26, 31.

For each channel that is connected to one of the controlled systems 33, 34, 35 of FIG. 1 there is a separate POISON controller 50, a separate adder 54 and a separate system controller 58. They are connected to the DAC 61 and the ADC 62 in the same way as shown in FIG. 3. For reasons of clarity, in FIG. 3 this detail is shown for one controlled system. A set of three parallel lines at the connections 28, 29, 32 indicates that there are provided three output channels which connect the DAC 61 to the controlled systems 33, 34, 35. Another set of three parallel lines at the connections 25, 26, 31 indicates the provision of three input channels which connect the controlled systems 33, 34, 35 to the ADC 62.

FIG. 3 also illustrates the function of a POISON controller as part of the digital controller 27 in a control loop.

The POISON controller 50 receives a digitized actual value signal from an output channel of the ADC 62. It uses the stored correction signal, the stored reference signal and the digitized actual value signal to compute a new correction signal. The stored correction signal is overwritten with the new correction signal. The POISON Controller 50 generates a corrected reference signal from the sum of the new correction signal and the stored reference signal and sends the corrected reference signal to the output 52 of the POISON controller.

The adder 54 receives the corrected reference signal from the POISON controller 50 and also a digitized actual value signal from one of the output channels of the ADC 62. The adder 54 then generates a control error signal by subtracting the digitized actual value signal from the corrected reference signal. The adder 54 sends the error signal to the system controller 58. The system controller 58 uses the control error signal from the adder 54 to compute a control signal. The system controller 58 sends the control signal to an input channel of the DAC 61.

The DAC 61 converts the control signal into an analog control signal and sends it to an input of the controlled system. The controlled system generates a feedback signal. The controlled system sends the feedback signal back to an input channel of the ADC 62.

Figure 4:
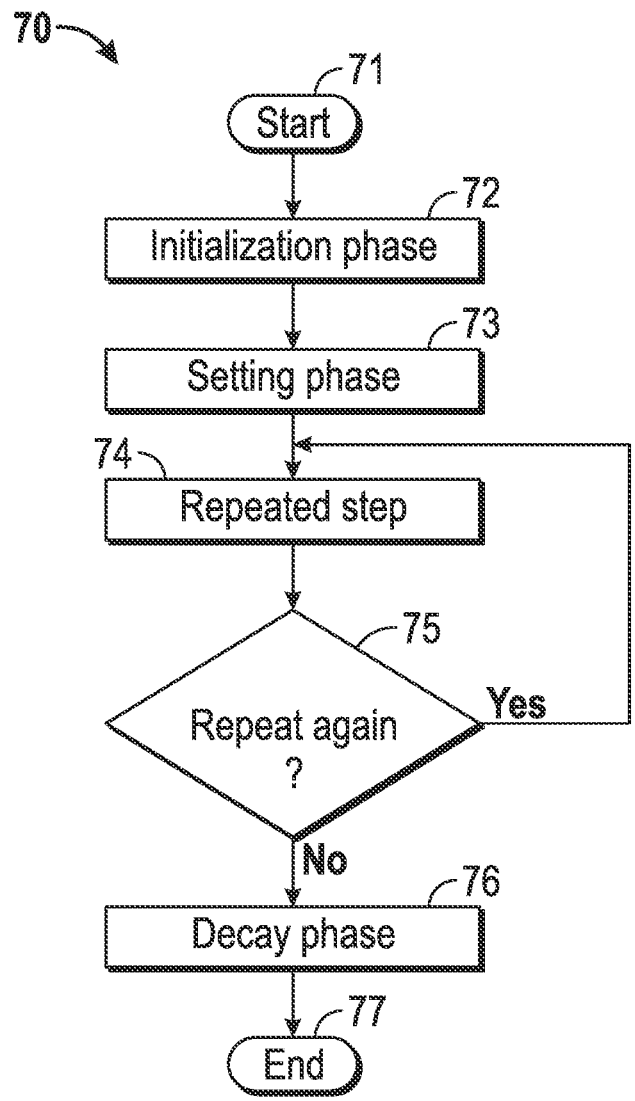
FIG. 4 shows a flow diagram of a simulation run on the steering test rig of FIG. 1.

FIG. 4 illustrates a flowchart of a method to use the digital controller of FIG. 1 in a test run 70 of the test rig 36 of FIG. 1 to perform a durability test on the steering gear of FIG. 1. During the durability test, the steering gear is exposed to a periodically repeated load for a predetermined number of periods.

After a test run has been started, the test rig 36 enters an initialization phase 72, as shown in FIG. 4. During the initialization phase 72, for each controlled system 34, 35, 36 of FIG. 1, the digital controller 27 of FIG. 1 reads in preconfigured values and carries out preliminary calculations.

In a next step, the test rig 36 enters a settling phase 73. During the settling phase 73, for each controlled system 33, 34, 35 of FIG. 1, the digital controller 27 of FIG. 1 uses a first portion of the stored reference signal, hereafter called head section, for the computation of the corrected reference signal and sends the corrected reference signal to the controlled system in order to drive the controlled system to a predefined state.

In a next step the test rig 36 enters a repeated step 74. During the repeated step 74, for each controlled system 33, 34, 35 of FIG. 1, the digital controller 27 of FIG. 1 uses a second portion of the stored reference signal, hereafter called cyclic section, for the computation of the corrected reference signal and sends the corrected reference signal to the controlled system.

In a decision step 75, the POISON controller 50 of FIG. 1 checks if a maximum number of cycles has been reached. If this is not the case, the repeated step 74 is repeated again.

After the last execution of the cyclic section 74 the system enters a step of decay phase 76.

During the decay phase 76, for each controlled system 33, 34, 35 of FIG. 1, the digital controller 27 of FIG. 1 uses a third portion of the stored reference signal, hereafter called tail section, to compute the corrected reference signal and sends the corrected reference signal to the control loop in order to drive the controlled system to a predefined end state.

For explaining the steps of FIG. 4 in closer detail, reference will be made to FIG. 5 which shows in further detail the components between the input 51 and the output 52 of the POISON controller 50 of FIG. 3. These components provide the steps of FIG. 4. Components of the POISON controller 50 comprise an inverting unit 80, an iteration filter 81 and an iteration memory 82.

An input 87 to the inverting unit 80 is connected to an output 84 of an adder 83. The adder 83 comprises input 51 and input 85. The input 51 is equivalent to the input 51 of the POISON controller 50 of FIG. 3. The input 85 of the adder 83 is connected to a reference signal 86. The reference signal 86 is generated by a signal generator which is not shown here. The output 88 of the inverting unit 80 is connected to an input 89 to an adder 90. A second input 91 to the adder 90 is connected to an output 98 of the memory 82. The memory 82 contains a stored correction signal.

An output 92 of the adder 90 is connected to an input 94 to the iteration filter 81. An output 95 of the iteration filter 81 is connected to an input 96 to the memory 82. The output 98 of the memory 82 is connected to a first input 99 to an adder 100. A second input 102 to the adder 100 is connected to the reference signal 86. An output 52 of the adder 100 is connected to an input 53 to the adder 54.

The operation of the POISON controller 50 during the repeated step 74 of FIG. 4 will be explained first. Modifications to the operation of the POISON controller during the settling phase 73 and the decay phase 76 of FIG. 4 will be explained thereafter.

In the following, k refers to a discrete time index and t to a continuous time. The symbols w[k], e[k], v[k], y[k] in FIG. 5 denote digital reference, error, correction and actual value signals. The symbol y(t) denotes an analog actual value signal. f[k], f(t) also refer to the value of a function at discrete time k and continuous time t, respectively. Differences k−l, k−m and k−n refer to a time index within the cyclic section of the reference signal w or in the cyclic section of the correction signal v. If a difference results in a time index before the beginning of a cyclic section, the length of the cyclic section in discrete time units is added to the difference.

During the repeated step 74 of FIG. 4, the adder 100 receives a time-shifted correction signal v[k−l] from the memory 82 and a reference signal w[k]. The reference signal w[k] is generated by the output of a stored reference signal. The adder 100 generates a corrected reference signal by adding the signal v[k−l] to the reference signal w[k] and sends the corrected reference signal to the output 52 of the POISON controller.

During the repeated step 74 of FIG. 4, the POISON controller 50 further receives a digitized actual value signal y[k] from one of the output channels of the ADC 62. The adder 83 generates an error signal e[k] by subtracting the digitized actual value signal from the reference value signal w[k]. The inverting unit 80 receives the error signal e[k] and computes a first output signal. The adder 90 receives the first output signal at the input 89 and a time shifted correction signal v[k−m] from the memory 82 at the input 91 and generates a second output signal by adding the first output signal to the signal v[k−m]. The adder 90 sends the second output signal to the input 94 to the iteration filter 81. The iteration filter 81 computes a corrected reference signal v[k]. The signal v[k] is time shifted by −n and the resulting signal v[k−n] is stored in the memory 82.

During the next execution of the repeated step 74, the adder 100 uses the stored signal v[k−l] in memory 82 to compute a corrected reference value in the way described before.

The time shift l is used to compensate for a time lag in the response of the controlled systems 33, 34, 35 whereas the time shifts m and n compensate time shifts that are introduced by the inverting unit 80 and the iteration filter 81. The inverting unit 80 and the iteration filter 81 use past signal values in their computations. Therefore, the result of the computations correspond to an earlier time.

During the last execution of step 74, the correction signal is also saved to the first and the last half cycle of the stored correction signal v[k]. This will be further explained with reference to FIGS. 16 and 17.

During the settling phase 73 of FIG. 4, fading in of the correction signal v[k] with a fade factor F between 0 and 1 takes place, before the correction signal is written to memory. This fading occurs for time indices k−l referring to the signal portion of the reference signal before the first half cycle. The time shift l in the difference k−l takes into account a time lag in the system response. In the same way, the correction signal is faded out during the decay phase 76 of FIG. 4 for time indices k−l which are after the last half cycle of the reference signal. The fading of the correction signal at the beginning and the end of the test run avoids a numerical instability.

In a further embodiment which is not shown here, two memory buffers are provided for the storage of correction signals. In a repeated step 74, one of the buffers is overwritten with the correction signal vn of the current cycle and the other memory buffer holds the correction signal vn−1 of the last cycle. In a next execution of step 74, the correction signal vn is copied to the second buffer and the first buffer is overwritten. In the case of an abnormal termination of the test run, the last cycle vn of the correction signal may be corrupted, whereas the previous cycle vn−1 can be recovered. Several options of terminating a test run 70 are explained with reference to the description of FIG. 18.

Figure 5:
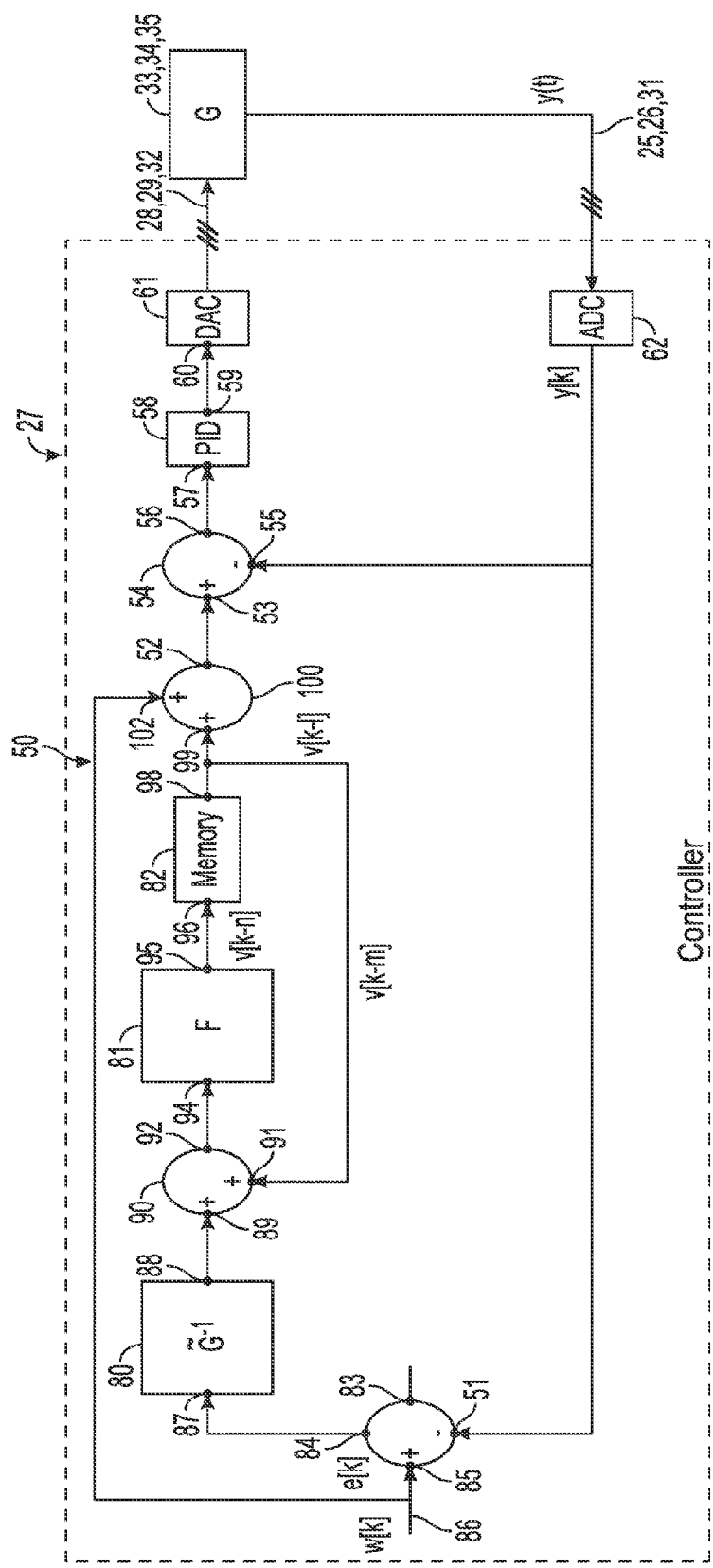
FIG. 5 illustrates a signal flow diagram of the controller of FIG. 3 in further detail.
Figure 6:
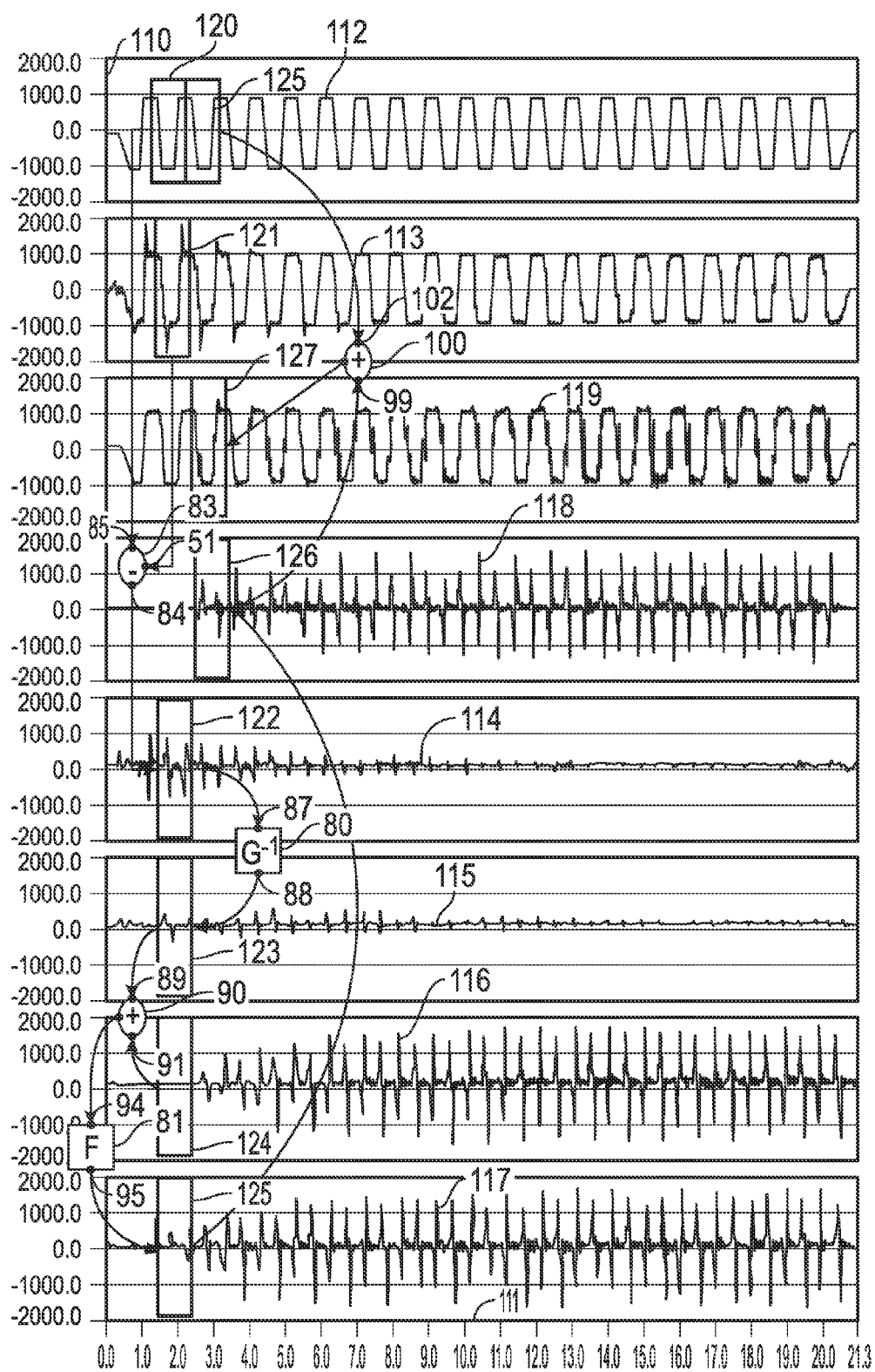
FIG. 6 illustrates signals at various points in the controller of FIG. 5.

FIG. 6 shows signals which result at various input and output nodes of the controller of FIG. 5. The FIG. 6 further illustrates the calculation steps which were explained with reference to FIG. 5.

A vertical scale 110 for each signal is given in Newton and a horizontal scale 111 is given in seconds. A curve 112 in the first row of FIG. 6 shows a reference signal for the left load cell 24. A curve 113 in the next row shows the input signal at the input 85 to the adder 83. The curve 113 is the actual value signal which is measured by the left load cell 24. A curve 114 in the fifth row shows the control error. The control error is the difference of the actual value signal from the second row and the reference signal from the first row.

A curve 115 in the sixth row shows an output signal of the inverting unit 80. A curve 116 in the seventh row shows the correction signal v[k−m] at the input 91 to the adder 90 of FIG. 5. A curve 117 in the eighth row shows the output signal at the output 95 of the iteration filter 81 of FIG. 5.

During the first cycle, a time segment 121 of curve 113 is subtracted from a time segment 120 of curve 112. This results in the time segment 122 of the curve 114 which is the control error of the first cycle. The time segment 122 is then processed by the inverting unit 80 of FIG. 5 which results in a time segment 123 of curve 115. The time segment 123 is then added to a time segment 124 of the stored correction signal. As the stored correction signal was initialized to zero, there is no correction signal present during the first cycle. The sum of the segments 123, 124 is then processed by the iteration filter 81 of FIG. 5. This results in a time segment 125 of the correction signal from the first cycle.

In the next cycle, the time segment 125 appears as a time segment 126 of the curve 118. The sum of the time segment 126 and a time segment 125 from the second cycle of the reference signal 112 results in a time segment 127. In the second cycle, the time segment 127 is used as corrected reference signal.

Figure 7:
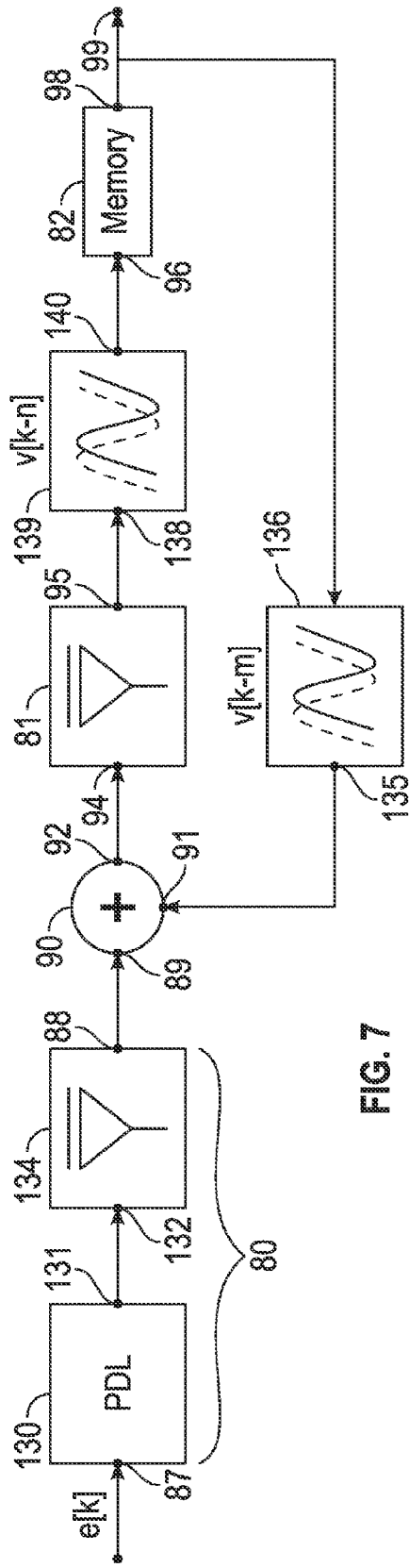
FIG. 7 illustrates in further detail the controller of FIG. 5.

FIG. 7 illustrates in further detail the inverting unit 80 and the iteration filter 81 of FIG. 5. The inverting unit 80 of FIG. 5 comprises an inverse system controller 130 which is also referred to as PD lag (PDL) controller, and a first moving average filter 134. The PD lag controller 130 is a special case of a PIDL controller which will be explained with reference to FIG. 8. The iteration filter 81 comprises a second moving average filter.

The output 84 of the adder 83 of FIG. 5 is connected to an input 87 to the PDL controller 130. An output 131 of the PDL controller 130 is connected to an input 132 to the first moving average filter 134. An output 88 of the first moving average filter 134 is connected to a first input 89 to the adder 90. A second input 91 to the adder 90 is connected to an output 135 of a first back-shift element 136 which is in turn connected to the output 98 of the memory 82.

The output 92 of the adder 90 is connected to an input 94 to the second moving average filter 81. An output 95 of the second moving average filter 81 is connected to an input 138 to the second back-shift element 139. An output 140 of the second back-shift element 139 is connected to the input 96 to the memory 82.

FIG. 7 also illustrates in further detail the signal processing between the output 84 of the adder 83 and the input 99 to the adder 100 of FIG. 5. The PDL controller 130, which will be explained with reference to FIG. 8, receives the error signal e[k] from the adder 83 and generates an output signal. The output signal of the PDL controller 130 is smoothed by the moving average filter 134. As mentioned in the description of FIG. 5, the adder 90 adds the time shifted correction signal v[k−m] from the last cycle to the output signal of the moving average filter 134. The time shift by −m time steps is symbolized by the time shift element 136.

The moving average filter 81 receives the output signal of the adder 90 and generates a smoothed output signal at the output 95. The output signal of the moving average filter 81 is time shifted by −n time steps. This is symbolized by the time shift element 139. The output signal of the time shift element 139 is the correction signal which will be used in the next cycle. As mentioned in the description of FIG. 5, the memory 82 stores the correction signal v[k−n].

Figure 8:
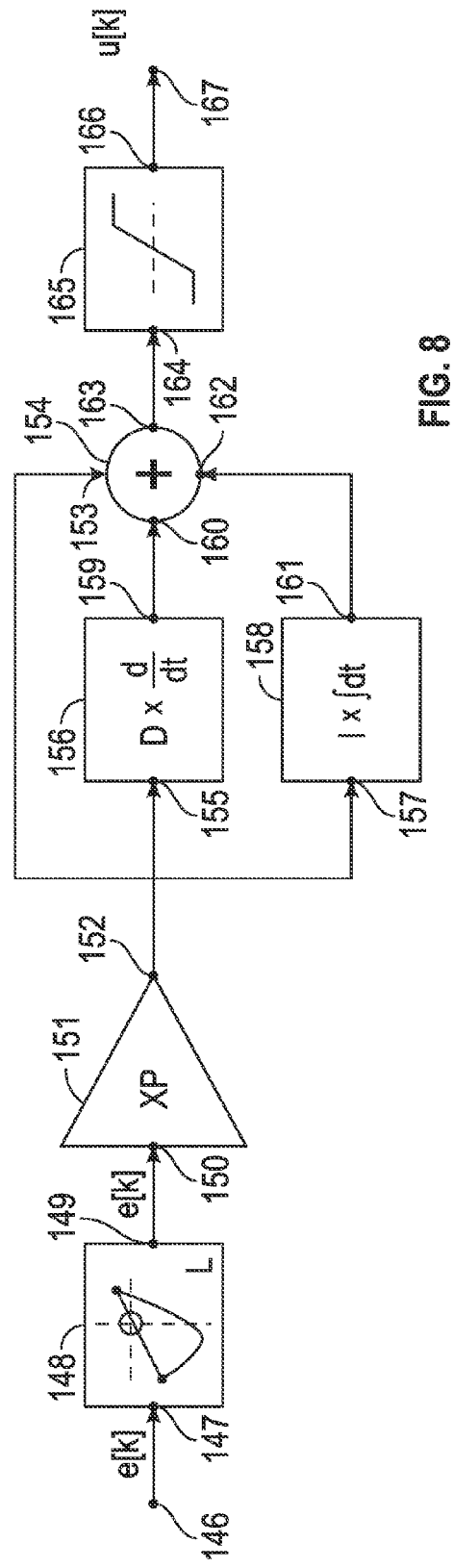
FIG. 8 illustrates a PID lag controller in the controller of FIG. 5.

FIG. 8 illustrates the composition of a proportional-integral-derivative lag (PIDL) controller which is used in the digital controller 27 of FIG. 5. The system controller 58 and the second system controller 194 shown in FIGS. 3 and 10 are configured as PIDL controllers. In the following, both expressions, PID and PIDL controller are used for the controllers 58 and 194. A PID lag controller without an integrator component will be referred to as a PDL controller. The inverse system controller 130 of the inverting unit 80 of FIG. 5 is configured as a PDL controller.

An input 146 to the PID lag controller is connected to an input 147 to a lag element 148. An output 149 of the lag element 148 is connected to an input 150 to a multiplier 151. The output 152 of the multiplier 151 is connected to a first input 153 to an adder 154, to an input 155 to a differentiator 156 and to an input 157 to an integrator 158. An output 159 of the differentiator 156 is connected to a second input 160 to the adder 154. An output 161 of the integrator 158 is connected to a third input 162 to the adder 154. An output 163 of the adder 154 is connected to an input 164 to an output limiter 165. An output 166 of the output limiter 165 is connected to an output 167 of the PIDL controller.

A lag element 148 receives an error signal e[k] via the input 147. The lag element 148 generates an averaged error signal by computing a weighted sum from a current value e[k] and a previous value e[k−1] of the error signal e[k]. A weight factor L of the lag element 148 allows adjustment of the weighted sum.

The multiplier 151 receives the output signal of the lag element 148 at the input 150 and multiplies the signal by a factor P. The differentiator 156 receives the output signal of the multiplier 151, computes a time derivative of the signal by a backward differentiation formula and multiplies the result by a parameter D. The integrator 158 receives the output signal of the multiplier 151, computes the integral over past values of its input signal by a numerical integration formula and multiplies the result by a factor I.

The adder 154 generates an output signal at its output 163 by summing up the output signal of the multiplier 151, the output signal of the differentiator 156 and the output signal of the integrator 158. The output limiter 165 receives the output signal of the adder 154 at the input 164. The output limiter 165 limits the output signal of the adder 154 by an upper limit and a lower limit and sends the resulting signal u[k] to the output 167 of the PIDL controller. The output limiter 165 of the PIDL controller prevents numerical instability by integral windup.

The parameters P, D and I allow the adjustment of the relative contributions of the three input signals from the inputs 153, 160, 162 of the adder 154.

FIG. 9 illustrates in further detail the signal processing units between the adder 100 and the DAC 61 of the POISON controller 50 of FIG. 5. In addition to the signal processing units of FIG. 5, FIG. 9 shows two output limiters 170, 174 which are not shown in FIG. 5. The output 52 of the adder 100 of FIG. 5 is connected to an input 171 to the first output limiter 170. The output 172 of the first output limiter 170 is connected to the input 53 to the adder 54 of FIG. 5. The output 59 of the system controller 58 of FIG. 5 is connected to an input 173 to the second output limiter 174. An output 175 of the second output limiter 174 is connected to an input channel of the DAC 61.

FIG. 9 also illustrates how a stored correction signal is used for generating a control signal for the controlled systems 33, 34, 35 of FIG. 1.

The adder 100 receives a time shifted correction signal v[k−1] from the output 98 of the memory 82 of FIG. 5 at its first input 99. The adder 100 receives a reference signal w[k] at its second input 102 and generates a corrected reference signal at the output 52 by summing up the correction signal v[k−1] and the reference signal w[k]. The output limiter 170 limits the corrected reference signal by a lower limit and an upper limit and sends the output to the input 53 of the adder 54. The adder 54 receives an actual value signal y[k] at the input, sums up the input signals and sends the resulting signal to the system controller 58.

The system controller 58 computes a control signal and sends the result to the input 173 of the output limiter 174. The output limiter 174 limits the output signal of the system controller 58 to a predefined voltage range and sends the resulting signal to the input to the DAC 61. The DAC 61 converts the output signal of the output limiter 174 into an analog control signal and sends the analog control signal to one of the controlled systems 33, 34, 35 of FIG. 1.

FIG. 10 shows the use of additional components between the output 59 of the system controller 58 of FIG. 9 and the input 173 to the output limiter 174 of FIG. 9. This provides an angular correction to the output result of the system controller 58 of FIG. 9. The angular correction applies to the control of the controlled systems 34 and 35 of FIG. 1. The angular correction uses the steering angle and a column angle as additional information for the control of the servo actuators in the controlled systems 34, 35. The column angle indicates the rotation of the respective column.

In FIG. 10, the output 59 of the system controller 58 is connected to a first input 180 to an adder 181. A weighted actual value signal for the steering angle is connected to a second input 182 to the adder 181. An output 183 of the adder 181 is connected to an input 185 to an output limiter 186. An output 187 of the output limiter 186 is connected to an input 189 to an adder 190. A second input 191 to the adder 190 is connected to an actual value signal from an angle sensor for a column angle. An output 192 of the adder 190 is connected to an input 193 to a second system controller 194. An output 195 of the second system controller 194 is connected to an input 173 to the output limiter 174.

FIG. 10 also shows the use of additional components between the output 59 of the system controller 58 of FIG. 9 and the input 173 to the output limiter 174 of FIG. 9 to apply an angular correction to the output signal of the system controller 58 of FIG. 9. This angular correction is used in the control of the torque actuators.

In FIG. 10, the system controller 58 of FIG. 9 is used as an outer system controller 58 which controls a second system controller 194 which is also addressed as PIDL controller 194. The PIDL controller 58 of FIG. 8 will generally use different parameter values P, I, D, L when the additional angular correction of FIG. 10 is applied.

The adder 181 receives the output signal of the system controller 58 at the first input 180 and the reference signal for the steering angle which is multiplied by a weighting factor G at the second input 182. The adder 181 generates an output signal at the output 183 by summing up the input signals and sends the output signal to the input 185 of the output limiter 186. The output limiter 186 limits the output signal of the adder 181 between a lower limit and an upper limit and sends the result to the input 189 of the adder 190. The adder 190 receives an actual value signal for the corresponding column angle at the second input 191, generates an output signal by summing up the input signal and sends the output signal to the input 193 of the second system controller 194. The second system controller 194 computes a control signal and sends the control signal to the input to the output limiter 174 of FIG. 9.

Figure 11:
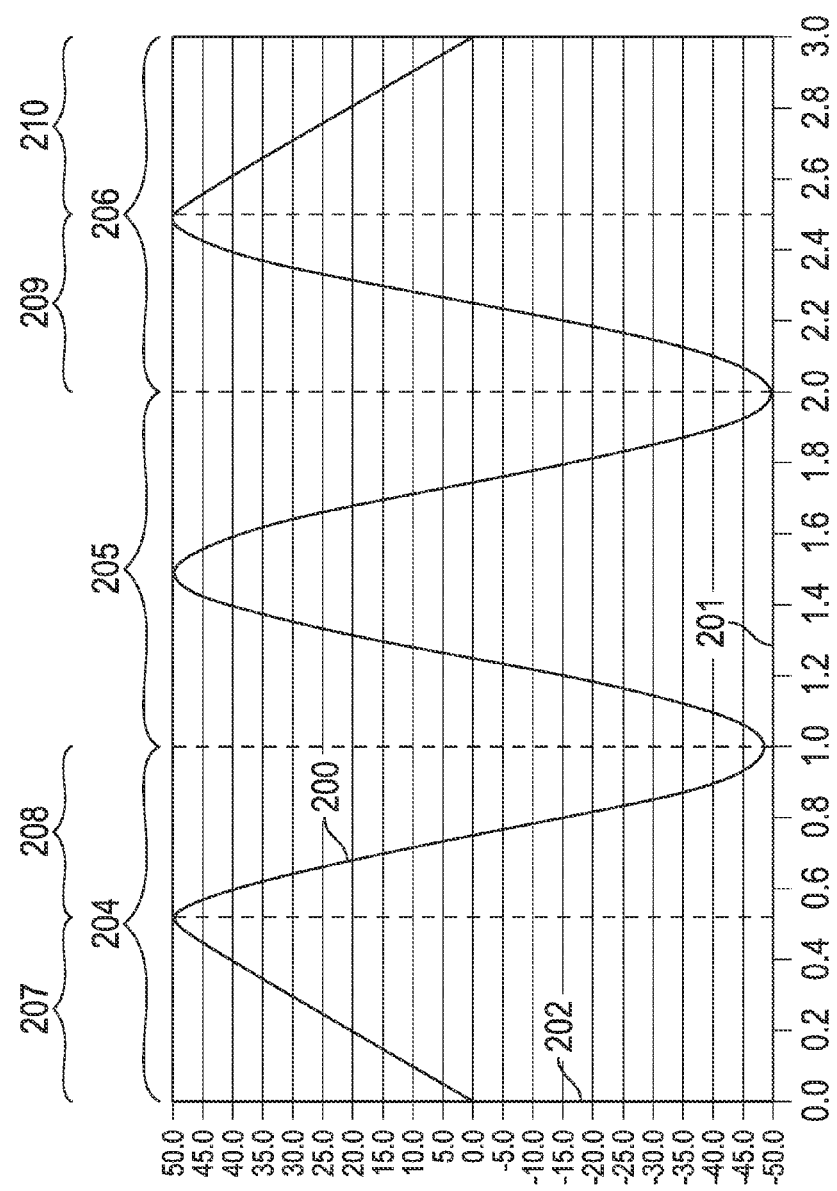
FIG. 11 illustrates a stored signal for generating the reference signal of a steering angle in the test rig of FIG. 1.

FIG. 11 shows a stored reference signal 200 for a steering angle. A time scale in seconds is indicated by a horizontal axis 201. An angle scale in degrees is given by a vertical axis 202. Positive values on the vertical axis 202 indicate steering to the right and negative values indicate steering to the left.

The stored reference signal 200 comprises a head section 204, a cyclic section 205 and a tail section 206. These signal sections have been mentioned above in the description of the steps 73, 74, 76 of FIG. 4. The head section 204 is subdivided into a first portion 207 which contains a linear ramp and a second portion 208 which contains a half cycle of a periodic signal. The cyclic section 205 contains one complete cycle of the periodic signal. As with the head section 204, the tail section 206 is subdivided into a first portion 209 and a second portion 210. The first portion 209 contains a half cycle of the periodic signal and the second portion 210 contains a linear ramp.

Figure 12:
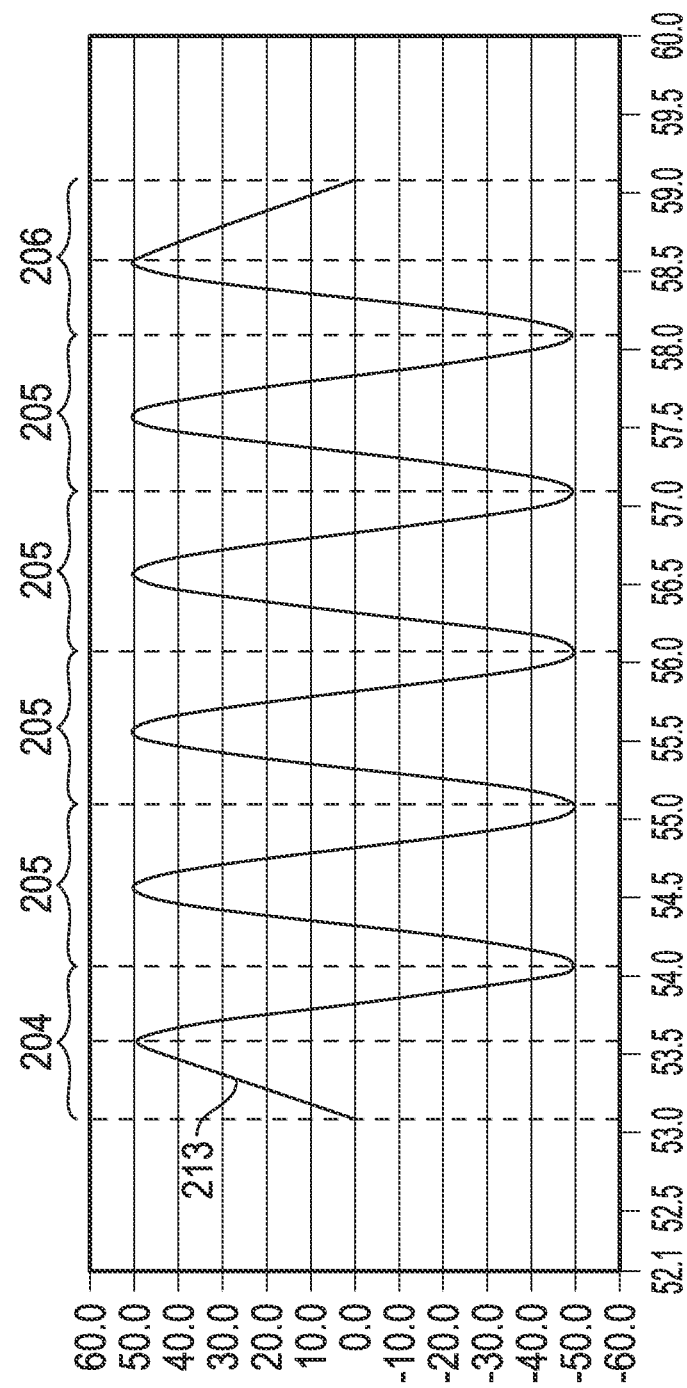
FIG. 12 illustrates a reference signal for the steering angle using the stored signal of FIG. 11.

FIG. 12 shows a reference signal 213 for the steering angle. It contains the head section 204 of FIG. 10, four cycles of the cyclic section 205 of FIG. 10 and the tail section 206 of FIG. 10.

Figure 13:
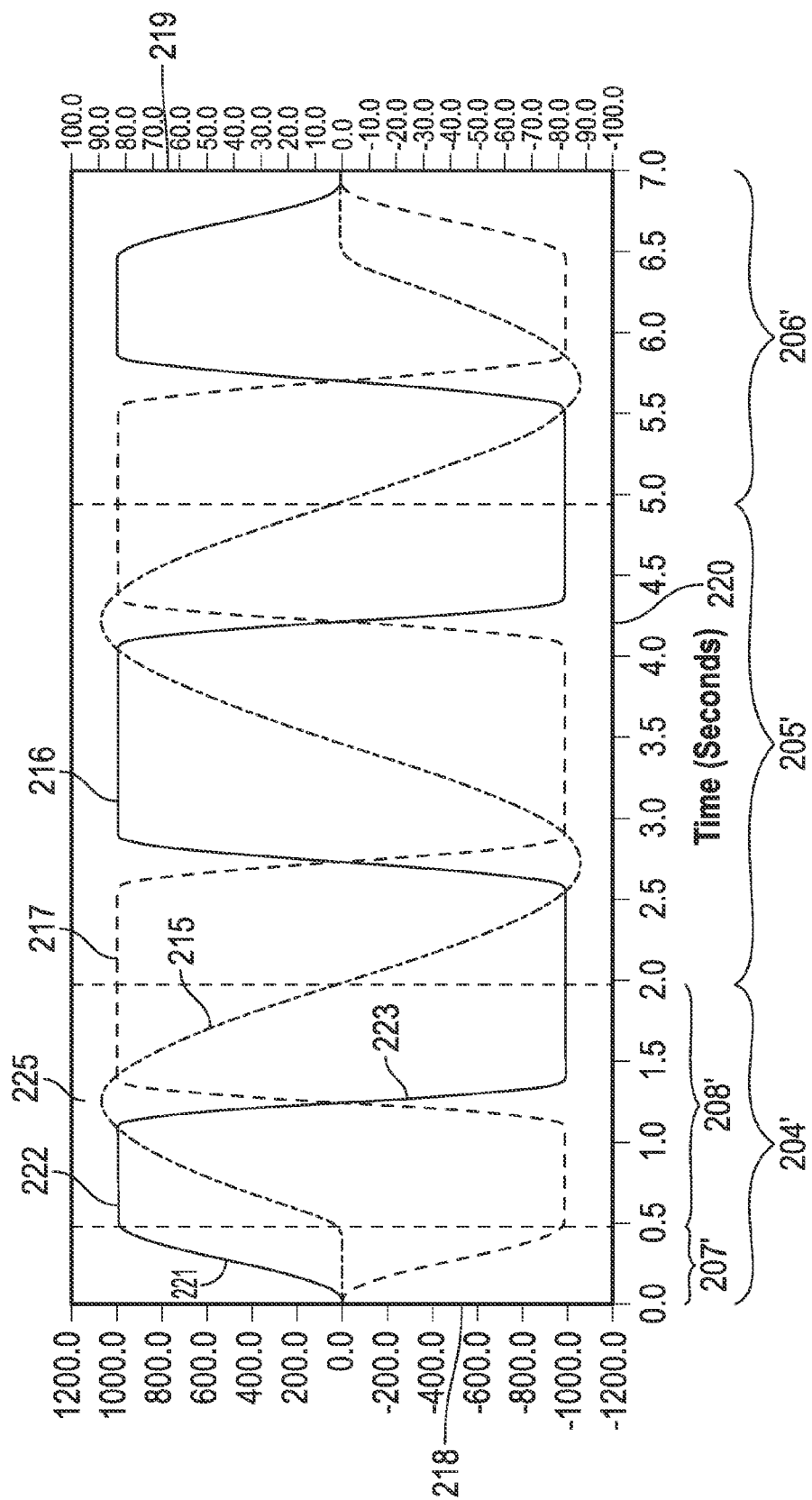
FIG. 13 illustrates reference signals for the actuators of FIG. 1.

FIG. 13 shows three stored reference signals 215, 216, 217. The reference signal 215 refers to the steering angle of the steering shaft 1 of FIG. 1, the reference signal 216 refers to the force Fright on the right tie rod 8 of FIG. 1, the reference signal 217 refers to the force F left on the left tie rod 9 of FIG. 1. A force scale in Newton (N) is given by a vertical axis 218. Positive values on the axis 218 indicate a traction force and negative values indicate a thrust force. An angle scale in degrees is given by a second vertical axis 219. A time scale in seconds is given by a horizontal axis 220. Each of the reference signals 215, 216, 217 comprises a head section 204', a cyclic section 205' and a tail section 206'.

The sections 204', 205', 206' of the reference signal 215 for the steering angle differ from the corresponding signal sections 204, 205, 206 of the reference signal 200 of FIG. 11. In the head section 204' and in the tail section 206' of the stored reference signal 215 the linear ramp portions 207, 210 of FIG. 11 are replaced by a constant value of zero degrees and the first half cycle 208' starts at zero degrees. Consequently, the cyclic part 205' of the reference signal 215 also starts at zero degrees.

The head section 204' of the reference signal 216 comprises a nonlinear ramp 221 from 0 to 1000 N. The nonlinear ramp 221 ends before the first half cycle 208' of the reference signal 215 begins. This results in a traction force of 1000 N which is to be applied to the right tie rod 8 of FIG. 1 before the steering motion of the steering shaft 1 of FIG. 1 begins.

The first half cycle 208' of the reference signal 216 comprises a plateau portion 222 at 1000 N, a transition portion 223 in which the signal 216 changes from 1000 N to −1000 N and a plateau portion at −1000 N. The transition portion 223 is centered around a reversal point 225 of the reference signal 215 for the steering angle and extends over a small fraction of a period 205' of the reference signal 215. Consequently, the traction force of 1000 N on the right tie rod 8 of FIG. 1 is to change to a thrust force of 1000 N over a small time interval which is centered around the reversal point 225 of the steering motion. This results in a constant force of 1000 N which is to be applied to the right tie rod 8 and which opposes the steering motion of the steering shaft 1 of FIG. 1 during most of the time.

The remaining part of the reference signal 216 for the force on the right tie rod 8 of FIG. 1 and the reference signal 217 for the force on the left tie rod 9 of FIG. 1 comprise the same signal portions as the head section 204' of the reference signal 216 and are therefore not explained in further detail.

Figure 14:
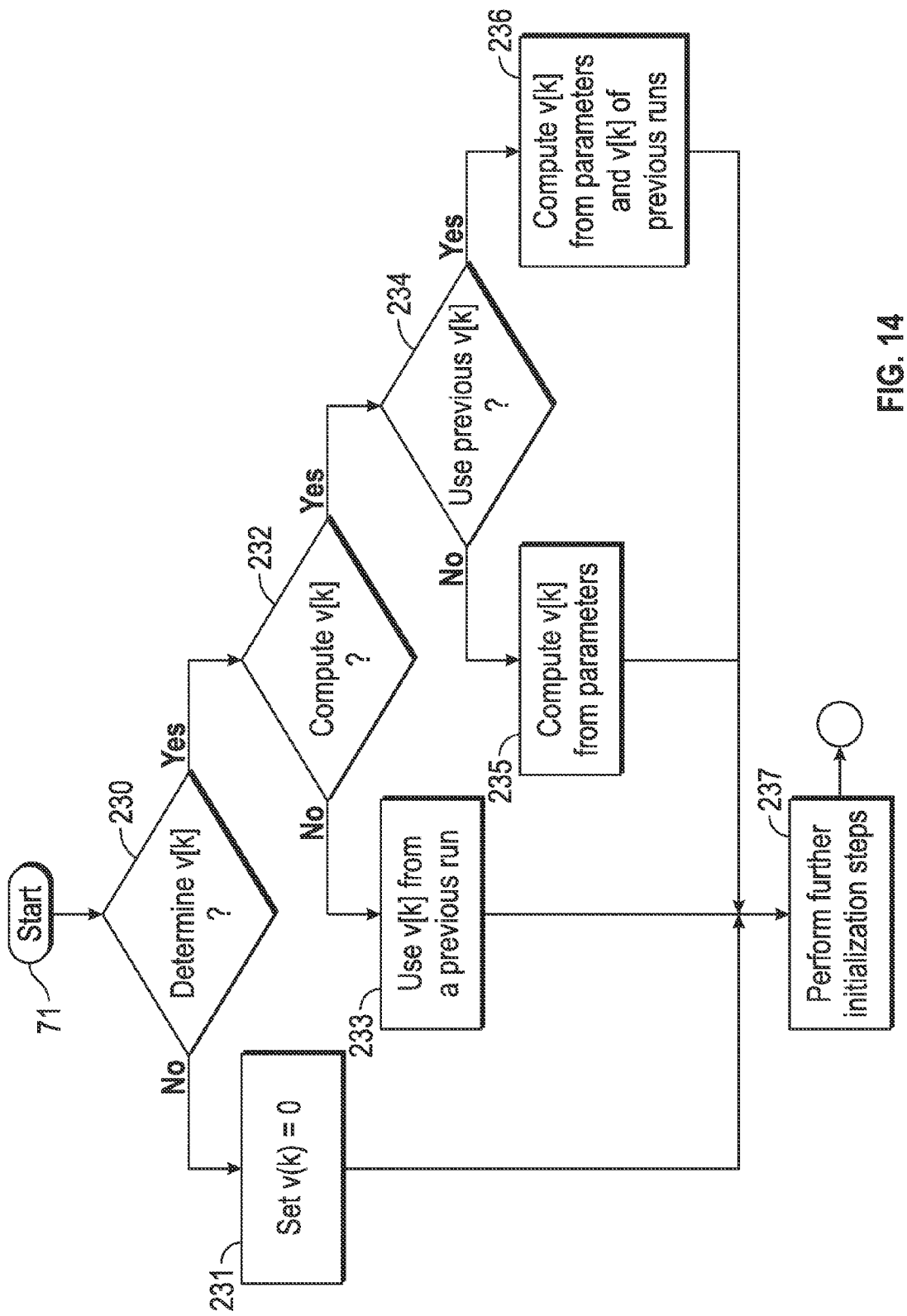
FIG. 14 illustrates the determination of initial values for a stored correction signal in the controller of FIG. 5.

FIG. 14 shows a flow diagram which illustrates the determination of an initial correction signal v[k] during the initialization phase 72 of a simulation run 70 of FIG. 4.

After the start 71 of the simulation, in a first decision step 230, a decision is taken, if the initial correction signal v[k] will be determined from prior data. If this is not the case, in step 231, the initial correction signal v[k] is set to zero. In a second decision step 232 a decision is taken, if the stored correction signal v[k] will be computed. If this is not the case, in a step 233 the stored correction signal is initialized with a correction signal from a previous run. If several correction signals from previous runs are available, the POISON controller may use a correction signal from a previous test run with the best matching parameters.

If in the step 232 a decision has been taken to compute an initial correction signal, a third decision step 234 decides, if information from previous test runs will be used. If this is not the case, in a step 235 an initial correction signal is computed which is based on parameters of the POISON controller. Otherwise, in a step 236 the POISON controller computes an initial correction signal which is based on the controller parameters and on stored correction signals of previous test runs. A step 237 symbolizes further steps which are taken during the initialization phase of FIG. 4.

Figure 15:
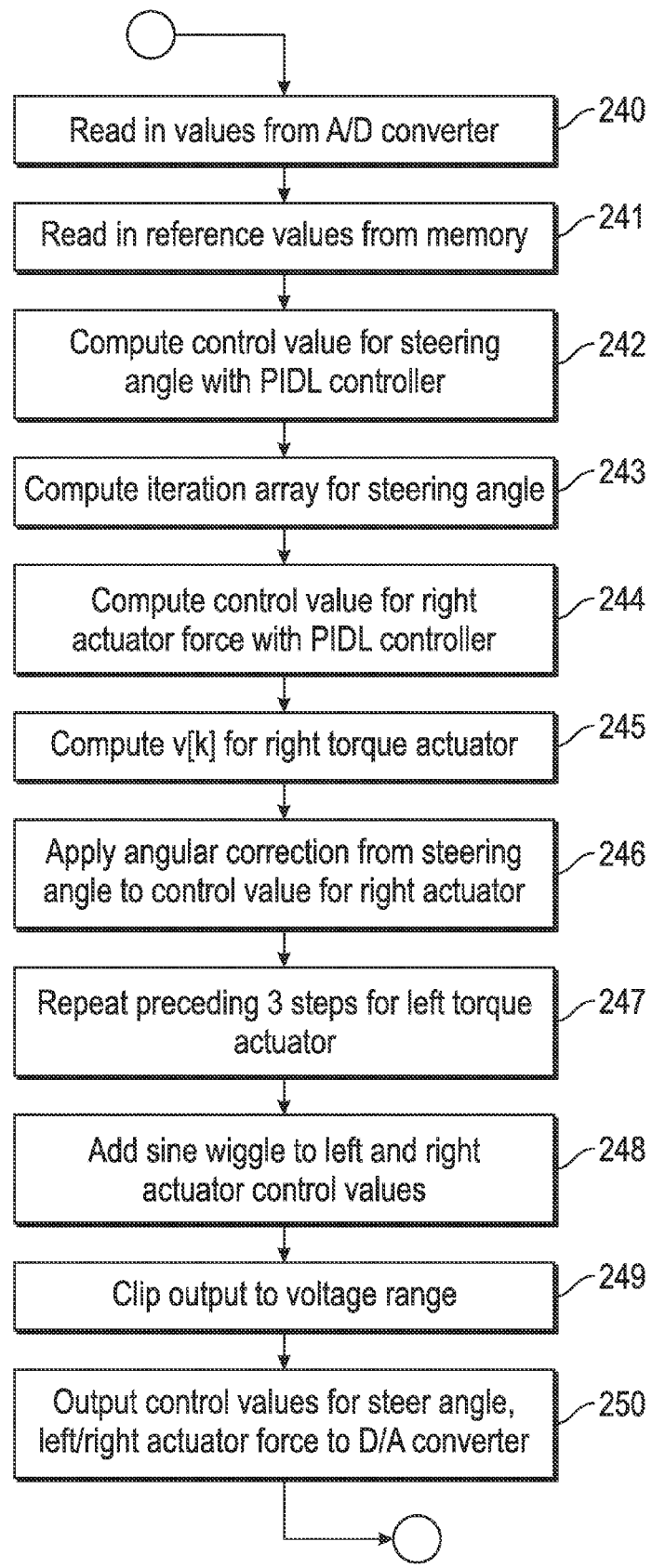
FIG. 15 illustrates the computation of control signals for the controlled systems of FIG. 1.

FIG. 15 shows in further detail the steps which are performed by the digital controller 27 during the repeated step 74 of FIG. 4.

In a first step 240, the digital controller 27 reads in the actual values for each controlled system from the output channels of the ADC 62 of FIG. 3. In a next step 241, the digital controller 27 reads in the reference values for each controlled system. In a computation step 242, the digital controller 27 computes a control signal u[k] for the steering angle according to the description of FIG. 8. In a next step 243, the POISON controller for the steering angle computes a new correction signal v[k], according to the description of FIG. 7.

In a next step 244 the digital controller 27 computes a control signal u[k] for the right torque actuator, according to the description of FIG. 8. In a next step 245, the POISON controller for the right tie rod force computes a new correction signal v[k], according to the description of FIG. 7. In a next step 246, the digital controller applies an angular correction to the control signal u[k].

In a next step 247, the digital controller 27 repeats the steps 244, 245, 246 for the computation of control signal for the left torque actuator.

In a step 248, the digital controller 27 adds a sinusoidal wiggle to the control signals for the left and the right torque actuators. In a step 249 the output is clipped to a predefined voltage range. In step 250, the control values for the electric motor 2, the left and the right torque actuator signals are sent to the respective input channels of the DAC 61.

Figure 16:
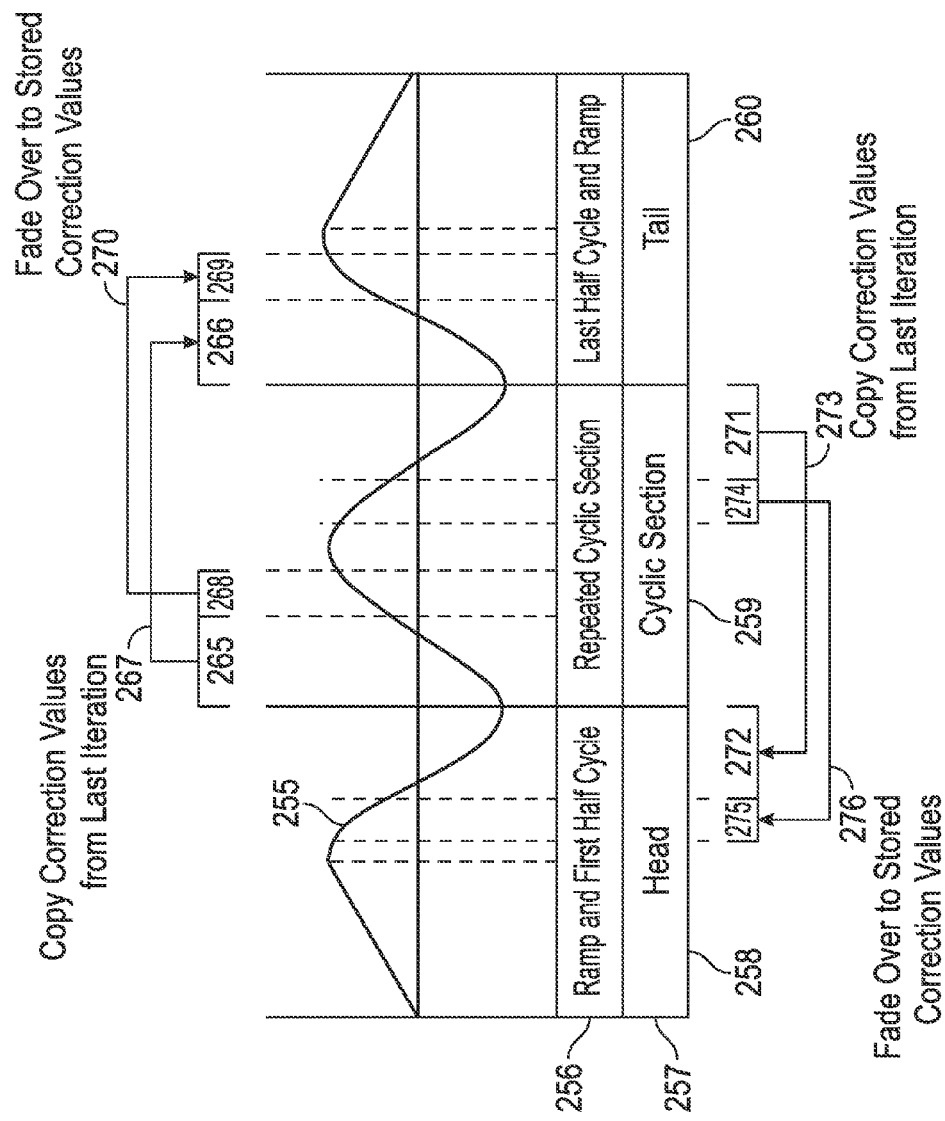
FIG. 16 illustrates the updating of the first and the last part of the correction signal in the controller of FIG. 5 during the last cycle of a test run.

FIG. 16 shows a graphical representation of an update process for a stored correction signal v[k]. This update process takes place during the last repeated step 74 of FIG. 4. During the first to the second last execution of the repeated step 74, the POISON controller overwrites the cyclic section of the correction signal but it does not overwrite the head- and tail sections. This leads to discontinuities between the head section and the cyclical section and between the cyclical section and the tail section of the stored correction signal v[k]. Therefore, the POISON controller overwrites the cyclic portions of the head- and tail sections of the stored correction signal v[k] during the last execution of step 74.

A curve 235 of FIG. 16 shows the reference signal 200 of FIG. 11. The reference signal and the correction signal comprise three signal sections. This partition can be best seen in the reference signal 200. Therefore the reference signal 200 is shown in FIG. 16 for illustrating the partition of the correction signal v[k].

A first row 256 below the curve 255 shows the partition of the curve 255 into head-, cyclic- and tail sections. A second row 257 below the curve 255 shows a partition of the stored correction signal v[k] into a corresponding head section 258, a corresponding cyclic section 259 and a corresponding tail section 260. The head section 258 of the stored correction signal v[k] comprises a first portion which corresponds to the first ramp portion of the reference signal and a second portion which corresponds to the first half cycle of the reference signal. Likewise, the tail section 260 of the stored correction signal v[k] comprises a first portion which corresponds to the last half cycle of the reference signal and a second portion which corresponds to the second ramp portion of the reference signal.

During the last execution of step 74 of FIG. 4, the POISON controller copies a signal portion 265 from the beginning of the cyclic section 259 of the stored correction signal to a first signal portion 266 at the beginning of the last half cycle in the tail section 260 of the stored correction signal. This copying process is denoted by an arrow 267. An adjacent second signal portion 268 from the beginning of the cyclic section 259 of the stored correction signal is faded into an adjacent portion 269 of the last half cycle of the stored correction signal. This fading process is shown by an arrow 270 and will be explained in more detail in the next figure.

Likewise, the POISON controller copies a first signal portion 271 from the end of the cyclic section of the stored correction signal to a first signal portion 272 at the end of the first half cycle which is located in the head section of the stored correction signal. This copying is shown by an arrow 273. An adjacent second portion 274 from the end of the cyclic section of the stored correction signal is faded into an adjacent part 275 which is in the first half cycle in the head section of the correction signal. This fading process is denoted by an arrow 276.

Figure 17:
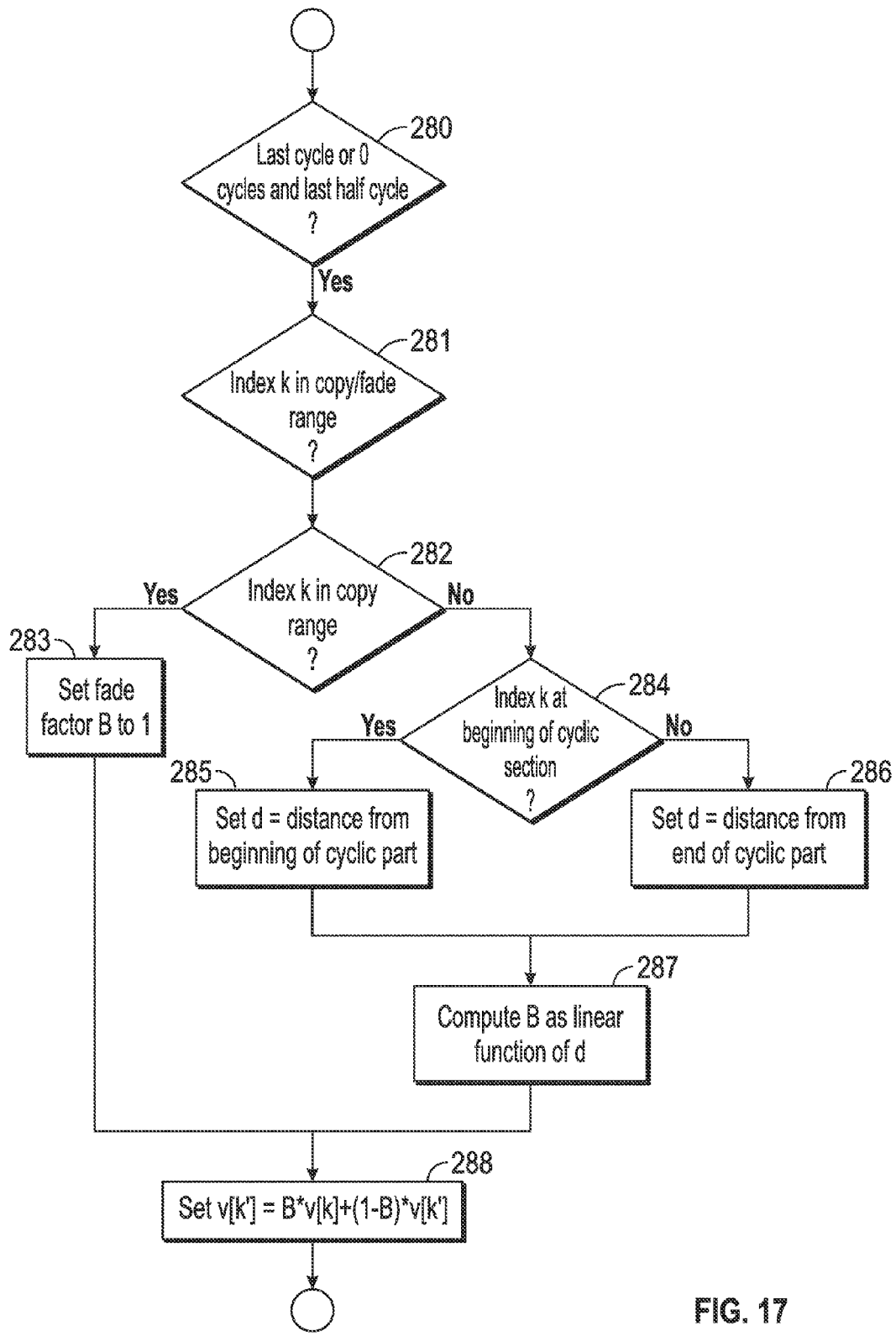
FIG. 17 further illustrates the update process of FIG. 16.

FIG. 17 illustrates a flow diagram showing the steps during the copying and fading process of FIG. 16.

In a first decision step 280, the POISON controller decides, if a predetermined number of cycles has been reached. If this is the case, the POISON controller determines in a decision step 281, if the time index k is within one of the copy/fade ranges of FIG. 16. If this is the case, the POISON controller determines in a decision step 282 if the time index k is within one of the copy ranges 265, 271 of FIG. 16.

If the time index k is within a copy range 265, 271, in step 283 a fade factor B is set to 1. If the index is not inside a copy range 265, 271, the POISON controller determines in a decision step 284, if the time index k is at the beginning or at the end of the cyclic section. In the first case, in a step 285 a variable d is set to the distance of the time index k to the beginning of the cyclic section. In the second case, in a step 286 the variable d is set to the distance of the time index k to the end of the cyclic section.

In a step 287, the fade factor B is computed as a linear function of d. In a step 288, the weighted sum $B*v[k]+(1-B)*v[k']$ is written to v[k']. This results in a copying of v[k] to v[k'] if B=1 and a fading to v[k'] if 0<B<1. For copying/fading to the last half cycle, k'=k+P, where P is the period length of the signal in time units. For copying/fading to the first half cycle k'=k−P.

Figure 18:
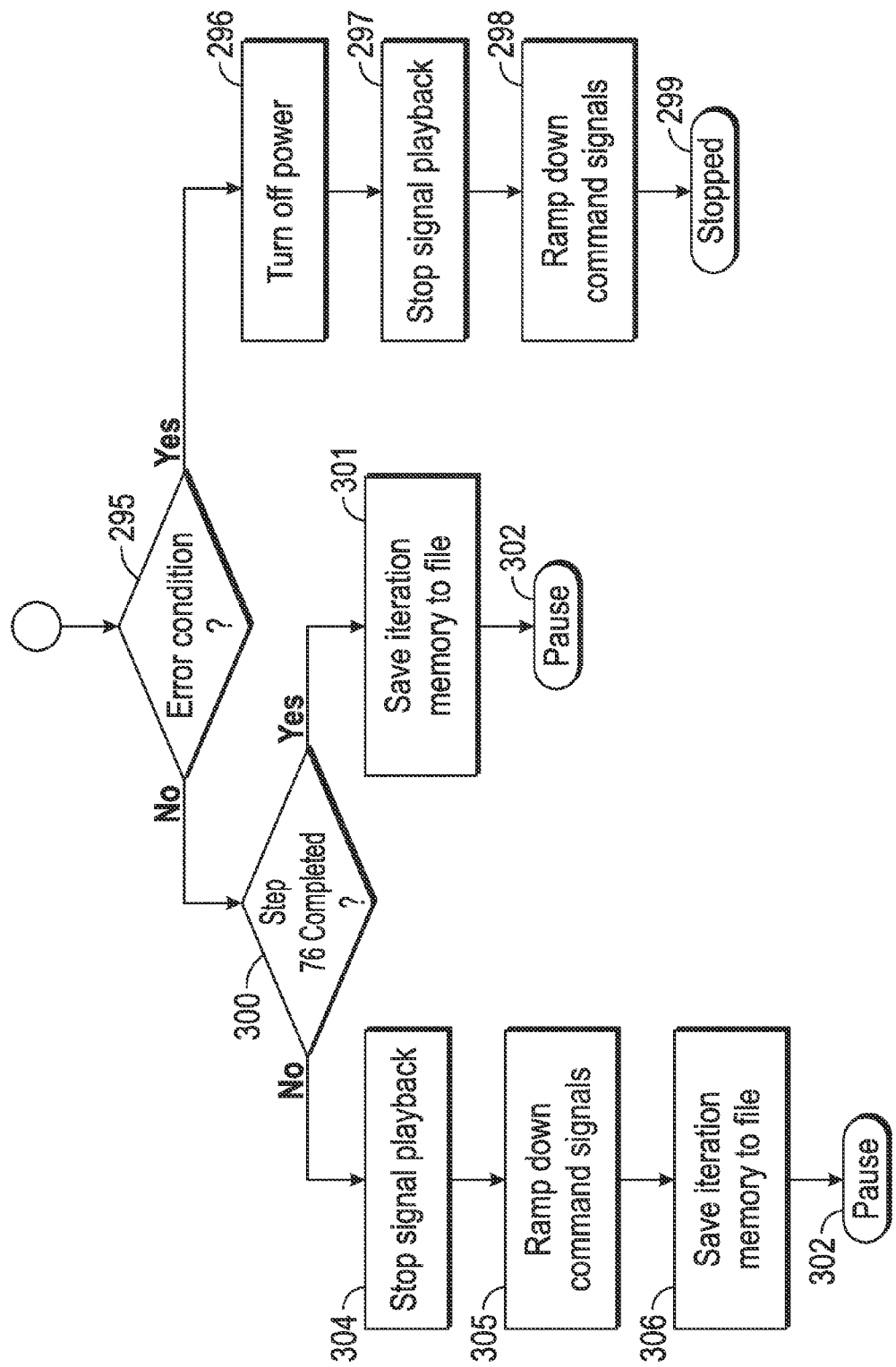
FIG. 18 illustrates alternative ways for the termination of a test run of the test rig of FIG. 1.

FIG. 18 shows a flow diagram of different termination options for terminating a test run 70 during the steps 73, 74, 76 of FIG. 4. In a decision step 295, a decision is taken if an error condition is present. For example, this error condition can be due to a hardware detected limit error or to an error condition which is detected by programmable logic. If an error is detected, in a step 296 the power supply for the electric motor 2 and all servo actuators of the steering test rig 36 is turned off. In a next step 297 the signal playback of the command signals to the controlled systems stops. Then, in a step 298 the command signals are ramped down to predefined values and the steering test rig 36 changes to a stopped state 299.

If no error condition is present, in a decision step 300 a decision is taken if the step 76 of FIG. 4 has been completed. If the step 76 has been completed successfully, in a step 301 the stored correction signal is saved to a file. In this case, all sections of the stored correction signal have been updated.

If, in step 300, it is detected that the step 76 of FIG. 4 has not been completed, the signal playback is stopped in a step 304. In a next step 305, the command signals are ramped down. In a next step 306, the stored correction signal is written to a file. In this case, there are still sections of the stored correction signal which have not been updated during the test run. In a step 302 the test rig 36 changes to a pause state. The saved file can be used as an initial correction signal in another test run, as in step 233, 236 of FIG. 14.

In the pause state 302, the steering test rig 36 remains ready for operation whereas in the stopped state 299 the power must be turned on in order to start a new test run.

Figure 19:
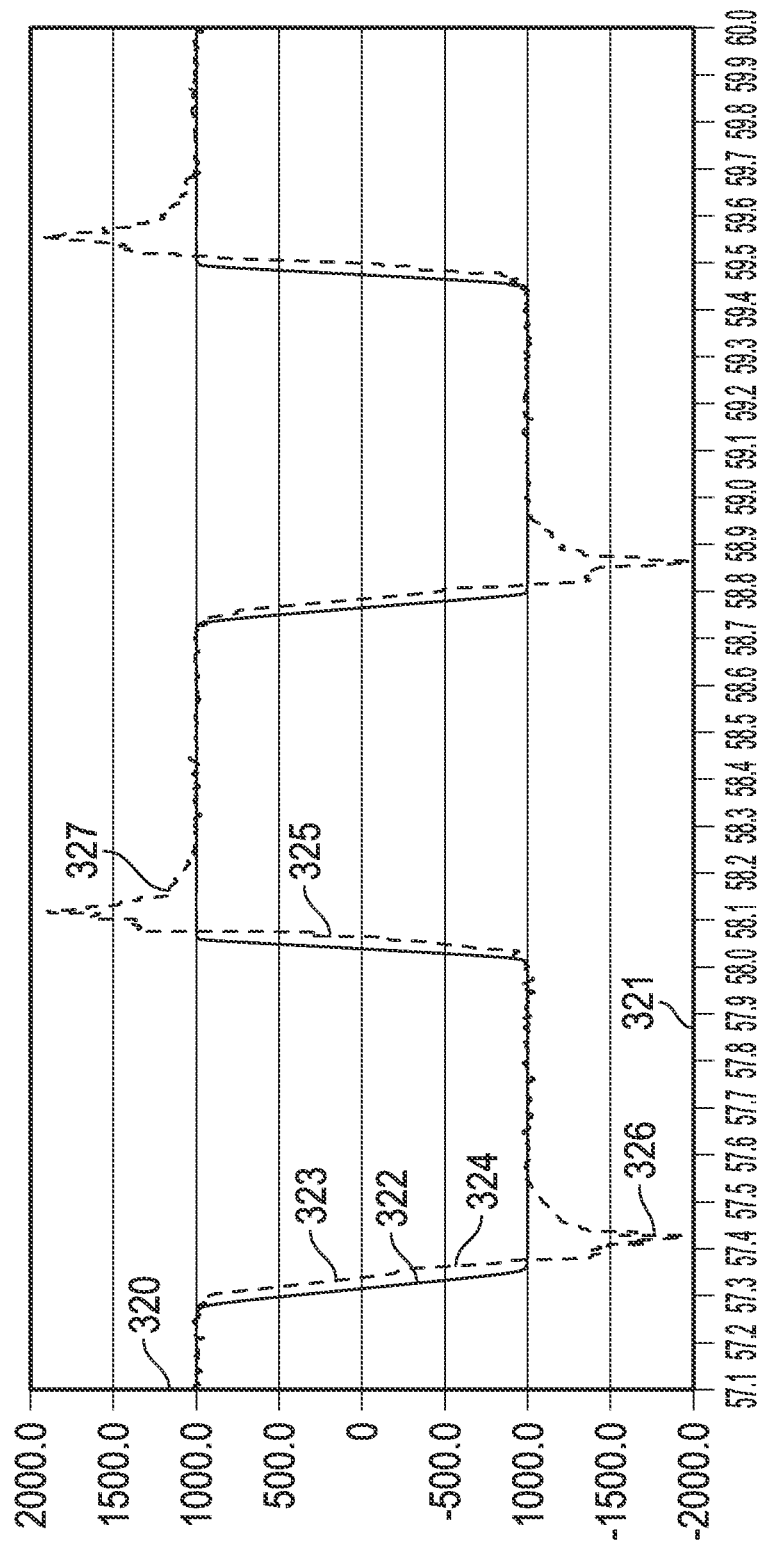
FIG. 19 illustrates a reference signal and an actual value signal for the left torque actuator of FIG. 1 without using the adaptive control components in FIG. 5.
Figure 20:
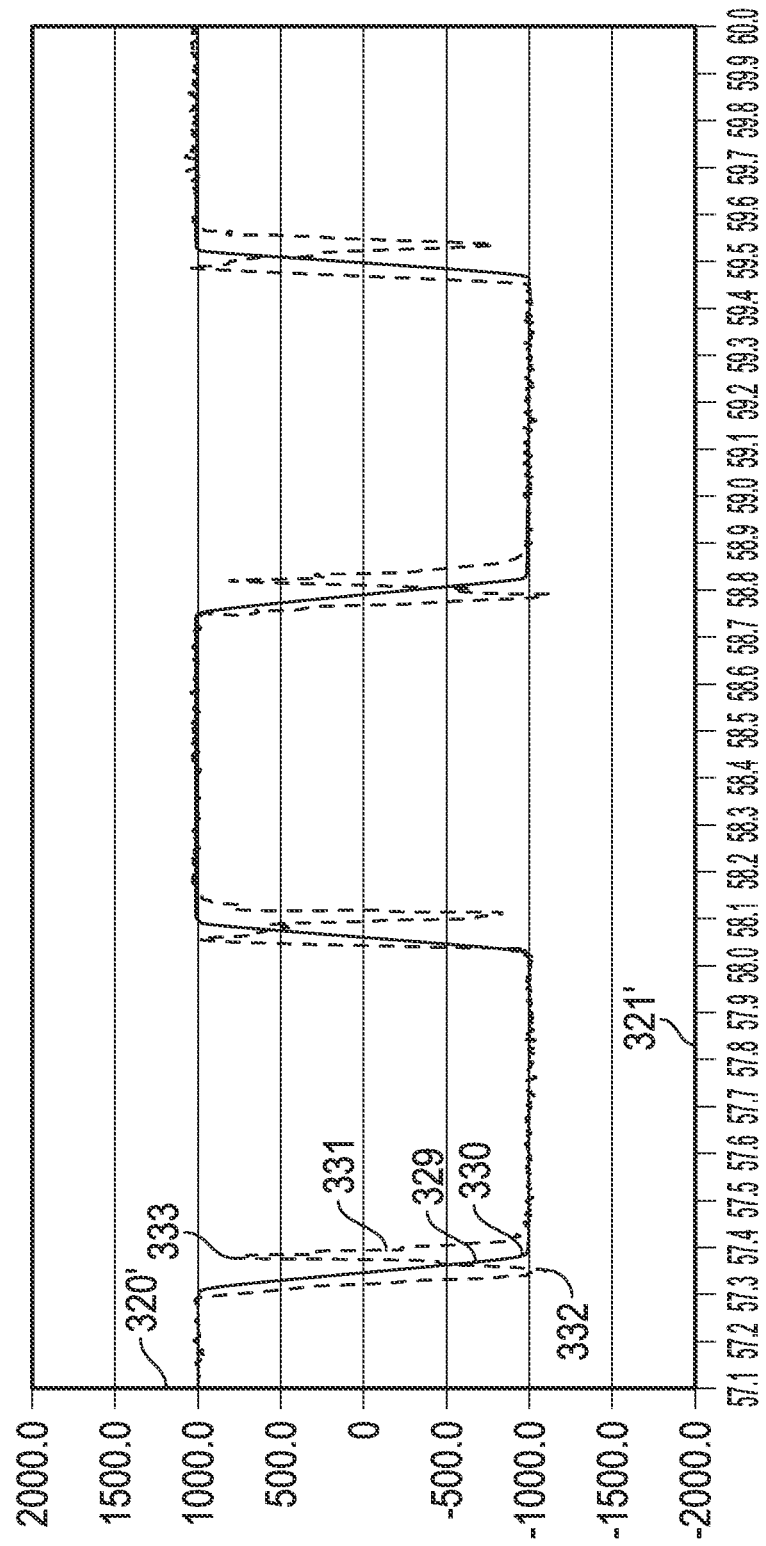
FIG. 20 illustrates a reference signal, actual value signal and control signal for the left torque actuator of FIG. 1 using the complete controller of FIG. 5.

FIG. 19 and FIG. 20 illustrate the improved control quality which is achieved by using the adaptive components of the POISON controller 50 in the controlled system 35 of FIG. 1. In FIGS. 19, 20 and also in the following comparative FIGS. 21, 22; 25, 26 and 27, 28 the POISON controller 50 of FIG. 3 was disconnected in the first figure. This means that in the first figure of a comparison, the controlled system is only controlled by the system controller 58 of FIG. 3 whereas in the second figure of a comparison, the controlled system is controlled by both the POISON controller 50 and the system controller 58. A force scale in Newton is given by the vertical axes 320, 320' and a time scale in seconds is given by the horizontal axes 321, 321'.

FIG. 19 shows a reference signal 322 for the force at the left tie rod and an actual value signal 323 from the left load cell 24 of FIG. 1. The actual value signal 323 shows control errors at the edges of the reference signal 322. At locations 324 and 325 the actual value curve 323 lags behind the reference signal 322. At locations 326 and 327 the actual value curve 323 shows pronounced overshoots.

FIG. 20 shows a reference signal 329 for the force at the left tie rod and an actual value signal 330, as in FIG. 19. In addition, FIG. 20 shows a corrected reference signal, which is generated at the output of the adder 100 of FIG. 5. The signals 329 and 330 lie almost on top of each other. Only at the beginning of the plateaus at +/−1000 N is there a small deviation visible. At the edges of the reference signal 329, the corrected reference signal 331 shows an anticipating reaction, a first overshoot 332 and a second compensating signal peak 333. As can be seen in the FIG. 23, the signal pattern of the corrected reference signal 331 develops from the reference signal 329 after a sufficient number of iterations.

Figure 21:
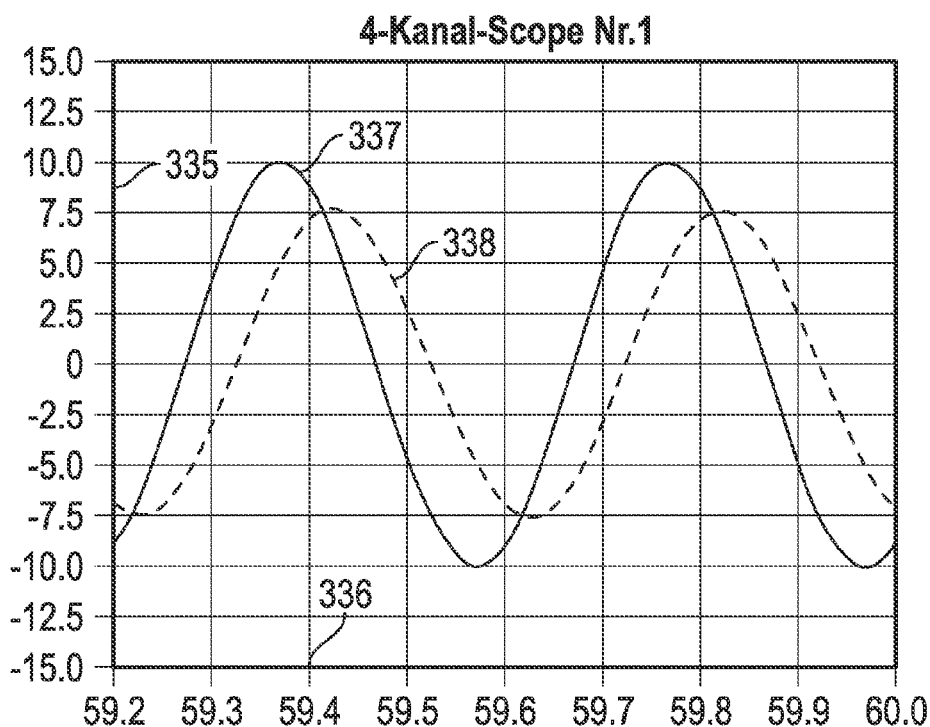
FIG. 21 illustrates a reference signal and an actual value signal for the steering motor of FIG. 1 without using the adaptive control components in FIG. 5.
Figure 22:
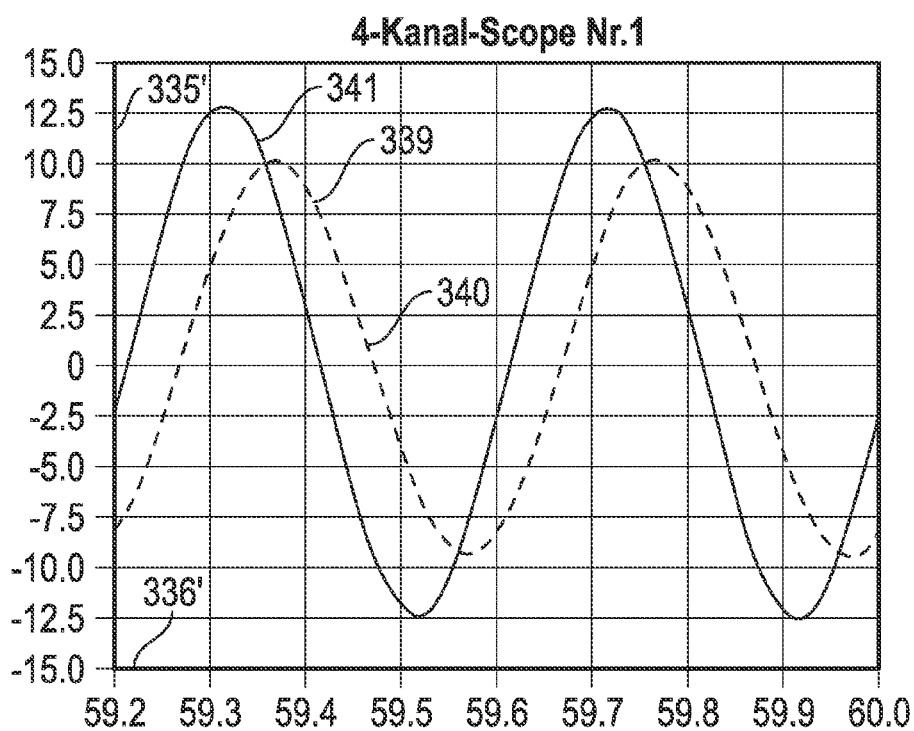
FIG. 22 illustrates a reference signal, an actual value signal and a control signal for the steering motor of FIG. 1 using the complete controller of FIG. 5.

FIG. 21 and FIG. 22 illustrate the improved control quality which is achieved by using the POISON controller 50 in the controlled system 33 of FIG. 1. As in the FIGS. 19 and 20, the POISON controller 50 was used in the second figure, but not in the first. An angle scale in degrees is given by vertical axes 335, 335'. A time scale in seconds is given by horizontal axes 336, 336'.

FIG. 21 shows a reference signal 337 for the steering angle and an actual value signal 338 from the angle sensor 30. In FIG. 21, the actual value signal 338 lags behind the actual value signal by about 0.5 seconds. The actual value signal also has an amplitude which is too low by about 2.5 angular degrees.

FIG. 22 shows a reference signal 339, an actual value signal 340 and a corrected reference signal 341. The reference signal 339 and the actual value signal 340 lie almost on top of each other. As in FIG. 20, the corrected reference signal 341 of FIG. 22 shows compensating features. The compensating features contain a time advance of about 0.5 seconds and an amplitude correction of about 2.5 degrees. The amplitude correction is not symmetric to the zero degree line.

Figure 23:
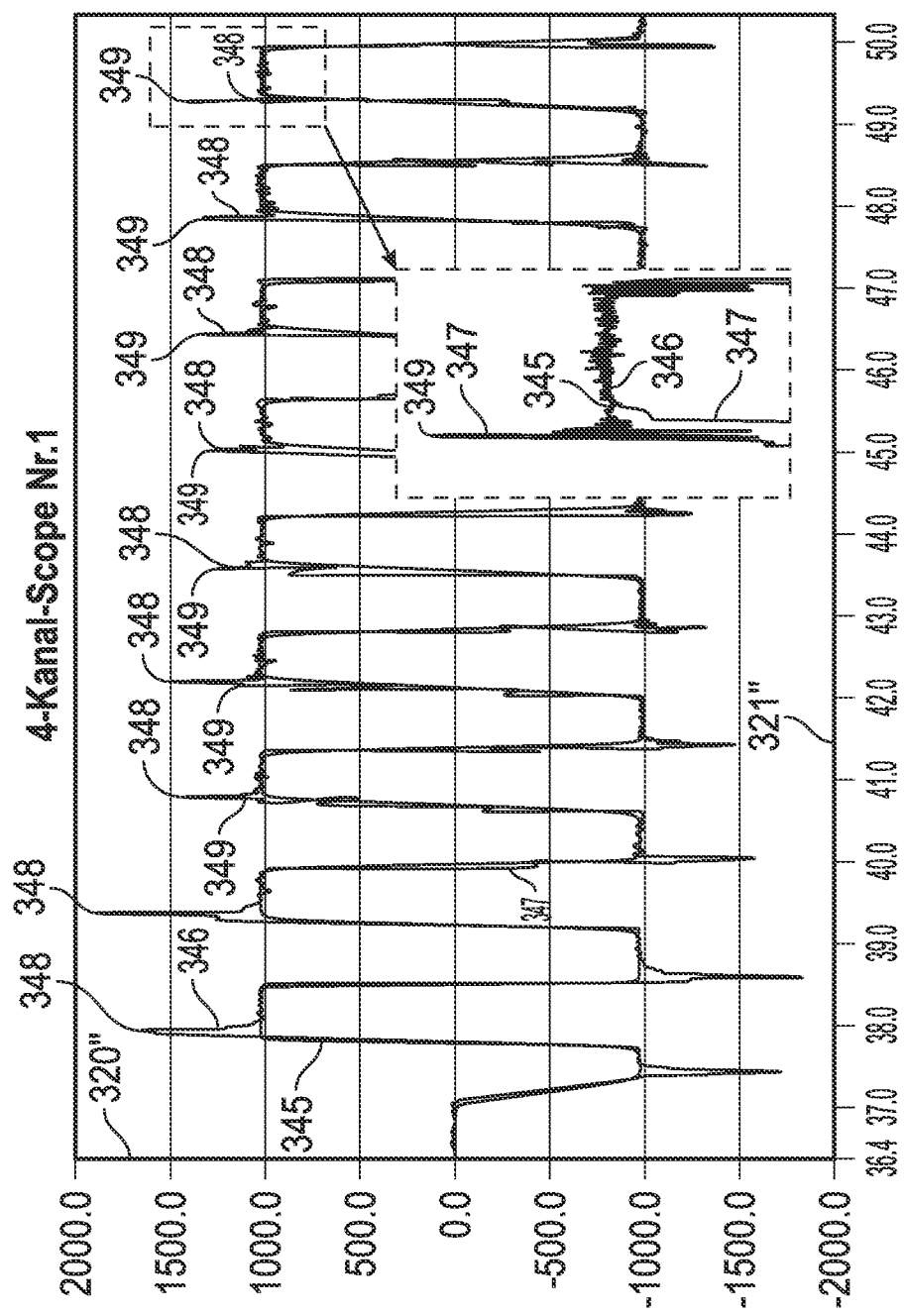
FIG. 23 illustrates the convergence of the control quality for the left torque actuator of FIG. 1.
Figure 24:
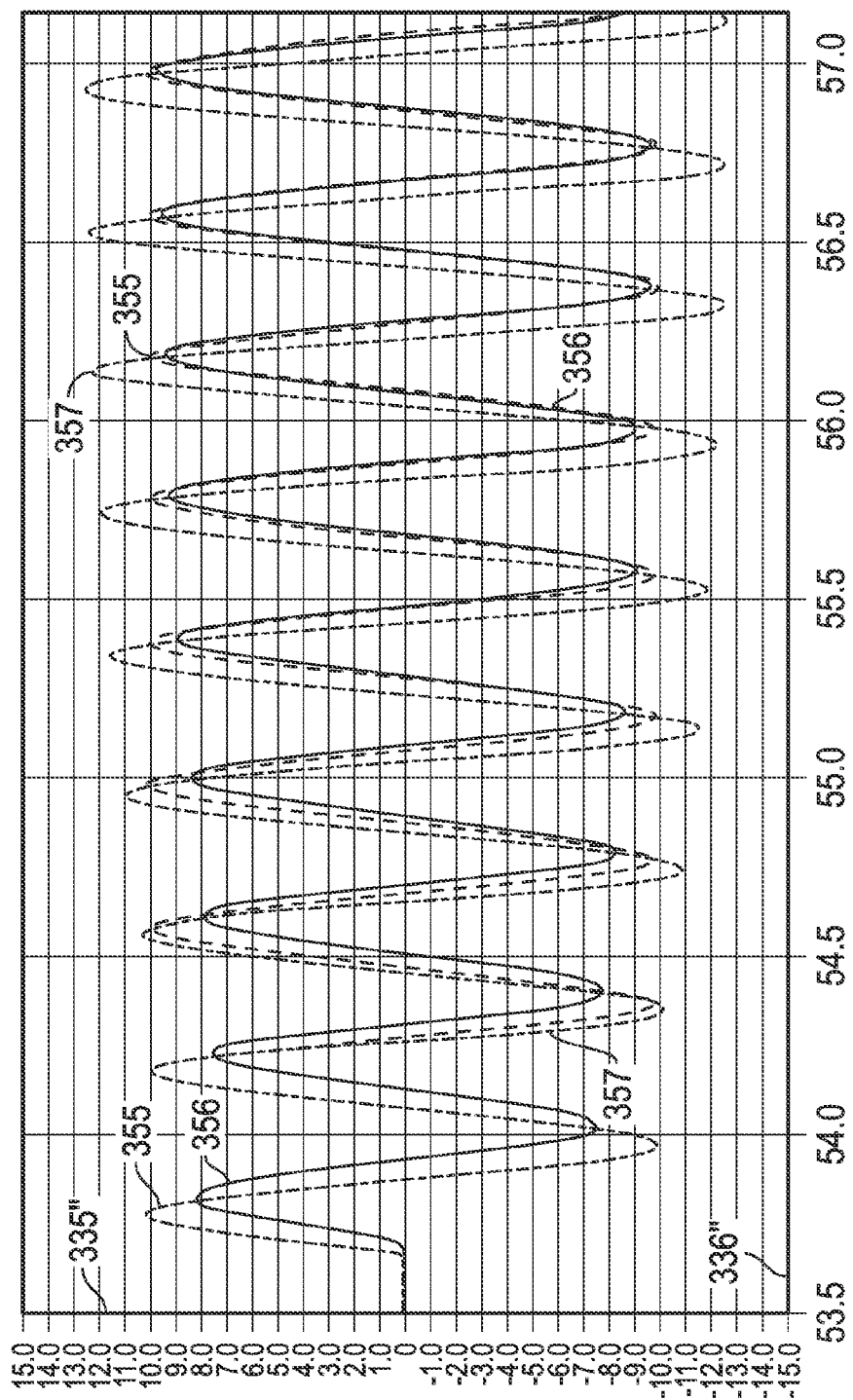
FIG. 24 illustrates the convergence of the control quality for the steering motor of FIG. 1.

FIG. 23 and FIG. 24 illustrate the convergence behavior of the POISON controller 50 in the controlled system 35 of FIG. 1.

FIG. 23 shows a reference signal 345 for the left load cell 24 of FIG. 1, an actual value signal 346 from the left load cell 24 and a corrected reference signal 347. A force scale in Newton is given by a vertical axis 320" and a time scale in seconds is given by the horizontal axis 321". The FIG. 23 shows the first 9 iterations of the repeated step 74 of FIG. 4. In the embodiment of FIG. 23, the correction signal has been initialized to zero.

During the first iterations, the actual value signal 346 shows a pronounced overshoot 348. During the first iterations, a compensating overshoot 349 of the corrected reference signal 347 develops. After 9 iterations, the overshoot 348 of the actual value signal 346 has almost disappeared. The enlarged section shows that after 9 iterations the signals 345 and 346 lie almost on top of each other. The compensating features of the corrected reference signal 347 can be best seen in the previous FIG. 20 which shows the corrected reference signal 347 after convergence.

The corrected reference signal 347 sets in after 1.5 cycles of the reference signal 345 are completed. At the beginning of a test run, 1.5 cycles are needed to generate a new corrected reference signal. During the first half cycle, no update of the cyclic section of the correction signal takes place. During the first execution of step 74 of FIG. 4, the POISON controller uses the cyclic section of the original stored correction signal, which has been initialized to zero in this case. After the first execution of the repeated step 74, the POISON controller uses the updated stored correction signal which has been computed during the first execution of step 74.

FIG. 24 shows a reference signal 355 for the angle sensor 30 of FIG. 1, an actual value signal 356 from the angle sensor 30 and a corrected reference signal 357. An angle scale in degrees is given by a vertical axis 335" and a time scale in seconds is given by a horizontal axis 336". The FIG. 24 shows the first 9 iterations of the repeated step 74 of FIG. 4. During the iterations, the corrected reference signal 357 shifts to the left and increases in amplitude. Also, as a consequence, the actual value signal shifts to the left and increases in amplitude until it lies almost on top of the reference signal 355. As mentioned before, the POISON controller also compensates for an asymmetric behavior of the steering gear with respect to steering to the left and steering to the right.

FIGS. 25 to FIG. 28 illustrate the improved quality of control which is achieved by using the POISON controller in the controlled systems 34 and 35 of FIG. 1 for a force range of +/−1000 N at 1 Hz and a force range of +/−250 N at 5 Hz after convergence to a steady state has occurred. The convergence to a steady state can be best seen in the previous FIG. 23.

Figure 25:
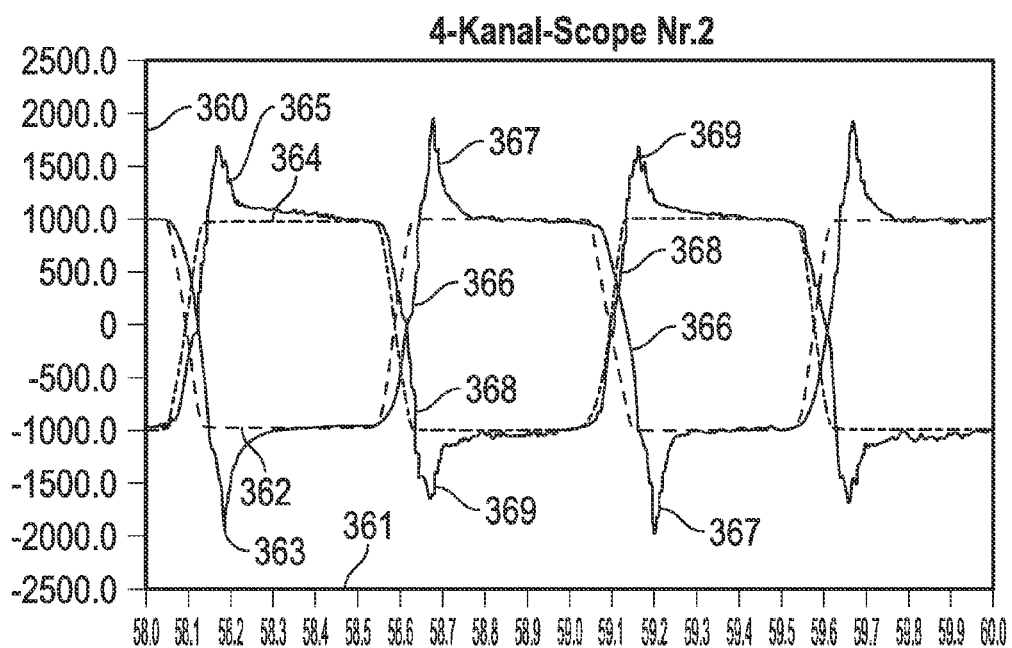
FIG. 25 illustrates reference signals and actual value signals for the torque actuators of FIG. 1 without using the adaptive control components of FIG. 5.

FIG. 25 shows a reference signal 362, an actual value signal 363 from the left load cell 24, a reference signal 364 and an actual value signal 365 for the right load cell. A force scale in Newton is given by a vertical axis 360 and a time scale in seconds is given by a horizontal axis 361.

The actual value signal 363 from the left load cell shows time lags 366 and overshoots 367 with respect to the reference signal 362. In the same way, the actual value signal 365 from the right load cell shows time lags 368 and overshoots 369. The overshoots 367 of the actual value signal 363 differ from the overshoots 369 of the actual value signal 365 because the reaction of the left torque actuator to a command signal is different from the reaction of the right torque actuator. FIG. 25 also shows that the control error is nearly identical in every cycle for each of the torque actuators.

Figure 26:
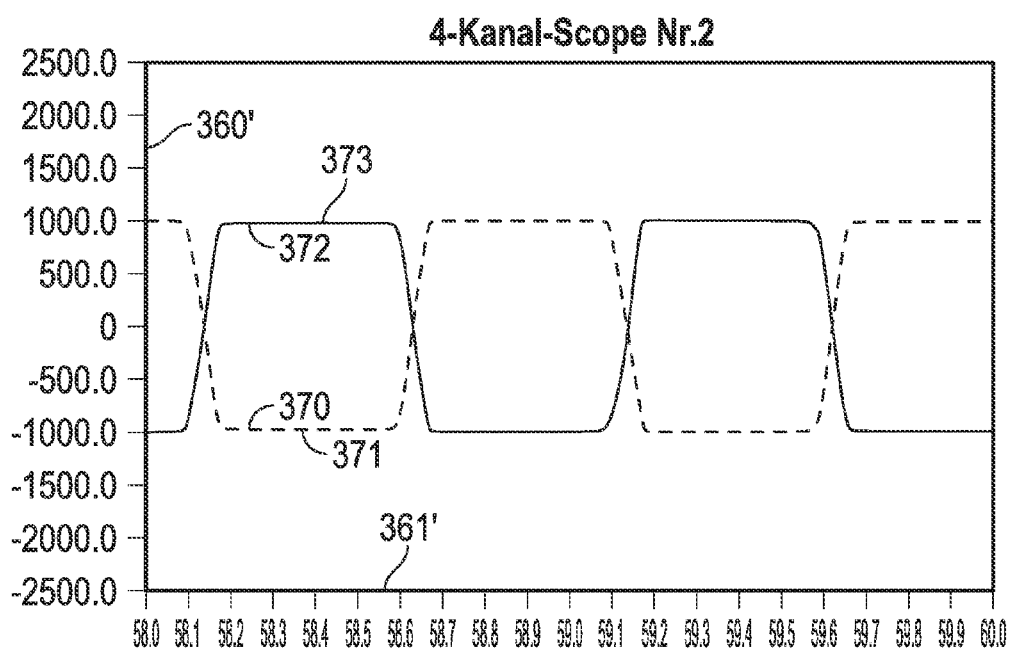
FIG. 26 illustrates reference and actual value signals for the torque actuators of FIG. 1 using the complete controller of FIG. 5.

FIG. 26 shows a reference signal 370 and an actual value signal 371 for the left load cell 24 and a reference signal 372 and an actual value signal 373 for the right load cell 23. A force scale in Newton is given by a vertical axis 360' and a time scale in seconds is given by a horizontal axis 361'. Unlike FIG. 20, FIG. 26 does not show a corrected reference signal.

In the level of detail provided by FIG. 26 the actual value and reference signals lie almost on top of each other. A difference is only visible by a wiggle around the plateaus at +/−1000 N and a slight deviation before the beginning of each plateau. This demonstrates the ability of the POISON controller to compensate for errors which are similar in each cycle of a periodic reference signal.

Figure 27:
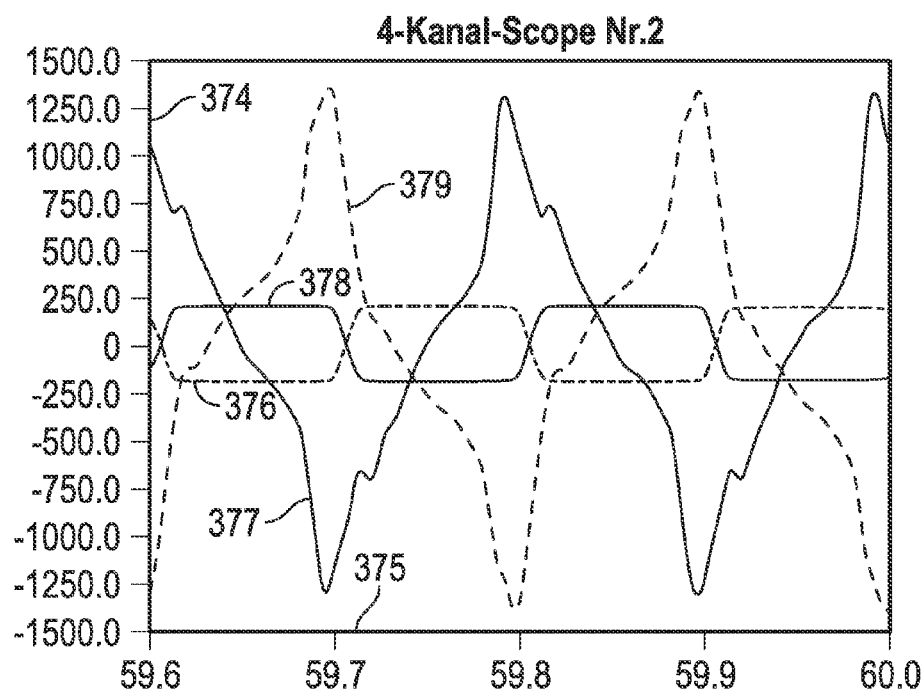
FIG. 27 illustrates further reference and actual value signals for the torque actuators of FIG. 1 without using the adaptive control components of FIG. 5.

FIG. 27 shows a reference signal 376 and an actual value signal 377 for the left load cell 24 and a reference signal 378 and an actual value signal 379 for the right load cell 23. A force scale in Newton is given by a vertical axis 374 and a time scale in seconds is given by a horizontal axis 375. The force range of the reference signal in FIG. 27 is +/−250 N. This is a quarter of the force range which was used in the FIGS. 25, 26.

The actual value signals 377 and 379 show large differences to the reference signals 376, 378 and also large overshoots which reach a height of 5 times the desired force range. This demonstrates that, under the conditions of FIG. 27, the system controller 58 of FIG. 5 cannot compensate for the control error. As in FIG. 25, the control error is nearly identical in each cycle.

Figure 28:
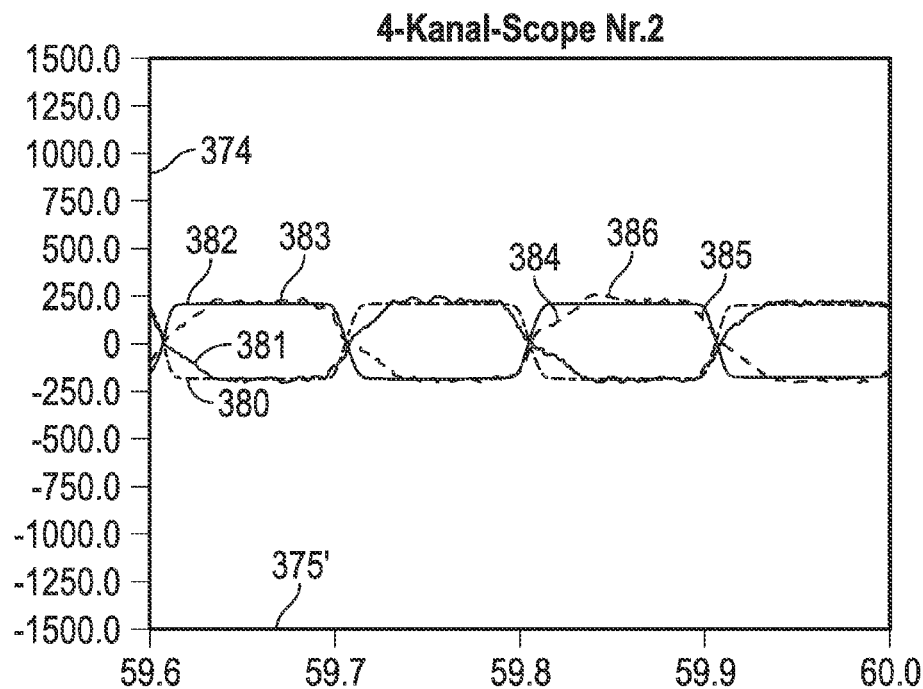
FIG. 28 illustrates reference and actual value signals for the torque actuators of FIG. 1 using the complete controller of FIG. 5 for the reference signals of FIG. 27.

FIG. 28 shows a reference signal 380 and an actual value signal 381 for the left load cell and a reference signal 382 and an actual value signal 383 for the right load cell. A force scale in Newton is given by a vertical axis 374' and a time scale in seconds is given by a horizontal axis 375'. FIG. 28 does not show a corrected reference signal, as in FIG. 20.

The actual value signals 381 and 383 deviate from the reference signals 380 and 382 at signal portions 384 at the beginning of the plateaus of +/−250 N and also at signal portions 385 at the end of the plateaus of +/−250 N. The actual value signals 381 and 383 also show a greater wiggle around the plateaus than in FIG. 26. However, the force stays within the range of 250 N and the goal to achieve a constant opposing force of 250 N at each tie rod during most of the time is still fulfilled. This demonstrates the ability of the POISON controller to ensure a sufficient quality of control for the steering test rig 36 of FIG. 1, even under the conditions of FIG. 28.

The moving average filters 134 and 81 represent a special type of a finite impulse response (FIR) low pass filter. The bandwidths of the moving average filters 134 and 81 are adjustable parameters of the POISON controller.

The application provides a method for complying with nonlinear distortions of the controlled system. Automotive steering test rigs commonly use hydraulic actuators which exhibit such nonlinear effects, as for example stick-slip friction.

The POISON controller works on-line. Therefore it is able to readjust constantly. An improved controller according to the present application can adapt to changes of the controlled process. Therefore the improved controller is able to compensate for an aging test sample which could otherwise lead to an increasing control error that cannot be predicted in a preliminary test run.

As the POISON controller adjusts itself during a test run, there is no need for an iterative adjustment before the start of a test run. There are only a few parameters that users need to adjust in advance. Therefore, a system identification is not required. However, a system identification or iterations to initially adjust the POISON controller may be performed in advance, if desired.

Moreover, the signal processing algorithm of the POISON controller can be implemented by using only computations in the time domain, thereby avoiding the overhead for additional transformations to the frequency domain and vice versa.

Furthermore, the POISON controller acts as a feed forward controller during a cycle of a periodic reference signal and is able to take corrective action before a control deviation occurs. This ability is due to the use of a stored correction signal from a previous cycle of a periodic reference signal.

Moreover, the computation in the POISON controller uses computationally efficient building blocks. This leads to a fast algorithm allowing for execution on a real time processing unit at high time resolution.

As the POISON controller is always on-line during the operation of the test rig, convergence is fast and adaptation to changed system conditions takes place from one cycle to the next.

An improved controller according to the application only needs a simple model of the controlled system whose parameters remain fixed during the test run. The parameters may also be allowed to vary with time. The application avoids the difficulties of matching the parameters of an adaptive controller with a large number of degrees of freedom. These adaptive controllers cannot be applied easily.

A further advantage of the application is that no detailed knowledge of the controlled system is required for adjusting the parameters of the controller, as it is the case with adaptive controllers. Once the parameters of the inverse system model have been determined, the controller will adjust itself during the operation of the test run. The filters which are provided in one embodiment of the application can easily be adapted with basic control theory knowledge for providing a convergent control strategy. Simple online tests can help to improve the function of the filters.

Figure 33:
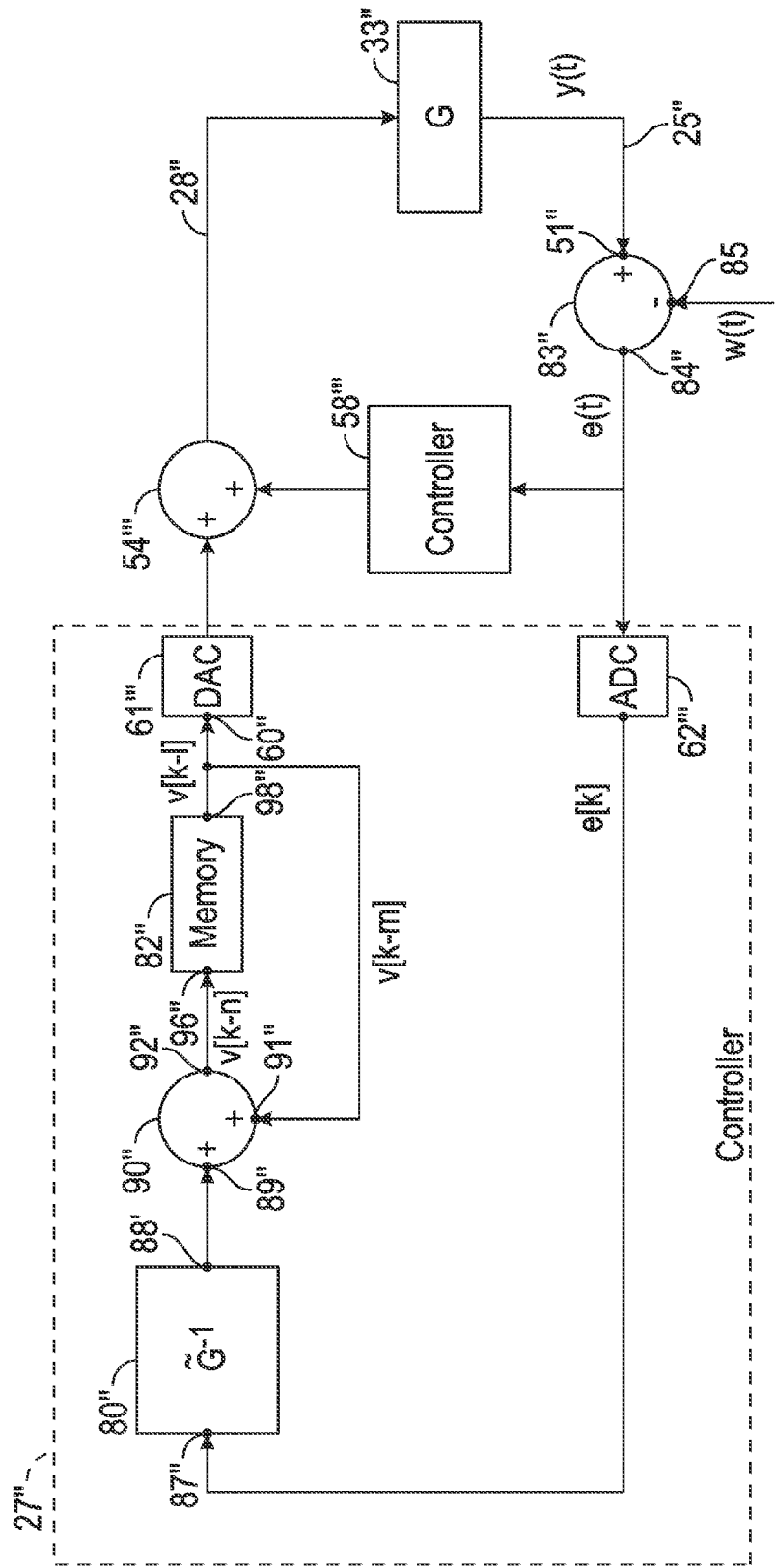
FIG. 33 illustrates a further embodiment of a controller.

In the embodiment of FIG. 5, which uses a serial arrangement, the POISON controller can be easily integrated into an existing control loop of a test rig, simply by using the output signal of the POISON controller as input signal to an existing system controller. The serial arrangement of FIG. 5 has an additional advantage compared to a parallel arrangement of a learning controller as shown in FIG. 33, 34 in that it prevents the emergence of an undesired contribution in the iteration memory which counteracts the integration component of a PID system controller.

The learning controller according to the application comprises a first learning controller input for receiving an actual value signal. In the embodiment of FIG. 5, this first learning controller input corresponds to the input 51 of the adder 83. The actual value signal is derived from a controlled system, e.g. generated by a sensor of a controlled system 33, 34, 35. The controlled system further comprises an actuator for applying a control signal and also all parts which interact with the sensor and with the actuator.

The learning controller according to the application also comprises a second learning controller input for receiving a reference signal from a reference signal generator which is not shown in FIG. 5. The second learning controller input corresponds to the input 85 of the adder 83 of FIG. 5. The learning controller also comprises a learning controller output. In the embodiment of FIG. 5, the learning controller output corresponds to the output 52 of the adder 100.

The output signal of the learning controller is used as an input signal for a control unit. In the embodiment of FIG. 5, the control unit corresponds to the adder 54 and the controller 58. The control unit derives a second input signal from the actual value signal of the controlled system. In the embodiment of FIG. 5, the control unit reads in the second input signal from the input 55 of the adder 54.

An inverse system unit in the learning controller uses the deviation between the actual value signal and the reference signal to derive a first correction signal. In the embodiment of FIG. 5, the inverse system unit corresponds to the adder 83 and the inverting unit 80. The first correction signal corresponds to the output signal of the inverting unit 80.

A filtering unit uses a previously stored signal from an iteration memory and the first correction signal for deriving a filtered correction signal. In the embodiment of FIG. 5, the filtering unit corresponds to the adder 90 and the iteration filter 81. The filtered correction signal is then stored in the iteration memory for use in one of the next calculation cycles.

The learning controller further comprises a correction signal unit for deriving a correction output signal from the stored correction signal and from the reference signal. In the embodiment of FIG. 5, this correction signal unit corresponds to the adder 100. The correction output signal is the output signal of the learning controller. It corresponds to the corrected reference signal at the output 52 of the adder 100 in the embodiment of FIG. 5. The deriving of the correction output signal can be done with analog means or with digital means. The expressions "computing" and "deriving" are not restricted to the calculation with a digital computer but they are also applicable to generation of the correction signal with an analog circuit. Both options can be combined to use analog/digital means for computing the output correction signal.

A controller or according to the application comprises one or more features of the aforementioned learning controller and of the aforementioned control unit. This is best seen in FIG. 3, which shows a an embodiment of a controller 27 which comprises a learning controller 50. The controller derives an input signal from the actual value signal of the controlled system. The output signal of the controller is derived from the output signal of the control unit in the controller.

Figure 29:
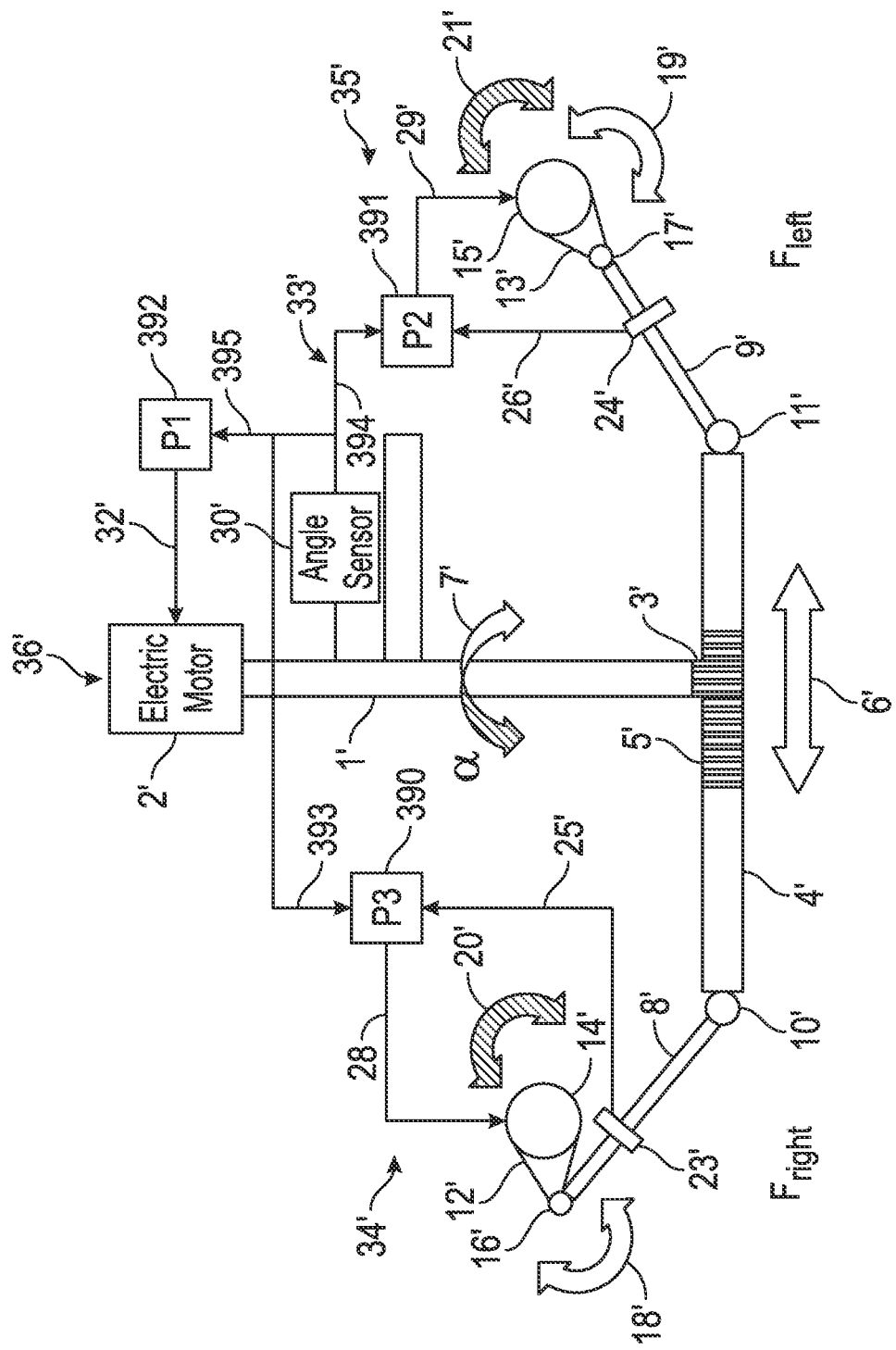
FIG. 29 illustrates a further embodiment of a steering test rig in which a separate controller is used for each of the control loops.

In a broader sense, a control device according to the application can itself be made up of several control devices, each one performing a dedicated task. An example is shown in the embodiment of FIG. 29, which provides separate controllers for computing the motion control signal and for computing the force control signals.

A learning controller according to the application may be designed in various ways. The arrangement of the learning controller according to FIG. 5 in which the system controller 58 derives its input from the output of the learning controller 50 is called a serial arrangement. In the serial arrangement, the correction output signal of the learning controller is also referred to as first reference signal and the aforementioned reference signal is also referred to as second reference signal.

The embodiments can be carried out with other means which are adapted to the needs of the person skilled in the art. For instance, the motor 2 of FIG. 1 can also be any other form of motor, such as a hydraulic drive.

The computation of a control signal may be carried out in parallel for two or more of the controlled systems 33, 34, 35. For parallel computation, a scheduler of the digital controller 27 of FIG. 1 attributes time slices to each parallel process. If the digital controller 27 has several processors, the time slices may be attributed to different processors. A global memory section is used for the exchange of data between the control loops.

The learning controller 50 may also comprise an adaptive procedure which readjusts the parameters during the operation of the test rig. Alternatively, the controller may further comprise an adaptive controller.

A reference signal generator is used to generate the reference signal from a stored signal. A controller according to the application may comprise a reference signal generator, but the controller may also use an externally generated reference signal. In the durability test on the steering rig 36, the reference signal generator generates a periodic reference signal during the repeated step 74 of a test run. In other situations, for example if the learning controller 50 is used for compensating an undesired periodic system response, a non-periodic reference signal may also be used. The periodic reference signal may be given by a cyclic signal and also by a periodic repetition of a signal. A cycle or repetition may also begin after the end of the previous cycle or repetition. The addition of the reference signal to the output of the iteration memory 82, as shown in FIG. 5, is typical for the serial arrangement of a learning controller.

In the embodiment of FIG. 5, for reasons of numerical stability, the inverse system controller 130 of the inverting unit 80 is realized as PDL controller without integration component. However, an integration component may be used in the inverse system controller 130, if desired.

Instead of moving average filters, general finite impulse response (FIR) low pass filters may be used for the iteration filter 81 in the filtering unit and the filter 134 in the inverse system unit. The iteration filter 81 may also be arranged between the output 98 of the memory 82 and the input 91 to the adder 90. There may also be an additional anti-aliasing filter between the input of the digital controller 27 and the ADC converter 62. Further, the two adders 54 and 100 of FIG. 5 may be combined into a single adder having three inputs.

An additional system identification based on test signals or initial iteration may be performed previous to a test run.

Figure 34:
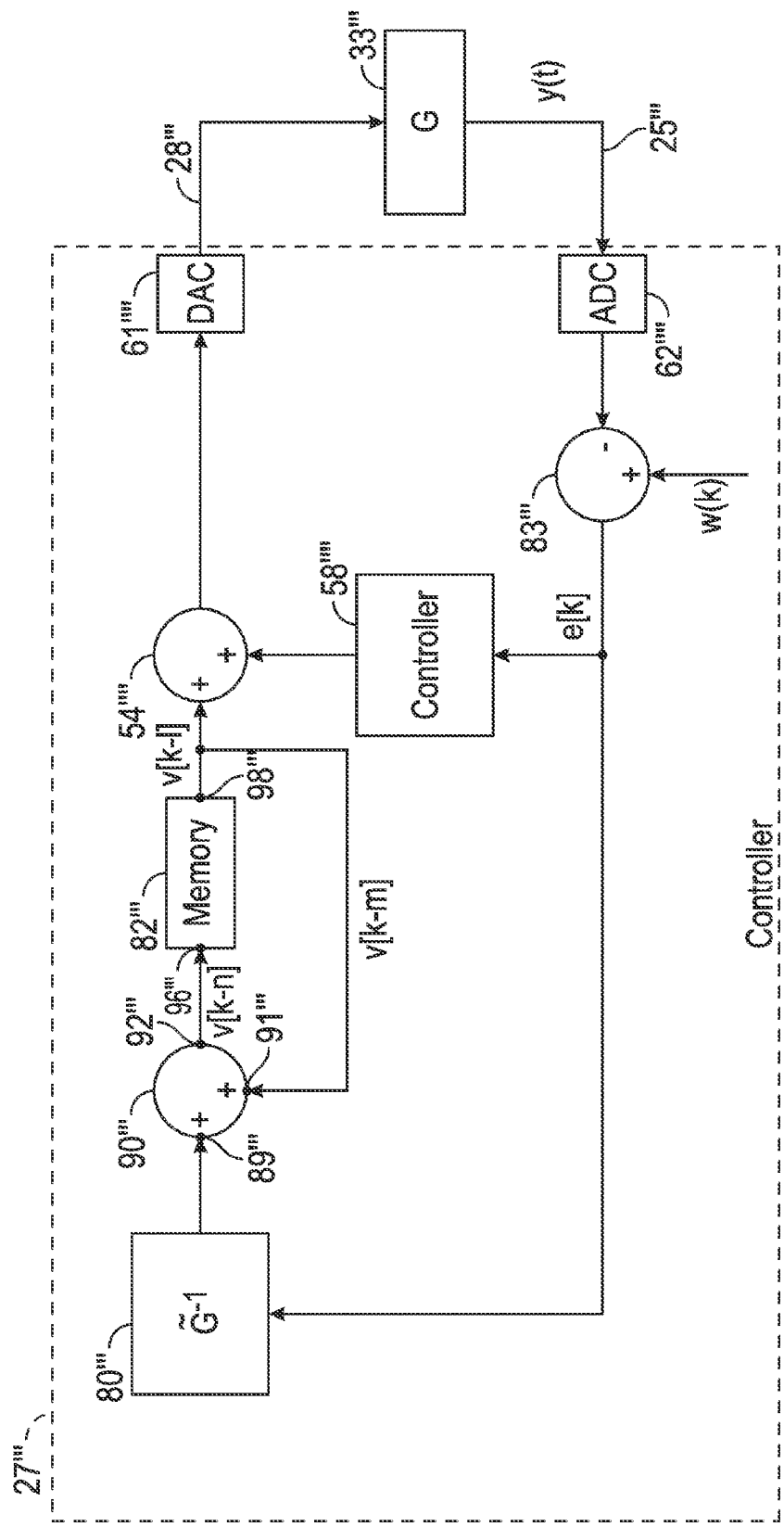
FIG. 34 illustrates a further embodiment of the controller of FIG. 33.

In a further embodiment, a controller according to the application may also comprise a learning controller and a control unit in a parallel arrangement, as shown in FIGS. 33 and 34. A controller with a parallel arrangement further comprises a correction signal unit. The correction signal unit derives an external control signal from the correction output signal of the learning controller and from an internal control signal which is derived from the control unit. In the FIGS. 33 and 34, the correction signal unit corresponds to the adders 54''' and 54'''', respectively.

In FIG. 34, the control unit corresponds to the adder 83''' and the controller 58''''. In FIG. 34, the inverse system unit corresponds to the adder 83''' and the inverting unit 80''', whereas in FIG. 33 the inverse system unit corresponds to the adder 83'', the ADC 62''' and the inverting unit 80''.

In the FIG. 33 the filtering unit corresponds to the adder 90'' and an iteration filter which is not shown. This iteration filter could be arranged between the output 98'' of the iteration memory 82'' and the input 91'' of the adder 90''. It could also be arranged between the adder 90'' and the input 96'' of the iteration memory 82''.

Especially in the description of FIG. 4, a method for performing a test run on a steering rig according to the application is disclosed. This method comprises a repeated step 74. During the repeated step, a control signal is derived from a reference signal, from an actual value signal and from a stored correction signal. The control signal is used for actuating the steering test rig according to the control signal. In the embodiment of FIG. 1, this is accomplished by sending a control signal to an actuator of the steering test rig. The actuator acts on a steering device which, in the embodiment of FIG. 1, comprises a steering gear, a steering rod, tie rods and the joints between the parts of the steering device. In principle, a steering device can be any movable part of the chassis of a vehicle.

The method for performing a test run may be performed on a first controlled system comprising a motor and a position sensor and a second controlled system comprising a force actuator and a force sensor. In this case, the steps of the method are performed for both of the controlled systems. In the embodiment of FIG. 1, the motor corresponds to the steering motor 2, the position sensor corresponds to the angle sensor 30, the force actuator corresponds to a hydraulic actuator and the force sensor corresponds to the load cell 23 and the controlled systems are given by the controlled systems 33, 34. There may be also more than two controlled systems, as shown in the embodiment of FIG. 1.

In the serial arrangement of FIG. 5, the reference signal occurs at the input 102 of the adder 100, the actual value signal occurs at the input 55 of the adder 54 and the stored correction signal occurs at the input 99 of the adder 100. In the parallel arrangement of FIG. 34, the reference signal occurs at the input of the adder 83''', the actual value signal occurs at a first input of the adder 54'''' and the stored signal occurs at a second input of the adder 54''''.

The stored signal is in turn derived from a reference signal, an actual value signal and a previously stored correction signal. In the serial arrangement, as shown in FIG. 5, in an intermediate step, a corrected reference signal is derived from the stored correction signal and the reference signal and, in a further step, the control signal is derived from the corrected reference signal and the actual value signal.

The deriving of the stored correction signal comprises the deriving of a first correction signal. In the embodiment of FIG. 5, this is accomplished by the adder 83 and the inverting unit 80. A further part of the method of the application is the deriving of a second correction signal. In the embodiment of FIG. 5, this is accomplished by the adder 90. Filtering the first correction signal and storing the correction signal for later use as a stored correction signal is also part of the method of the application. In the embodiment of FIG. 5, this is accomplished by the filtering unit 81 and the iteration memory 82.

The deriving of the first correction signal may further comprise deriving a difference signal from the actual value signal and the reference signal. In the embodiment of FIG. 5, this is accomplished by the adder 83. The deriving of the first correction signal may also comprise the computation of a derivative of the difference signal and the computation of a weighted sum of the difference signal and the derivative of the difference signal. In the embodiment of FIG. 7, this is accomplished by the P component and the D component of the PDL controller 130. In FIG. 8 these steps are accomplished by the multiplier 151, the differentiator 156 and the adder 154.

The deriving of the control signal from the corrected reference signal and the actual value signal may further comprise the computation of an integral and of a derivative of the corrected reference signal and the computation of a weighted sum from the derivative and the integral of the corrected reference signal and the corrected reference signal. In the embodiment of FIG. 9, this is accomplished by the PID controller 58. In FIG. 8, these steps are accomplished by the multiplier 151, the differentiator 156, the integrator 158 and the adder 154. In place of a PID controller a PD controller without integration component may also be used and the PD or PID controller may also comprise a lag component, as shown in FIG. 8.

As a further step, the deriving of the control signal may also comprise deriving a position signal from a position sensor at the steering device and deriving a second control signal from the control signal and the position signal. The second control signal is then used for actuating the steering device. In the embodiment of FIG. 10, the position signal occurs at the input 191 of the adder 190 and the control signal occurs at the input 180 of the adder 181.

The method may also comprise phase compensation steps. The phase compensation may be used in conjunction with any unit which uses past values of an input signal for the computation of an output signal and thereby introduces a phase lag. In the embodiment of FIG. 7, the phase compensation is accomplished by the backshift elements 139 and 136. The phase compensation of the backshift elements 139 and 136 is accomplished by a cyclic backshift operation which is explained in connection with the repeated step 74 of FIG. 4.

During the first loop of the repeated step 74, the stored correction signal is taken from initial values. As shown in connection with FIG. 14, there are several possibilities to generate such initial values.

The stored correction signal in the iteration memory may be portioned into a head section, a cyclic section and a tail section, as shown in FIG. 16. In this case, the cyclic section is updated during the repeated step 74. The tail and the head sections may further contain half cycles. In this case, during at least one loop of the repeated step 74, the head and tail sections of the stored correction signal are updated by a cross fading step. An example of a cross fading step is given in the embodiment of FIG. 17.

An update of the stored correction signal may take place each time when a new sample of an actual value signal is generated. The correction signal may also be derived from several signal values at a time, from signal values of one repeated step 74 or even from signal values of multiple repeated steps 74. In the latter case, a trend over multiple cycles of the correction signal may be derived to speed up convergence. It is also possible to calculate several values of the control signal in one computation step, in order to cope with high speed requirements of the test rig.

The embodiment of FIG. 1 also discloses a steering test rig for performing a durability test with a steering device. A steering test rig according to the application comprises at least one controlled system which has at least one actuator and at least one sensor. The test rig also comprises at least one controller. The at least one sensor is provided at the steering test rig. This is understood to be anywhere on the steering test rig or on the steering device. Likewise, an actuator for actuating the steering test rig is understood to act on a part of the steering test rig or on a part of the steering device.

For example in the embodiment of FIG. 1, the at least one actuator and the at least one sensor may correspond to the steering motor 2 and the position sensor 30 or they may correspond to the right torque actuator and the load cell 23. The steering test rig comprises one or more controllers according to the application. In the embodiment of FIG. 1, the controller corresponds to the controller 27. In the embodiment of FIG. 29, the controllers correspond to the controllers 390, 391 and 392. For each of the controlled systems the controller or the controllers generate a control signal from a reference signal and an actual value signal.

Another test rig according to the application comprises at least two controlled systems. In one of the controlled systems there is a motion actuator and a position sensor provided. Instead of a position sensor, a motion sensor may also be used. In another controlled system, there is a force actuator and a force sensor. In the embodiment of FIG. 1, the motion actuator corresponds to the steering motor 2 and the position sensor corresponds to the angle sensor 30. In the same embodiment, the force actuator and the force sensor correspond, for example, to the right torque actuator and the right load cell 23.

The control signal, the reference signal and the actual value signal for the first controlled system are referred to as motion control signal, motion reference signal and actual motion signal. Similarly, the control signal, the reference signal and the actual value signal for the second controlled system are referred to as force control signal, force reference signal and actual force signal. Similarly, other signals are attributed to one of the controlled systems by the qualifier 'motion' or 'force'.

In FIGS. 29, 30, 32, 33 and 34, components with similar functions have the same reference numbers as the components in the aforementioned figures and prime symbols have been added to demonstrate this.

FIG. 29 illustrates a further embodiment of the steering test rig 36 of FIG. 1. Similar parts have similar reference numbers. In the embodiment of FIG. 29, the controlled systems 33', 34', 35' are controlled by separate digital controllers 390, 391, 392. Each of the digital controllers 390, 391, 392 is realized according to FIG. 3 of embodiment 1. Unlike the controller of FIG. 3, each of the controllers 390 and 391 uses two input channels and one output channel and the controller 392 uses one input channel and one output channel.

Input cables 25', 26' connect the load cells 23', 24' to first input channels of the digital controllers 390, 391. Output cables 28', 29' connect the digital controllers 390, 391 to inputs of the torque actuators. Additional input cables 393, 394 connect the output of the angle sensor 30' to second input channels of the digital controllers 390, 391.

An input cable 395 connects the angle sensor 30' to the digital controller 392. An output cable 32' connects the digital controller 392 to the electric motor 2'.

The remaining parts of the steering test rig 36' are explained in the description of FIG. 1.

Figure 30:
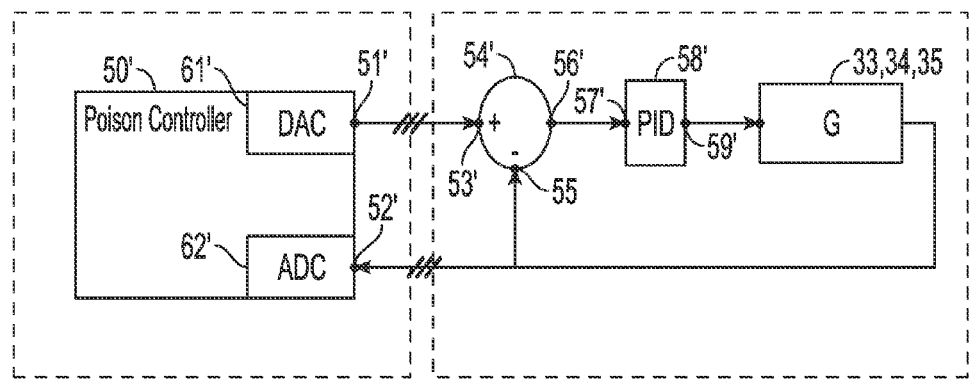
FIG. 30 illustrates an embodiment of a controller for the test rigs of FIG. 1 and FIG. 29.

FIG. 30 shows a third embodiment in which the POISON controller 50 of FIG. 3 is realized on a separate digital controller which controls a control loop with an analog adder 54' and an analog PID controller. Like parts have been given like reference numbers. This embodiment can be combined with the steering test rig 36 of embodiment 1 as well as with the steering test rig 36' of embodiment 2.

Referring now back to FIG. 5, in the embodiment of FIG. 30 the output 52 of the adder 102 is connected to an input channel 60 of a DAC 61'. The input to the adder 83 is connected to an output channel of an ADC 62'. The adder 54 and the system controller 58 are not part of a digital controller. They are realized as separate analog components 54', 58'.

In FIG. 30, a first input 53' to an analog adder 54' is connected to an output channel of the DAC 61'. A second input 55' to the analog adder 54' is connected to one of the controlled systems 33, 34, 35. An output 56' of the analog adder 54' is connected to an input 57' to an analog system controller 58'. An output of the analog system controller 58' is connected to an input of one of the controlled systems 33, 34, 35.

Similar to FIG. 3, there is one adder 54' and one system controller 58' for each controlled system. The components inside the digital controller, which are shown in FIG. 5, are realized for each controlled system, as in FIG. 3. The same applies to the corresponding connections. For reasons of simplicity only one controlled system is shown in FIG. 30.

It is also possible to use the embodiment of FIG. 30 in the steering test rig 36' of FIG. 29. In this case, there is a POISON controller 50' for each controlled system. Likewise, the digital controllers for the torque actuators then use 2 input channels and one output channel and the digital controller for the electric motor uses one input channel and one output channel.

Figure 31:
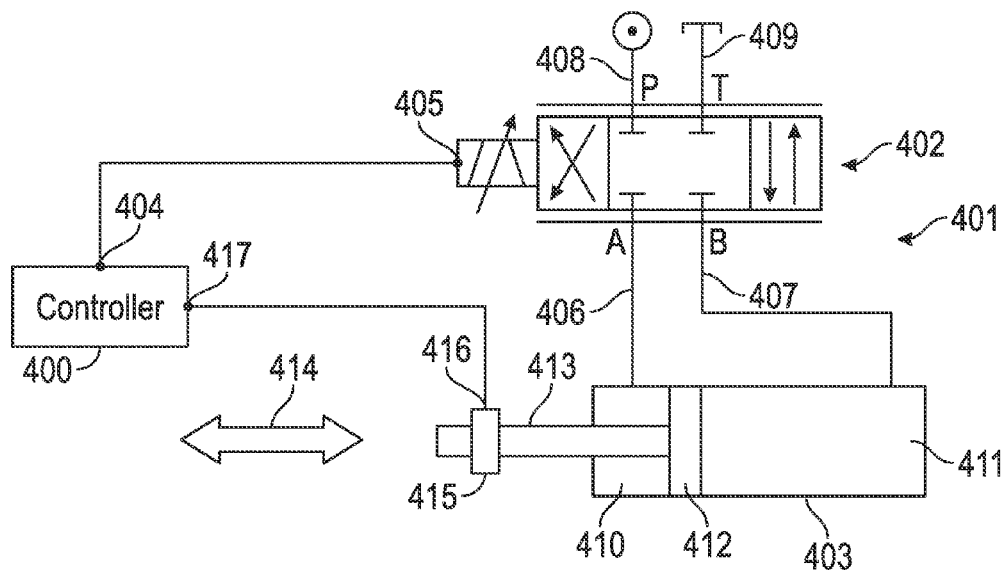
FIG. 31 illustrates a further embodiment of a hydraulic test rig.

FIG. 31 shows a further embodiment of a test rig in which a controller 400 comprising a POISON controller is used in the control of a controlled system 401. The controlled system 401 comprises a four way servo valve 402, a double acting hydraulic cylinder 403 and a tested component which is not shown in FIG. 31. An output 404 of the digital controller 400 is connected to a control input 405 of the four way servo valve 402. The four way servo valve 402 has four ports 406 (A), 407 (B), 408 (P), 409 (T). Port P is connected to hydraulic pump and port T is connected to a hydraulic tank. Port A is connected to a front oil chamber 410 of a double acting hydraulic cylinder 403 and port B is connected to a rear oil chamber 411 of the double acting hydraulic cylinder. The double acting hydraulic cylinder contains a piston 412 and a shaft 413 which is mounted to the piston. The movement of the shaft is indicated by an arrow 414. A tested component, which is not shown in FIG. 31, is in mechanical contact with the outer end of the shaft 413. A load cell 415 is connected to the shaft 413 and an output 416 of the load cell 415 is connected to an input 417 of the digital controller 400.

The controller 400 of FIG. 31 receives an actual value signal from the load cell 415 and computes a control signal from an actual value signal and a periodic reference signal. The controller 400 sends the control signal to the input 405 of the servo valve 402. The four way servo valve 402 distributes the pressure of the hydraulic pump according to the control signal of the controller 400. The pressure difference between the front chamber 410 and the rear chamber 411 results in a force on the piston 412. The piston 412 transmits the force via the shaft 413 to the load cell 415 and to the tested component. The force on the piston 412 also results in a horizontal movement of the shaft 413. This movement is indicated by an arrow 414.

Figure 32:
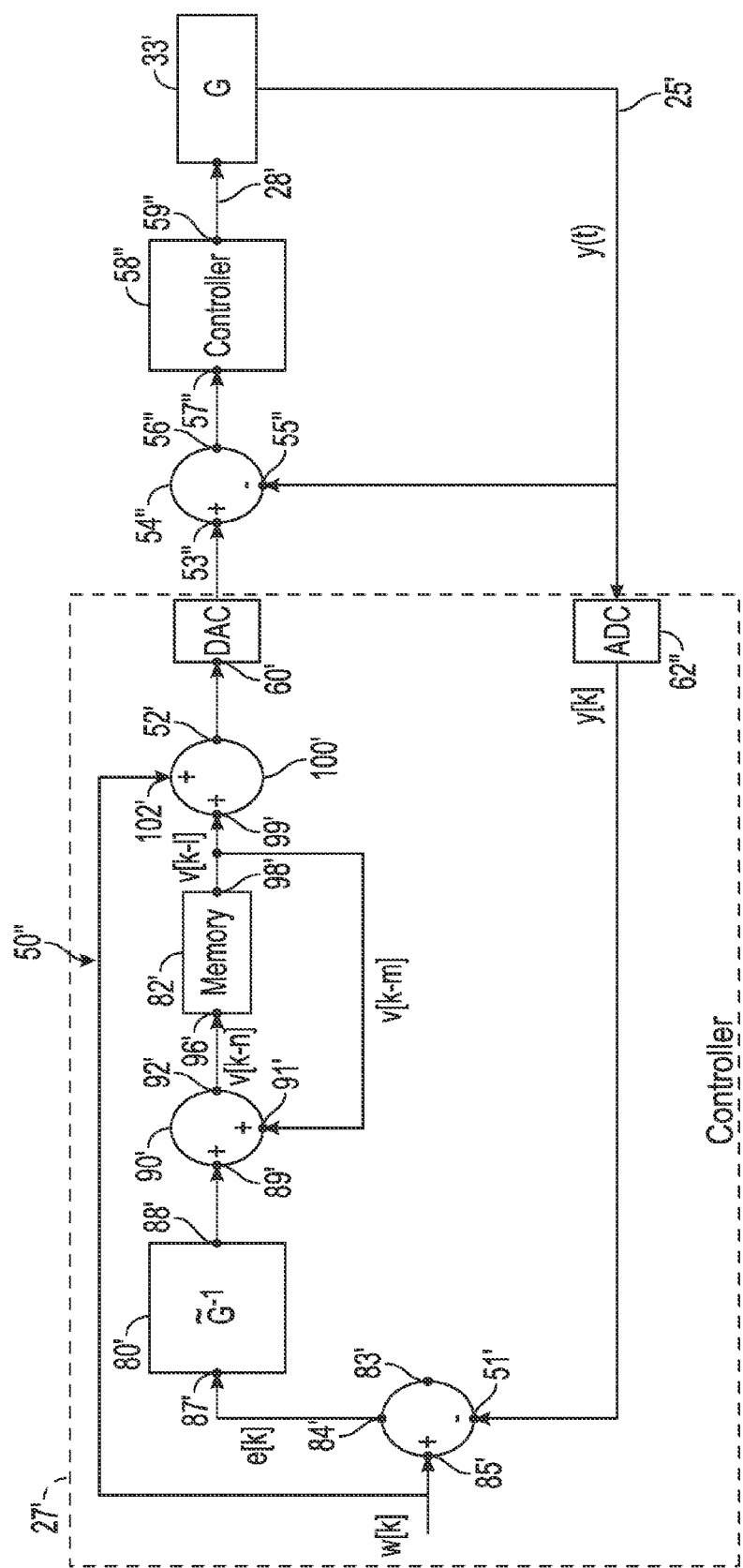
FIG. 32 illustrates a further embodiment of a controller.

FIG. 32 shows a further embodiment of a controller according to the application. As in FIG. 30, the POISON controller 50" is realized as a digital controller. FIG. 32 uses an analog system controller 58" instead of the system controller 58' of FIG. 30. The controller 58" of FIG. 32 represents any type of analog controller. The parts between the adder 83' and the adder 100' of FIG. 32 are similar to the parts between the adder 83 and the adder 100 of FIG. 5. Unlike in FIG. 5, there is no iteration filter in FIG. 32 and the inverting unit 80 of FIG. 5 is replaced by a general digital filter 80'. The output value of the general digital filter 80' is given by a sum of a linear combination of present and past values of the input values of the general digital filter 80' and a linear combination of present and past values of the output signal of the general digital filter 80'.

FIG. 33 and FIG. 34 show two further embodiments of a controller according to the application. Unlike in the previously shown embodiments the learning controller is used in a parallel arrangement. In the parallel arrangement, the correction signal is added to the output signal of a system controller and not to the input signal. In a serial arrangement, as in FIG. 5, the correction signal is added to the input signal of a system controller 58. The parallel arrangement is easier to implement if the system controller is part of a digital controller, as in FIG. 34, because in this case it is not necessary to insert an analog adder between the system controller and the controlled system. The serial arrangement of FIG. 5 has the advantage over the parallel arrangement of FIGS. 33, 34 that it can be used with an existing controller 58 without the need to reconfigure the existing controller 58.

In the parallel arrangement of FIG. 33 an adder 54''' is provided for adding the stored correction signal to the output of the controller 58'''.

FIG. 34 shows a further embodiment of a controller according to the application which is similar to the embodiment shown in FIG. 33 but in which the controller 58'''' is a part of a digital controller 27'''.

The controllers 27'', 27''' of FIG. 33 or FIG. 34 may also comprise an iteration filter between the adder 90'', 90''' and the input 96'', 96''' of the iteration memory 82'', 82''' or between the output 98'', 98''' of the iteration memory 82'', 82''' and the adder 90'', 90'''.

FIG. 35 to FIG. 40 show a further embodiment of steering test rig that uses a POISON controller according to the application. Similar parts which have been explained with respect to previous figures have the same or primed reference numbers. The use of primed reference numbers in FIGS. 35 to 41 is not related to the use in the previous FIGS. 1 to 34. FIG. 41 shows an alternative embodiment which is similar to the embodiment of FIG. 35.

Figure 35:
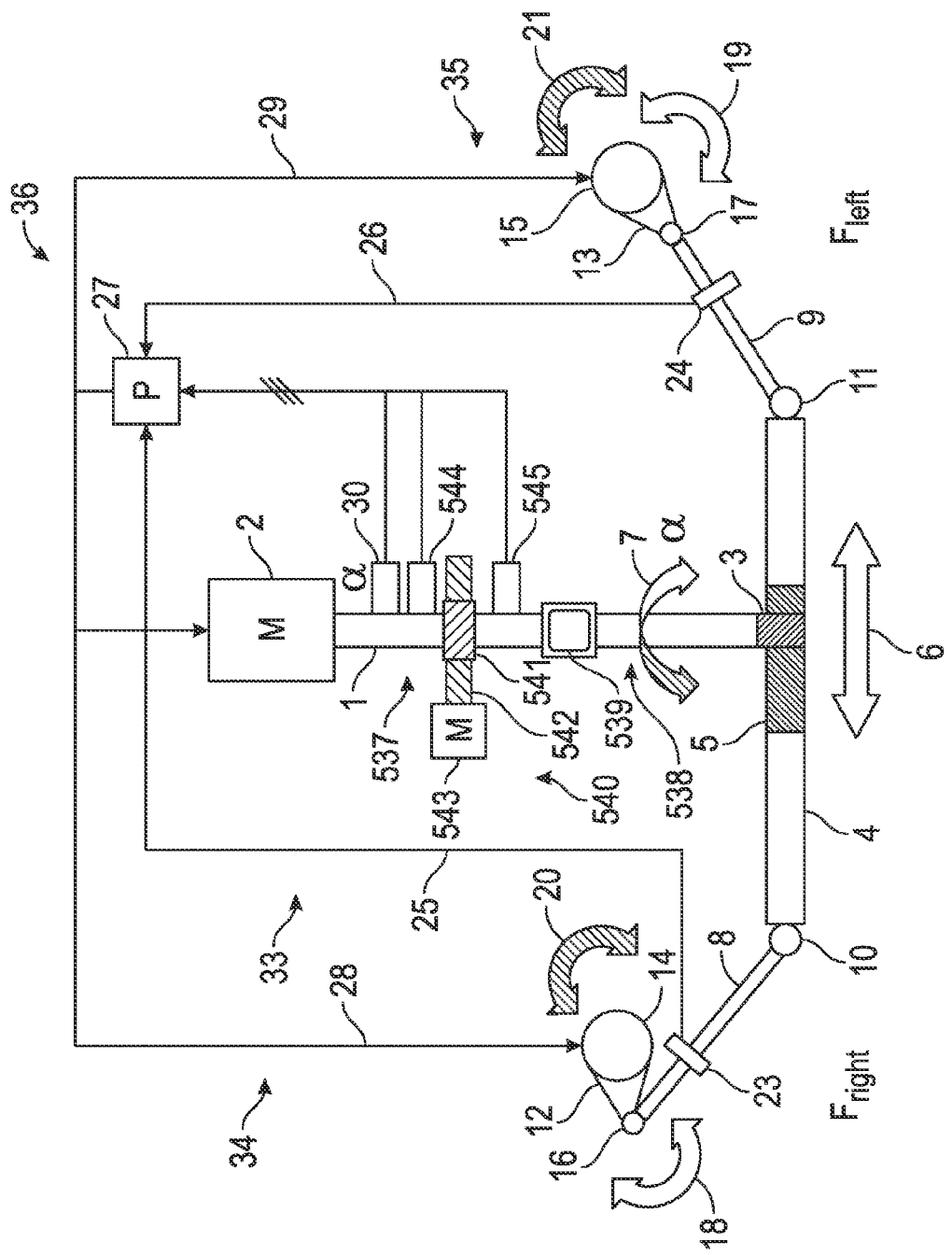
FIG. 35 illustrates a schematic overview of a steering test rig 36 for testing an electric power steering.

FIG. 35 shows a schematic overview of a steering test rig 36 wherein steering equipment of an electric power steering system is mounted.

A central steering shaft 1 is mounted in the steering test rig 36 such that it is pivoted along its longitudinal axis. An arrow 7 indicates rotation of the steering shaft around its axis. The upper end of the steering shaft 1 is connected to an electric motor 2.

The steering shaft 1 comprises an upper portion 537 and a lower portion 538. A cardan joint 539 connects the upper portion 537 and the lower portion 538 of the steering shaft 1. At the upper portion 537 of the steering shaft 1, an electric power steering (EPS) 540 is provided. The electric power steering 540 comprises a pinion 541 which is mounted on the steering shaft 1 and combs with a worm gear 542 that is driven by an electric servo motor of the power steering 540.

The electric power steering 540 comprises an angle sensor 30, a steering torque sensor 544 and a steering gear torque sensor 545. The angle sensor 30 and the steering torque sensor 544 are provided above the pinion 41 at the steering shaft 1. The steering gear torque sensor 545 is provided at the steering shaft 1 between the pinion 541 and the cardan joint 539. Outputs of the sensors 30, 544, 545 are connected to a control unit of the EPS which, for reasons of simplicity, is not shown here. Furthermore, the outputs of the sensors 30, 544, 545 are connected to inputs of a controller 27.

Figure 36:
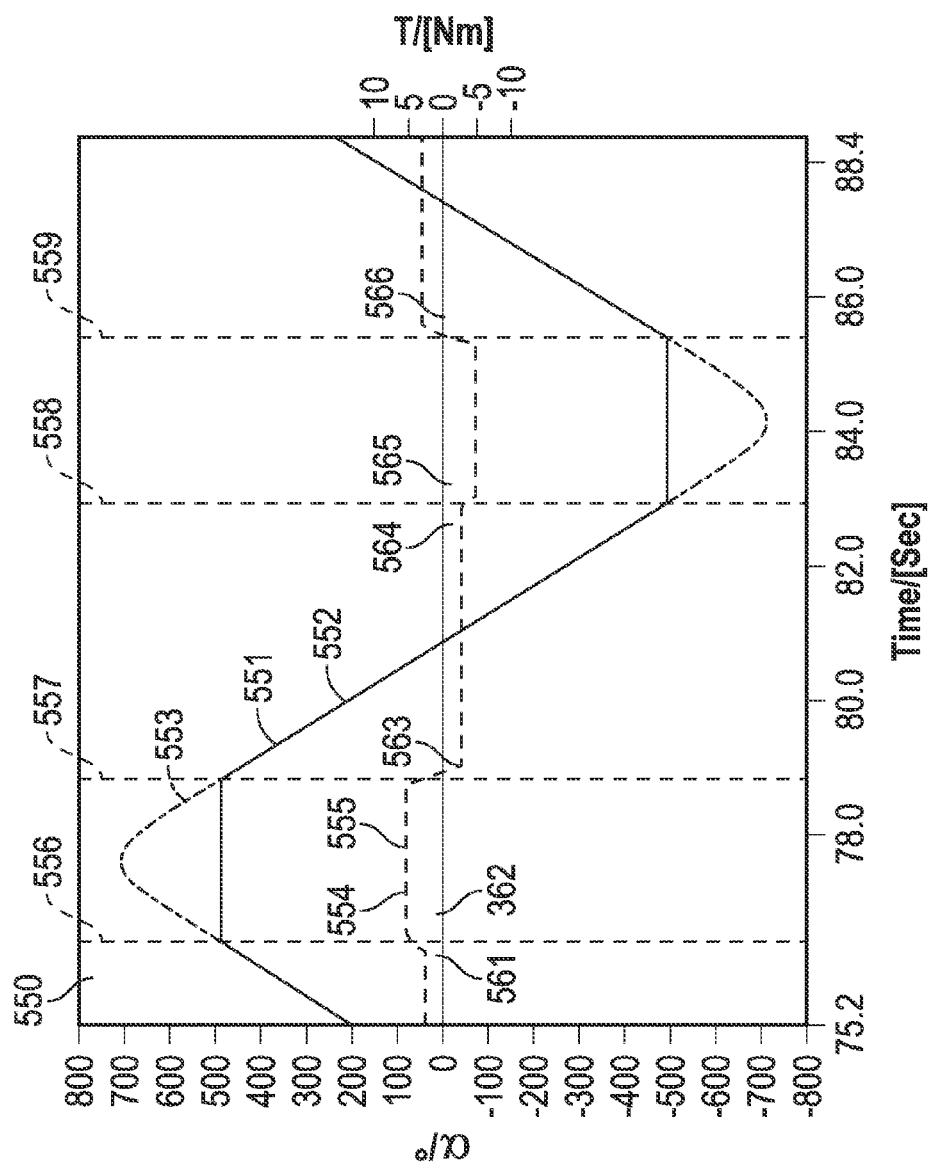
FIG. 36 illustrates a diagram with reference and actual value curves for steering angle and steering torque.

FIG. 36 shows a diagram 550 with reference and actual value curves for the steering angle and the steering torque. The diagram 550 has an angular scale in degrees for a steering angle of the steering shaft 1, a torque scale in Newtonmeter for a steering torque of the steering motor 2 and a time scale in seconds.

Diagram 550 comprises a reference angle curve 551 and an actual angle curve 552 for a steering angle of the steering shaft 1. Within the resolution of the diagram 550, a difference between the curves 551, 552 is not visible. A reference angle curve 553 in the form of a rounded triangle wave shows a reference angle for a vehicle without a steering stop limitation.

Furthermore, diagram 550 shows a reference torque curve 554 and an actual torque curve 555 for a steering torque of the steering motor 2. Within the resolution of the diagram 550, a difference between the curves 554 and 555 is not visible. The reference torque curve 554 begins at a right lower value. From a time 561 before a time 556 to a time 562 after time 556 the reference torque curve 554 rises smoothly from a right threshold torque to a right load torque. From a time 557 to a time 563 the reference torque curve 554 falls from the right load torque to a left threshold torque. From a time 564 before time 558 until a time 565 after time 558 the torque reference curve 554 falls from the left threshold torque to a left load torque. From time 559 to a time 566, the torque reference curve again rises to a right threshold torque.

The time interval from the time 556 to the time 557 and the time interval from the time 558 to the time 559 delimit times in which the control device 27 does not apply an angular control to the steering motor 2 but instead a torque control is applied to the steering motor 2.

Figure 37:
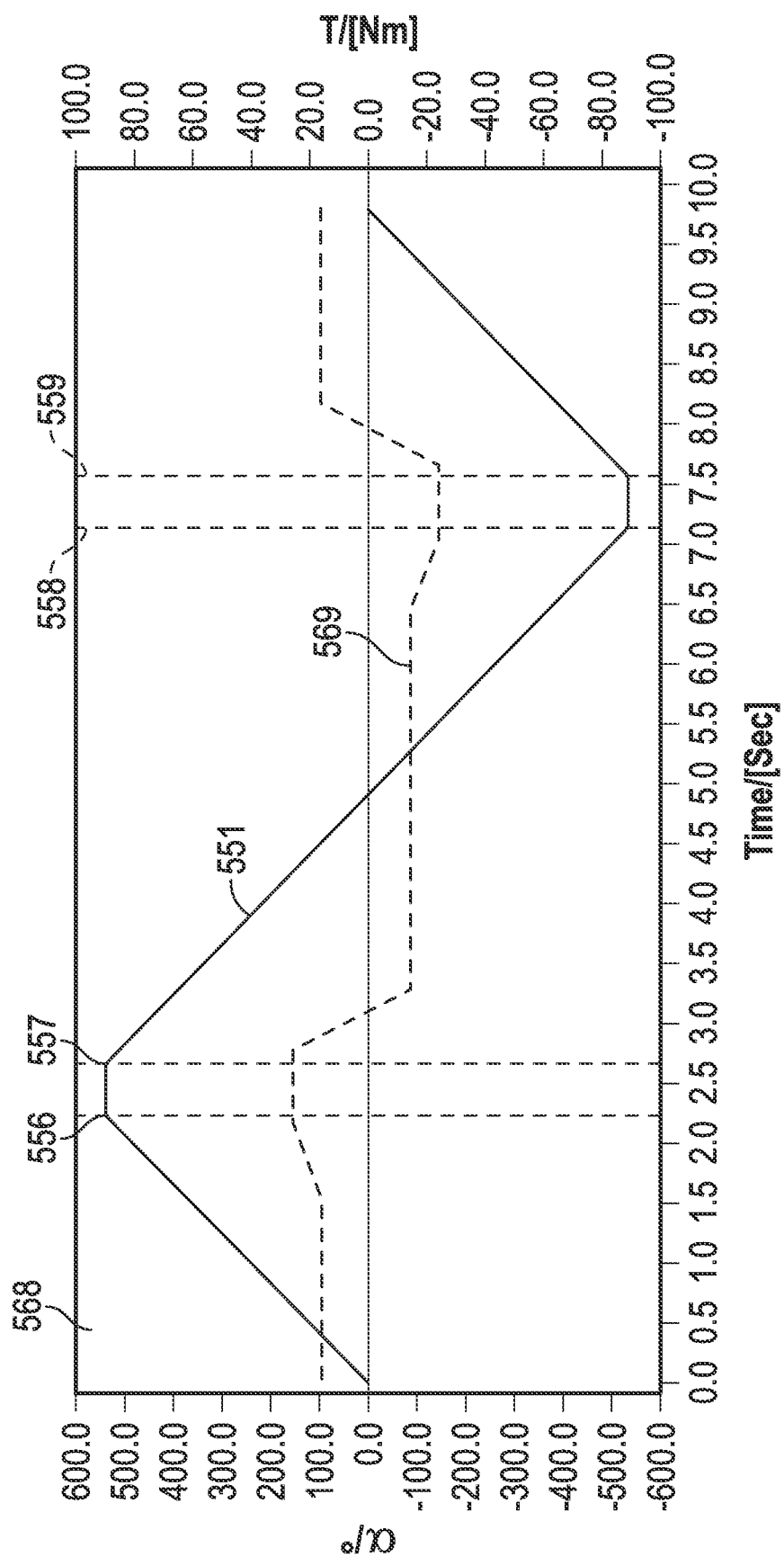
FIG. 37 illustrates a diagram with reference angle curve and reference torque curve for a steering gear torque.

FIG. 37 shows a diagram with the reference angle curve 551 of FIG. 36 and a reference torque curve 569 for a steering gear torque at the torque sensor 545.

Figure 38:
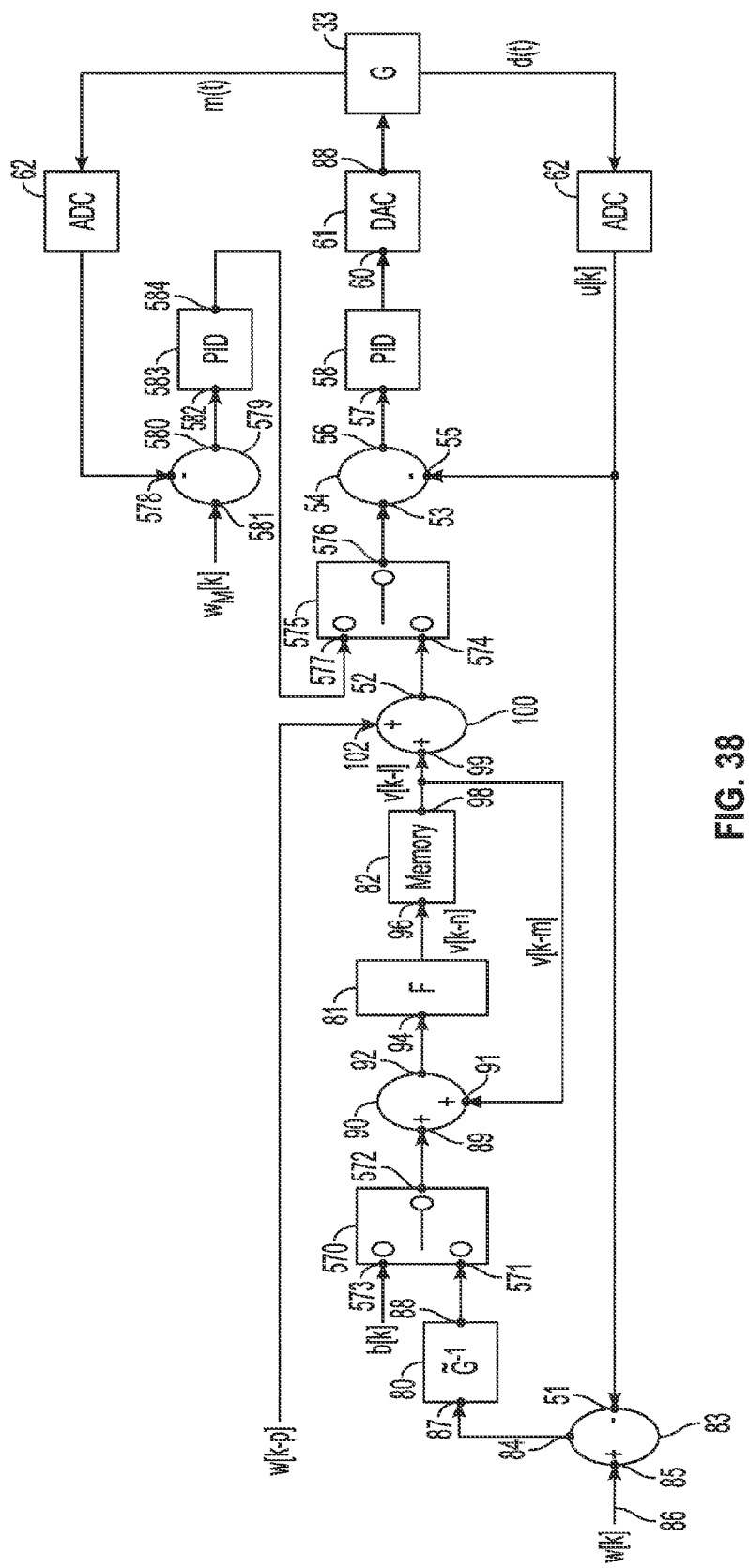
FIG. 38 illustrates a schematic diagram of parts of the control device for controlling the steering motor.

FIG. 38 shows a schematic diagram of the part of the control device 27 which is used to control the controlled system 33 which comprises the steering motor 2. In addition to the parts shown in FIG. 5, the controller of FIG. 38 comprises conditional switches and a separate PID control loop. A conditional switch according to the application performs a fading of its output from a first input signal at a first input to a second signal at a second input. A fading also comprises a switching as a special case of fading with a 0-1 step function. Different channels of the ADC controller 62 are shown as separate boxes for clarity.

The parts which are different from FIG. 5 are described hereafter. An input 571 of a conditional switch 570 is connected to the output of the inverse system unit 80 and an output 572 of the conditional switch 570 is connected to the input 89 of adder 90. A second input 573 of the conditional switch 570 is connected to a brake reference signal b[k]. Furthermore, an input 574 of a second conditional switch 575 is connected to the output 52 of adder 100 and an output 576 of the second conditional switch 575 is connected to the input 53 of the adder 54. An output of steering torque sensor 544 is connected to an input channel of ADC 62. A corresponding output channel of the ADC 62 is connected to an input 578 of an adder 579. An output 580 is connected to an input 582 of a PID controller 583. An output 584 of the PID controller 583 is connected to an input 577 of the second conditional switch 575. A further input 581 of the adder 579 is connected to a steering torque reference signal. Furthermore, the input 102 of adder 100 is connected to a time shifted angle reference signal w[k−p].

During operation, the steering motor is controlled via the reference angle curve 551 of FIG. 36. The conditional switch 575 compares the actual steering torque with a threshold torque. If the actual steering torque reaches the threshold torque, the conditional switch 575 fades the control over to torque control and stores the steering angle value as a threshold value for a later use when switching back to angle control. During torque control, the conditional switch 575 compares the actual steering angle with this stored angle value. If the steering angle reference signal reaches the threshold angle, the conditional switch 575 fades the control over to angle control.

While the steering motor is controlled via torque control, a second PID control loop which comprises the PID controller 583 controls the first PID control loop which comprises the PID controller 58. The second PID control loop receives a reference steering torque w_m[k] at the input 581 of the adder 579 according to the reference curve 554 of FIG. 36. In accordance with the previous FIG. 36, the reference torque 554 is set to a threshold torque and is ramped up to a load torque. The beginning of the ramping up depends on the actual steering torque that the second PID control loop receives via the input 578 of the adder 579. The input of the adder 579 is derived from the output of the steering torque sensor 544 of FIG. 35. Therefore, the form of the reference curve 554 of FIG. 36 depends on the actual steering torque.

At a time 556 after the beginning time 561 of the ramping up of the torque, the reference angle w[k] at the input 85 of adder 83 is held at a fixed angle. In the example of FIG. 36, the fixed angle corresponds to a steering angle of 500 degrees. Alternatively, the fixed angle may also be given by the actual steering angle at the time 556.

At the time 556 after the beginning time 561 of the ramping up of the torque, the conditional switch 570 fades its output over from the input 571 to the input 573. At the input 573 a braking angle reference signal b[k] from a reference signal generator is received. The reference signal generator derives an actual steering velocity from the actual steering angle and adjusts the angle reference signal b[k] in such a way that the steering velocity slows down to a limit steering velocity which is reached before the control has completely faded over to torque control at time 562. From time 562 onwards, the iteration is stopped which means that the braking angle reference signal b[k] is set to zero which results in a zero input signal at the input 89 of adder 90.

When, at a later time 557, the actual steering angle reaches the fixed angle again, the conditional switch 570 fades over its output from input 573 to input 571 until time 563 is reached. After time 557, the steering torque reference signal w_m[k] is ramped down to a left threshold torque until time 563 is reached. At time 563, the iteration is started again which means that due to the linear fading of the conditional switch 570, an input signal at input 89 of adder 90 is faded in, too.

It is sufficient to describe the functioning of the steering control algorithm with respect to steering to the right only because the functioning for steering to the left is completely analogous.

Figure 39:
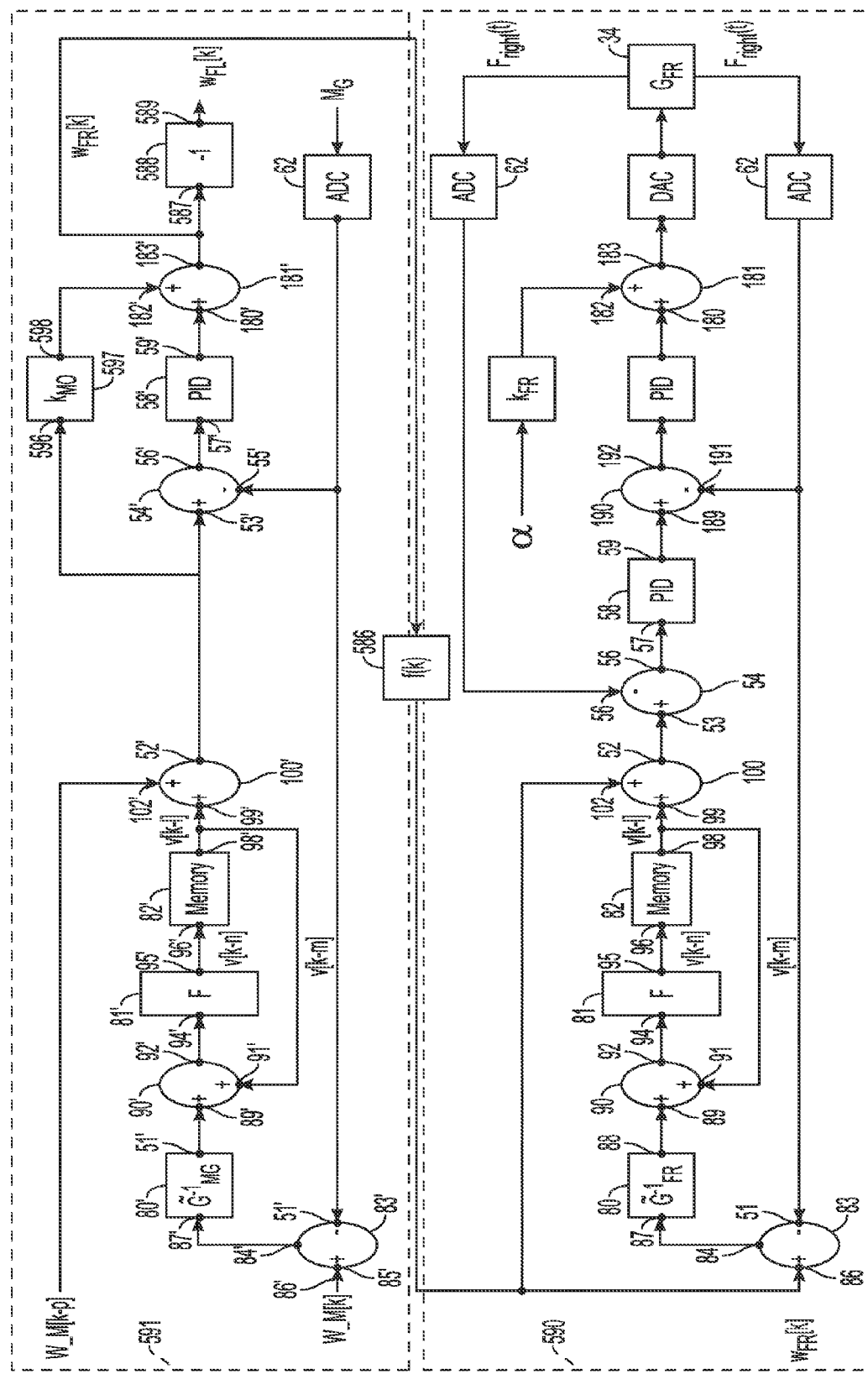
FIG. 39 illustrates a schematic diagram of parts of the control device for controlling the right torque actuator.

FIG. 39 shows a schematic diagram of the part of the control device 27 which is used to control the controlled system 34 which comprises the right torque actuator.

In FIG. e39, an inner control loop 590 is controlled by an outer control loop 591. Parts of the inner control loop 590 which are similar to previously explained parts have the same reference number and parts of the outer control loop 591 which are similar to previously explained parts with unprimed reference numbers have a primed reference number. The inner control loop 590 is designed as a control loop according to FIG. 5 which is extended by an angular correction according to FIG. 10. Output delimiters are not shown in FIG. 39. An output 183' of the outer control loop 591 is connected to an input of a coupling unit 586 and an output of the coupling unit is connected to an input 86 of the inner control loop 590. Thereby, the inner control loop 590 is coupled to the outer control loop 591.

Parts of the outer control loop 591 which are different from the control loop of FIG. 5 are explained hereafter. An input of a multiplier 587 is connected to an input 53' of adder 54' and to the output 52' of the adder 100'. An output 598 of the multiplier 597 is connected to the input 182' of adder 181'. The parts between output 52' and input 182' are also referred to as 'bypass'. The bypass provides a feed forward signal to adder 181'.

Moreover, an input 587 of an inverter 588 is connected to the output 183' of adder 181'. An output 589 of the inverter 588 is connected to an inner control loop for the left torque actuator which is constructed in the same way as the inner control loop for the right torque actuator shown in FIG. 39 but wherein parameter values of the various parts may be different from the inner control loop 590. In an alternative embodiment, also the inner control loop may be provided separately for the left and the right actuators.

For a test run that involves steering into the steering stops, it is advantageous to set the P part of controller 58' to zero, which, according to FIG. 8, results in a zero output signal of the controller 58'. Thereby, controller 58' is bypassed. The bypassing of controller 58' avoids unstable open loop effects when reaching the steering stop. Otherwise, for test runs which do not involve a steering until the steering stop is reached, it is advantageous to use both the controller 58' and the bypass by setting the P part of controller 58' to a non zero value.

During a 'free range' when the control of the steering motor 2 is controlled via angular control, which means that input 574 of conditional switch 575 shown in FIG. 38 is connected to the output 576 of the conditional switch 575, the inner control loop 590 is controlled via the outer control loop 591. The coupling unit 586 sets a weighting factor f[k] equal to one. Therefore, a reference force value w_FR[k] for the right tie rod which is generated by the inner control loop 591 is equal to a reference force value w^FR[k] at the input 86 of adder 83.

The outer control loop 591 receives a reference steering gear torque w_m[k] and at input 86' of adder 83' and an actual steering torque at input 51' of adder 83'. Furthermore, the outer control loop 591 receives a time shifted reference steering gear torque w_m[k−p] at input 102' of adder 100'. The parameters of the outer control loop 591 are adjusted such that the outer control loop controls the inner control loop 590 to generate a tie rod force F_right which ensures a defined steering gear torque at the steering gear torque sensor 545.

When the steering gear is at a steering stop, the forces on the tie rods 8, 9 have little or no influence on the actual steering gear torque at the steering gear. Instead, the steering gear torque is controlled only by the control device shown in FIG. 38. Therefore, at time 561 which is shown in FIG. 36, the output of the outer control loop 590 is faded out by multiplying the output signal w_FR[k] of the outer control loop by a factor f[k] which lies in the interval [0 . . . 1]. The factor f[k] is computed by a first order digital low pass filter which has an adjustable time constant. This filter is not shown. From time 561 onwards, the input at this digital low pass filter steps down from 1 to 0 and results in a smooth e-function shaped fade out process. Conversely, between times 557 and 563, when the control device of FIG. 38 changes back to angular control, the input at the not shown digital low pass filter steps up from 0 to 1 and results in a smooth e-function shaped fade in process such that the factor f[k] is increased to 1 again and output of the outer control loop is faded in again.

Furthermore, from a first predetermined time before the steering reaches the steering stop, the PID controller 58' of the outer loop 591 is 'frozen' which means that the reference values, the internal values (e.g. the integrator's value) and parameters are kept at fixed values in order to avoid unstable open control loop effects due to the missing influence of the tie rod actuators on the steering gear torque at the steering stop. Furthermore, the iteration is stopped which means that the input 89' of adder 90' is set to zero. From a second predetermined time after the steering leaves the steering stop onwards, the PID controller 58' is 'released' again which means that the control algorithm is executed in the same way as before the first predetermined time.

It is sufficient to describe the functioning of the torque actuator control algorithm with respect to steering to the right and with respect to the right torque actuator only because the functioning for steering to the left and for the left torque actuator is completely analogous.

Figure 40:
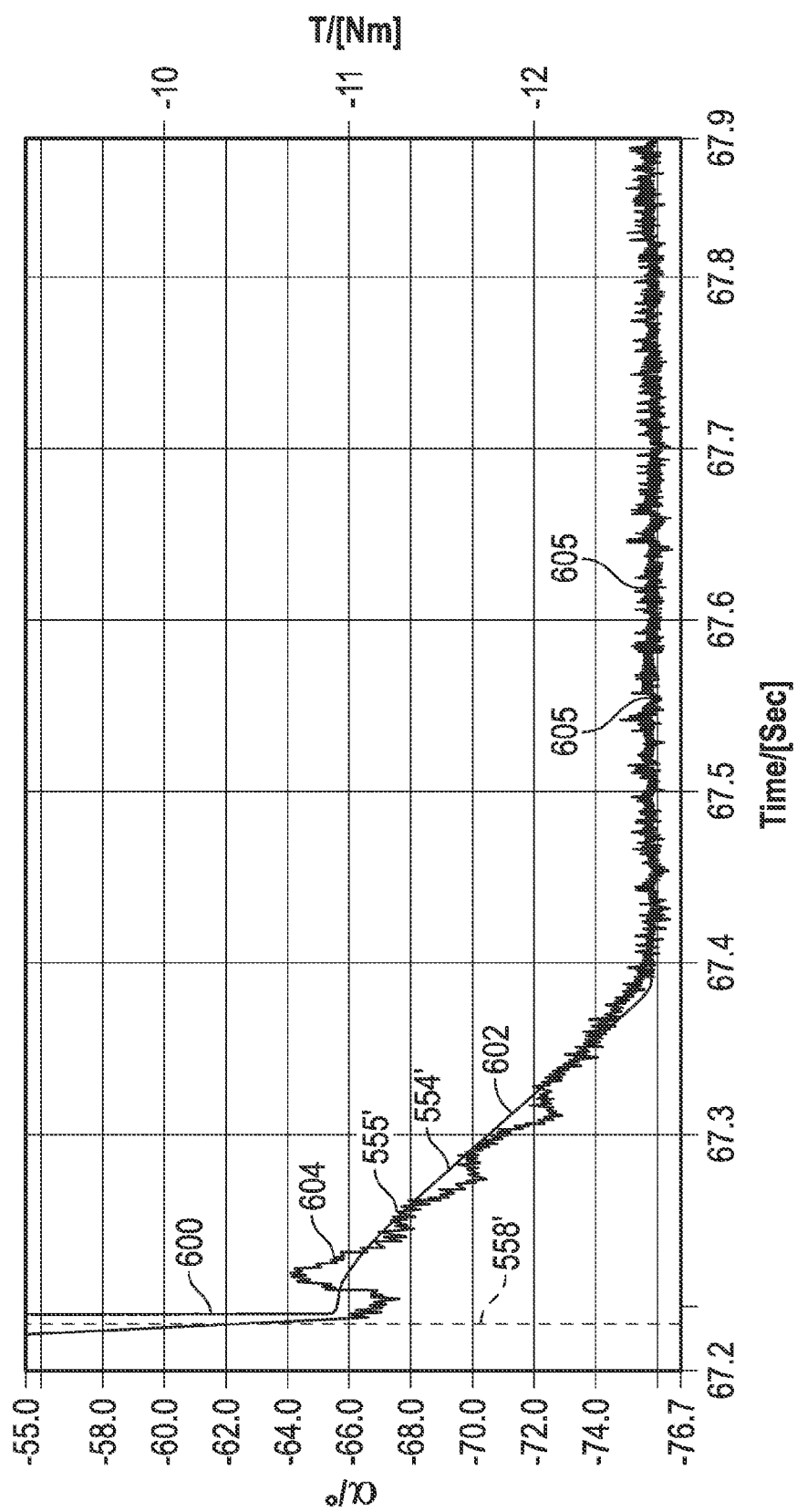
FIG. 40 illustrates a cut out of the previous FIG. 36 for a POISON controller according to FIG. 38.
Figure 41:
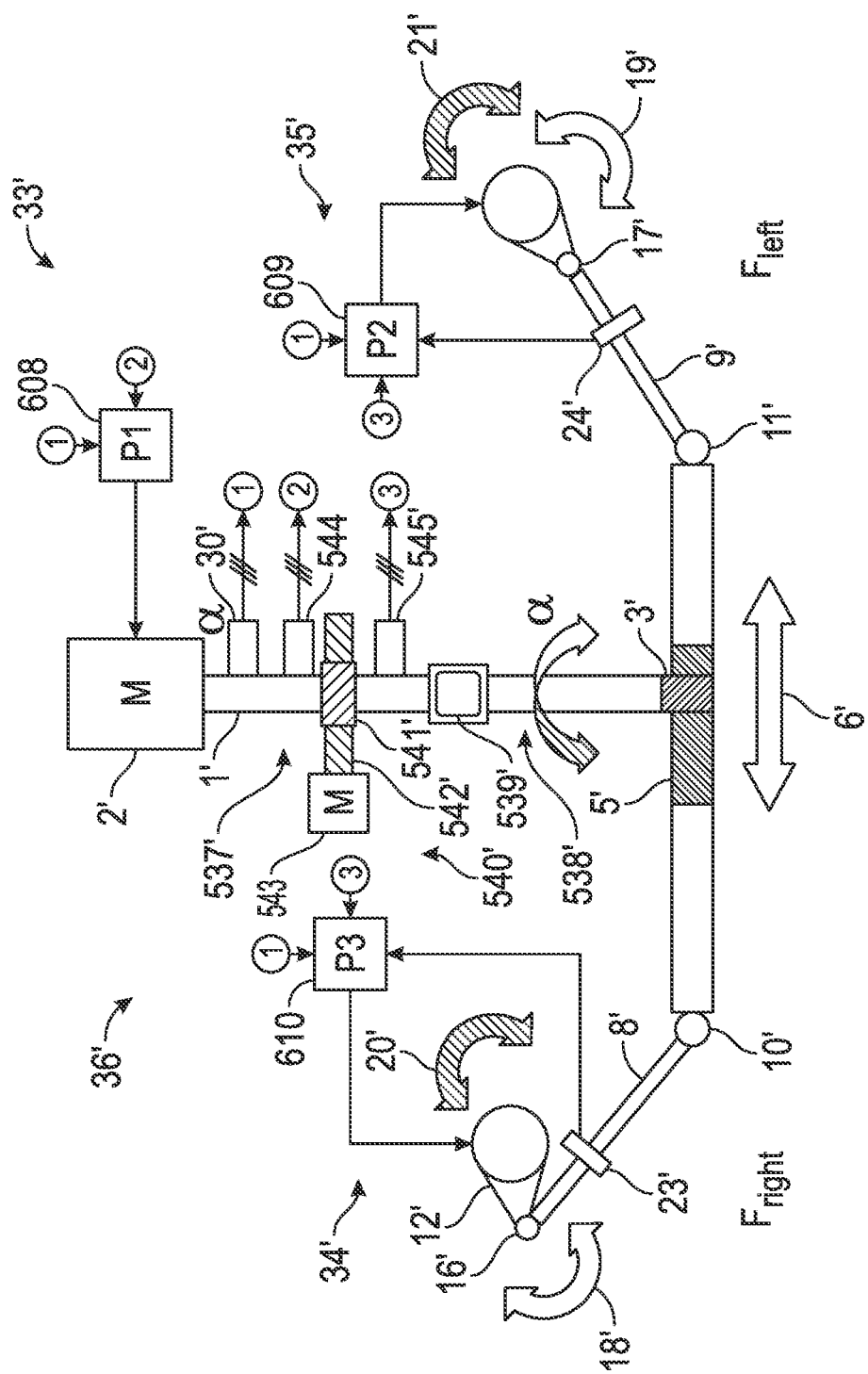
FIG. 41 illustrates an embodiment which is similar to FIG. 35, but which comprises separate POISON controllers.

FIG. 40 shows a cut out section of FIG. 36 for a POISON controller which contains the additional parts shown in FIG. 38. The cut out section shows a section of the corresponding curves 554', 555' after a time 558' which corresponds to time 558 of FIG. 36. Steering torque reference curve 554' comprises a steep descending portion 600, a ramp portion 602 and a load torque portion 603. The actual steering torque curve 555' shows very small over- and undershoots for the portion 602 of curve 554' and little oscillations around the load torque of the load torque portion 603. Without using a controller according to the embodiments of FIGS. 35 to 41, the over- and undershoots and the oscillations would be significantly higher because the steering motor 2 would run much faster into the steering stop without iteratively braking down in advance. A POISON controller which contains the additional parts shown in FIG. 38 avoids non desired load peaks which exceed the level of the desired load torque portion 603.

FIG. 41 shows a further alternative to the embodiment of FIG. 35 wherein separate POISON controllers 608, 609, 610 are used for controlled systems 33', 34' 35'. For clarity only the beginning and the end of cable connections are shown by corresponding circled numbers. In FIGS. 35 and 41, the steering gear torque sensor may also be placed below the cardan joint 539'.

The embodiments according to FIG. 35 to FIG. 41 provide a defined torque at a steering gear. The embodiments avoid torque fluctuations and high torques at the steering gear which may arise when a steering motor of a test rig reaches a steering stop, especially at high steering velocities. Instead, the steering stop is reached smoothly and with a defined limit torque. The learning behavior of the POISON controller mimics a human driver who also anticipates and reacts to a torque feedback. This leads to more realistic test data. Furthermore, the test rig can be driven with a higher velocity while still maintaining a realistic torque load on the steering gear. Thus, the throughput of the test rig is increased significantly.

Though the embodiments of FIG. 35 to FIG. 41 may be adapted for testing different types of steering mechanisms they are especially advantageous in connection with an electric power steering because the existing sensors of the electric power steering may be used. In this case it is sufficient to connect the sensor outputs and to reprogram the control devices. No further adaptation of either the test rig or the steering mechanism is required.

However, if it is not possible or not efficient to use the existing sensors of the electric power steering, the test rig may be equipped with additional test rig sensors. The test rig would then comprise its own angle sensor 30, its own steering torque sensor 544 and its own steering gear torque sensor 545.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

The invention claimed is:

1. A steering test rig for performing a durability test with a steering device, the steering test rig comprising:
   at least one motion actuator adapted to move the steering test rig according to a motion control signal;
   at least one force actuator adapted to actuate the steering test rig according to a force control signal;
   at least one position sensor adapted to derive an actual motion value signal of a motion of the steering device;
   at least one force sensor adapted derive an actual force value signal of a force on the steering device; and
   a control device adapted to receive the actual motion value signal and the actual force value signal and compute the motion control signal and the force control signal, the control device further adapted to output the motion control signal to the at least one motion actuator and the force control signal to the at least one force actuator, the control device comprising:
   a control unit adapted to compute the motion control signal from a motion reference signal, from a motion actual value signal of the position sensor and from a stored motion correction signal and compute the force control signal from a force reference signal, from a force actual value signal of the force sensor and from a stored force correction signal, comprising
      an inverting unit adapted to compute a first motion correction signal from the actual motion value signal and from the motion reference signal and compute a first force correction signal from the actual force value signal and from the force reference signal;
      a filtering unit adapted to compute a second motion correction signal from the first motion correction signal and from the stored motion correction signal and compute a second force correction signal from the first force correction signal and from the stored force correction signal; and
      an iteration memory adapted to store the second motion correction signal as a stored motion correction signal and store the second force correction signal as a stored force correction signal.

2. The steering test rig according to claim 1, wherein the control unit comprises a correction signal unit adapted to compute a corrected motion reference signal from the motion reference signal and from the stored motion correction signal and compute a corrected force reference signal from the force reference signal and from the stored force correction signal, and wherein the control unit comprises a controller adapted to compute the motion control signal from the corrected motion reference signal and from the actual motion value signal and compute the force control signal from the corrected force reference signal and from the actual force value signal.

3. The steering test rig according to claim 1, wherein the control unit comprises a controller adapted to compute an internal motion control signal from the motion reference value signal and from the actual motion value signal and compute an internal force control signal from the force reference value signal and from the actual force value signal, and wherein the control unit further comprises a control signal unit adapted to compute the motion control signal from the stored motion correction signal and from the internal motion control signal and compute the force control signal from the stored force correction signal and from the internal force control signal.

4. A controller comprising:
   a control unit adapted to derive an internal control signal from an actual value signal and from a reference signal, the actual value signal derived from a controlled system;
   a learning controller comprising
      an inverse system unit adapted to derive a first correction signal from the actual value signal and from the reference signal,
      a filtering unit adapted to deriving a filtered correction signal from a stored signal in an iteration memory and from the first correction signal, the filtering unit adapted store the filtered correction signal in the iteration memory, the iteration memory adapted to provide a correction output signal for the control unit, the correction output signal derived from the stored signal in the iteration memory;

an inverse system controller for the inverse system unit; and a low pass filter; and a control signal unit adapted to derive an external control signal from the correction output signal and from the internal control signal, the control signal unit adapted to provide the external control signal for an actuator in the controlled system.

* * * * *